US009326025B2

(12) United States Patent
Rao et al.

(10) Patent No.: US 9,326,025 B2
(45) Date of Patent: *Apr. 26, 2016

(54) MEDIA CONTENT SEARCH RESULTS RANKED BY POPULARITY

(71) Applicant: Rovi Technologies Corporation, Burbank, CA (US)

(72) Inventors: Pradhan S. Rao, Sunnyvale, CA (US); David H. Sloo, Menlo Park, CA (US)

(73) Assignee: Rovi Technologies Corporation, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,411

(22) Filed: Jun. 11, 2013

(65) Prior Publication Data

US 2013/0283306 A1    Oct. 24, 2013

Related U.S. Application Data

(63) Continuation of application No. 12/846,442, filed on Jul. 29, 2010, now Pat. No. 8,478,750, which is a continuation of application No. 11/716,236, filed on Mar. 9, 2007, now Pat. No. 7,801,888.

(51) Int. Cl.
*G06F 17/30* (2006.01)
*H04N 21/442* (2011.01)
(Continued)

(52) U.S. Cl.
CPC .... *H04N 21/44204* (2013.01); *G06F 17/30696* (2013.01); *G06F 17/30867* (2013.01); *H04H 60/46* (2013.01); *H04N 5/44543* (2013.01); *H04N 7/17318* (2013.01); *H04N 21/252* (2013.01); *H04N 21/4661* (2013.01); *H04N 21/4828* (2013.01)

(58) Field of Classification Search
CPC .......... G06F 17/30867; G06F 17/3084; G06F 17/30696
USPC ......... 707/722, 723, 727, 728, 748, 732, 749, 707/751–753
See application file for complete search history.

(56) References Cited

U.S. PATENT DOCUMENTS

| 3,440,427 A | 4/1969 | Kammer |
| 3,492,577 A | 1/1970 | Reiter et al. |

(Continued)

FOREIGN PATENT DOCUMENTS

| AU | 5619898 A | 7/1998 |
| AU | 731010 B2 | 3/2001 |

(Continued)

OTHER PUBLICATIONS

"Extended European Search Report", European Patent Application No. 08731092.6, (May 29, 2012), 9 pages.

(Continued)

*Primary Examiner* — Debbie Le
(74) *Attorney, Agent, or Firm* — Ropes & Gray LLP

(57) ABSTRACT

Media content search results ranked by popularity is described. In embodiment(s), a search request for television media content can be initiated by a viewer, and television media content that is relevant to the search request can be identified. The relevant television media content can then be ranked based on a popularity rating and the relevant television media content can be displayed in an ordered list that is ordered by popularity rankings.

40 Claims, 7 Drawing Sheets

(51) Int. Cl.
*H04H 60/46* (2008.01)
*H04N 5/445* (2011.01)
*H04N 7/173* (2011.01)
*H04N 21/25* (2011.01)
*H04N 21/466* (2011.01)
*H04N 21/482* (2011.01)

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,070,693 A | 1/1978 | Shutterly |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,103,524 A | 8/1978 | Mitchell et al. |
| 4,107,735 A | 8/1978 | Frohbach |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |
| 4,193,120 A | 3/1980 | Yello |
| 4,203,130 A | 5/1980 | Doumit et al. |
| 4,205,343 A | 5/1980 | Barrett |
| 4,206,483 A | 6/1980 | Nakamura |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,267,563 A | 5/1981 | Sato et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,300,040 A | 11/1981 | Gould et al. |
| 4,305,101 A | 12/1981 | Yarbrough et al. |
| 4,310,924 A | 1/1982 | Miyasaka et al. |
| 4,325,081 A | 4/1982 | Abe et al. |
| 4,329,684 A | 5/1982 | Monteath et al. |
| 4,331,974 A | 5/1982 | Cogswell et al. |
| 4,334,242 A | 6/1982 | Mangold |
| 4,337,480 A | 6/1982 | Bourassin et al. |
| 4,337,482 A | 6/1982 | Coutta |
| 4,337,483 A | 6/1982 | Guillou |
| 4,344,090 A | 8/1982 | Belisomi et al. |
| 4,355,415 A | 10/1982 | George et al. |
| 4,367,557 A | 1/1983 | Stern et al. |
| 4,367,559 A | 1/1983 | Tults |
| 4,375,651 A | 3/1983 | Templin et al. |
| 4,381,522 A | 4/1983 | Lambert |
| 4,385,210 A | 5/1983 | Marquiss |
| 4,388,645 A | 6/1983 | Cox et al. |
| 4,390,901 A | 6/1983 | Keiser |
| 4,393,376 A | 7/1983 | Thomas |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,435,842 A | 3/1984 | Mayumi et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,475,153 A | 10/1984 | Kihara et al. |
| 4,477,830 A | 10/1984 | Lindman et al. |
| 4,488,179 A | 12/1984 | Krüger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,519,003 A | 5/1985 | Scholz |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,755 A | 11/1985 | Kurosawa et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,593,414 A | 6/1986 | Koyanagi |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,859 A | 9/1986 | Rockley |
| 4,611,269 A | 9/1986 | Suzuki et al. |
| 4,620,229 A | 10/1986 | Amano et al. |
| 4,621,259 A | 11/1986 | Schepers et al. |
| 4,622,545 A | 11/1986 | Atkinson |
| 4,625,080 A | 11/1986 | Scott |
| 4,631,601 A | 12/1986 | Brugliera et al. |
| 4,635,109 A | 1/1987 | Comeau |
| 4,635,121 A | 1/1987 | Hoffman et al. |
| 4,641,205 A | 2/1987 | Beyers, Jr. |
| 4,645,873 A | 2/1987 | Chomet |
| 4,677,466 A | 6/1987 | Lert, Jr. et al. |
| 4,677,501 A | 6/1987 | Saltzman et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| RE32,632 E | 3/1988 | Atkinson |
| 4,729,027 A | 3/1988 | Hakamada et al. |
| 4,729,028 A | 3/1988 | Micic et al. |
| 4,734,769 A | 3/1988 | Davis |
| 4,745,549 A | 5/1988 | Hashimoto |
| 4,746,983 A | 5/1988 | Hakamada |
| 4,748,618 A | 5/1988 | Brown et al. |
| 4,750,036 A | 6/1988 | Martinez |
| 4,750,213 A | 6/1988 | Novak |

(56) References Cited

U.S. PATENT DOCUMENTS

| | | |
|---|---|---|
| 4,751,578 A | 6/1988 | Reiter et al. |
| 4,754,326 A | 6/1988 | Kram et al. |
| 4,755,883 A | 7/1988 | Uehira |
| 4,761,684 A | 8/1988 | Clark et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,832,373 A | 5/1989 | Swan |
| 4,833,710 A | 5/1989 | Hirashima |
| 4,843,482 A | 6/1989 | Hegendorfer |
| 4,847,604 A | 7/1989 | Doyle |
| 4,847,698 A | 7/1989 | Freeman |
| 4,847,699 A | 7/1989 | Freeman |
| 4,847,700 A | 7/1989 | Freeman |
| 4,847,744 A | 7/1989 | Araki |
| 4,855,813 A | 8/1989 | Russell et al. |
| 4,857,999 A | 8/1989 | Welsh |
| 4,862,268 A | 8/1989 | Campbell et al. |
| 4,864,429 A | 9/1989 | Eigeldinger et al. |
| 4,866,258 A | 9/1989 | Ueda et al. |
| 4,866,542 A | 9/1989 | Shimada et al. |
| 4,873,584 A | 10/1989 | Hashimoto |
| 4,873,623 A | 10/1989 | Lane et al. |
| 4,876,600 A | 10/1989 | Pietzsch et al. |
| 4,879,611 A | 11/1989 | Fukui et al. |
| 4,882,732 A | 11/1989 | Kaminaga |
| 4,884,223 A | 11/1989 | Ingle et al. |
| 4,885,579 A | 12/1989 | Sandbank |
| 4,887,152 A | 12/1989 | Matsuzaki et al. |
| 4,888,796 A | 12/1989 | Olivo, Jr. |
| 4,890,168 A | 12/1989 | Inoue et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,899,370 A | 2/1990 | Kameo et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,918,531 A | 4/1990 | Johnson |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,945,563 A | 7/1990 | Horton et al. |
| 4,954,882 A | 9/1990 | Kamemoto |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,782 A | 2/1991 | Sakamoto et al. |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,005,084 A | 4/1991 | Skinner |
| 5,008,853 A | 4/1991 | Bly et al. |
| 5,012,409 A | 4/1991 | Fletcher et al. |
| 5,014,125 A | 5/1991 | Pocock et al. |
| 5,016,273 A | 5/1991 | Hoff |
| 5,023,721 A | 6/1991 | Moon-Hwan |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,040,067 A | 8/1991 | Yamazaki |
| 5,045,947 A | 9/1991 | Beery |
| 5,046,092 A | 9/1991 | Walker et al. |
| 5,047,867 A | 9/1991 | Strubbe et al. |
| 5,058,160 A | 10/1991 | Banker et al. |
| 5,062,060 A | 10/1991 | Kolnick |
| 5,068,733 A | 11/1991 | Bennett |
| 5,068,734 A | 11/1991 | Beery |
| 5,072,412 A | 12/1991 | Henderson, Jr. et al. |
| 5,075,771 A | 12/1991 | Hashimoto |
| 5,083,205 A | 1/1992 | Arai |
| 5,083,800 A | 1/1992 | Lockton |
| 5,089,885 A | 2/1992 | Clark |
| 5,090,049 A | 2/1992 | Chen |
| 5,091,785 A | 2/1992 | Canfield et al. |
| 5,093,718 A | 3/1992 | Hoarty et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,109,414 A | 4/1992 | Harvey et al. |
| 5,113,259 A | 5/1992 | Romesburg et al. |
| 5,119,188 A | 6/1992 | McCalley et al. |
| 5,119,577 A | 6/1992 | Lilly |
| 5,121,476 A | 6/1992 | Yee |
| 5,123,046 A | 6/1992 | Levine |
| 5,126,851 A | 6/1992 | Yoshimura et al. |
| 5,128,766 A | 7/1992 | Choi |
| 5,132,992 A | 7/1992 | Yurt et al. |
| 5,134,719 A | 7/1992 | Mankovitz |
| 5,146,335 A | 9/1992 | Kim et al. |
| 5,148,154 A | 9/1992 | MacKay et al. |
| 5,148,275 A | 9/1992 | Blatter et al. |
| 5,151,782 A | 9/1992 | Ferraro |
| 5,151,789 A | 9/1992 | Young |
| 5,152,012 A | 9/1992 | Schwob |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,172,413 A | 12/1992 | Bradley et al. |
| 5,177,604 A | 1/1993 | Martinez |
| 5,179,439 A | 1/1993 | Hashimoto et al. |
| 5,179,654 A | 1/1993 | Richards et al. |
| 5,182,646 A | 1/1993 | Keenan |
| 5,187,589 A | 2/1993 | Kono et al. |
| 5,189,630 A | 2/1993 | Barstow et al. |
| 5,191,423 A | 3/1993 | Yoshida et al. |
| 5,194,941 A | 3/1993 | Grimaldi et al. |
| 5,195,092 A | 3/1993 | Wilson et al. |
| 5,195,134 A | 3/1993 | Inoue et al. |
| 5,200,822 A | 4/1993 | Bronfin et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |

(56) References Cited

U.S. PATENT DOCUMENTS

| | | |
|---|---|---|
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,241,428 A | 8/1993 | Goldwasser et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,249,043 A | 9/1993 | Grandmougin et al. |
| 5,251,921 A | 10/1993 | Daniels |
| 5,252,860 A | 10/1993 | McCarty et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,561 A | 2/1994 | Lumelsky et al. |
| 5,283,639 A | 2/1994 | Esch et al. |
| 5,283,819 A | 2/1994 | Glick et al. |
| 5,285,265 A | 2/1994 | Choi et al. |
| 5,285,278 A | 2/1994 | Holman |
| 5,285,284 A | 2/1994 | Takashima et al. |
| 5,293,357 A | 3/1994 | Hallenbeck |
| 5,295,242 A | 3/1994 | Mashruwala et al. |
| 5,296,931 A | 3/1994 | Na et al. |
| 5,297,204 A | 3/1994 | Levine |
| 5,299,006 A | 3/1994 | Kim et al. |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,315,392 A | 5/1994 | Ishikawa et al. |
| 5,317,391 A | 5/1994 | Banker et al. |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,339,434 A | 8/1994 | Rusis |
| 5,341,350 A | 8/1994 | Frank et al. |
| 5,343,239 A | 8/1994 | Lappington et al. |
| 5,345,430 A | 9/1994 | Moe |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,355,162 A | 10/1994 | Yazolino et al. |
| 5,357,276 A | 10/1994 | Banker et al. |
| 5,359,367 A | 10/1994 | Stockill |
| 5,359,601 A | 10/1994 | Wasilewski et al. |
| 5,361,091 A | 11/1994 | Hoarty et al. |
| 5,365,282 A | 11/1994 | Levine |
| 5,367,316 A | 11/1994 | Ikezaki |
| 5,367,330 A | 11/1994 | Haave et al. |
| 5,371,551 A | 12/1994 | Logan et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,970 A | 1/1995 | Kiefl |
| 5,382,983 A | 1/1995 | Kwoh et al. |
| 5,384,910 A | 1/1995 | Torres |
| 5,387,945 A | 2/1995 | Takeuchi |
| 5,389,964 A | 2/1995 | Oberle et al. |
| 5,390,027 A | 2/1995 | Henmi et al. |
| 5,396,546 A | 3/1995 | Remillard |
| 5,398,074 A | 3/1995 | Duffield et al. |
| 5,398,138 A | 3/1995 | Tomita |
| 5,404,393 A | 4/1995 | Remillard |
| 5,404,567 A | 4/1995 | DePietro et al. |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,422,389 A | 6/1995 | Trepka et al. |
| 5,424,770 A | 6/1995 | Schmelzer et al. |
| 5,425,101 A | 6/1995 | Woo et al. |
| 5,426,699 A | 6/1995 | Wunderlich et al. |
| 5,428,406 A | 6/1995 | Terasawa |
| 5,432,561 A | 7/1995 | Strubbe |
| 5,434,625 A | 7/1995 | Willis |
| 5,434,626 A | 7/1995 | Hayashi et al. |
| 5,434,678 A | 7/1995 | Abecassis |
| 5,436,676 A | 7/1995 | Pint et al. |
| 5,438,355 A | 8/1995 | Palmer |
| 5,438,372 A | 8/1995 | Tsumori et al. |
| 5,438,423 A | 8/1995 | Lynch et al. |
| 5,440,678 A | 8/1995 | Eisen et al. |
| 5,442,389 A | 8/1995 | Blahut et al. |
| 5,444,499 A | 8/1995 | Saitoh |
| 5,446,919 A | 8/1995 | Wilkins |
| 5,452,012 A | 9/1995 | Saitoh |
| 5,453,146 A | 9/1995 | Kemper |
| 5,453,796 A | 9/1995 | Duffield et al. |
| 5,455,570 A | 10/1995 | Cook et al. |
| 5,457,478 A | 10/1995 | Frank |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,468,948 A | 11/1995 | Koenck et al. |
| 5,469,206 A | 11/1995 | Strubbe et al. |
| 5,473,442 A | 12/1995 | Kim et al. |
| 5,477,262 A | 12/1995 | Banker et al. |
| 5,479,266 A | 12/1995 | Young et al. |
| 5,479,268 A | 12/1995 | Young et al. |
| 5,479,302 A | 12/1995 | Haines |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,485,518 A | 1/1996 | Hunter et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,517,257 A | 5/1996 | Dunn et al. |
| 5,521,589 A | 5/1996 | Mondrosch et al. |
| 5,523,791 A | 6/1996 | Berman |
| 5,523,794 A | 6/1996 | Mankovitz et al. |
| 5,523,795 A | 6/1996 | Ueda |
| 5,523,796 A | 6/1996 | Marshall et al. |
| 5,524,195 A | 6/1996 | Clanton, III et al. |
| 5,524,271 A | 6/1996 | Hollmann et al. |
| 5,525,795 A | 6/1996 | MacGregor et al. |
| 5,526,034 A | 6/1996 | Hoarty et al. |
| 5,526,035 A | 6/1996 | Lappington et al. |
| 5,526,257 A | 6/1996 | Lerner |
| 5,527,257 A | 6/1996 | Piramoon |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |

(56) References Cited

U.S. PATENT DOCUMENTS

| | | |
|---|---|---|
| 5,539,479 A | 7/1996 | Bertram |
| 5,539,822 A | 7/1996 | Lett |
| 5,539,880 A | 7/1996 | Lakhani |
| 5,541,662 A | 7/1996 | Adams et al. |
| 5,541,738 A | 7/1996 | Mankovitz |
| 5,543,929 A | 8/1996 | Mankovitz et al. |
| 5,543,933 A | 8/1996 | Kang et al. |
| 5,544,321 A | 8/1996 | Theimer et al. |
| 5,546,521 A | 8/1996 | Martinez |
| 5,548,338 A | 8/1996 | Ellis et al. |
| 5,548,345 A | 8/1996 | Brian et al. |
| 5,550,576 A | 8/1996 | Klosterman |
| 5,550,578 A | 8/1996 | Hoarty et al. |
| 5,550,825 A | 8/1996 | McMullan, Jr. et al. |
| 5,550,863 A | 8/1996 | Yurt et al. |
| 5,553,221 A | 9/1996 | Reimer et al. |
| 5,557,338 A | 9/1996 | Maze et al. |
| 5,557,721 A | 9/1996 | Fite et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,559,949 A | 9/1996 | Reimer et al. |
| 5,561,471 A | 10/1996 | Kim |
| 5,561,709 A | 10/1996 | Remillard |
| 5,563,665 A | 10/1996 | Chang |
| 5,568,272 A | 10/1996 | Levine |
| 5,570,295 A | 10/1996 | Isenberg et al. |
| 5,572,442 A | 11/1996 | Schulhof et al. |
| 5,574,778 A | 11/1996 | Ely et al. |
| 5,574,962 A | 11/1996 | Fardeau et al. |
| 5,576,755 A | 11/1996 | Davis et al. |
| 5,576,951 A | 11/1996 | Lockwood |
| 5,579,055 A | 11/1996 | Hamilton et al. |
| 5,579,239 A | 11/1996 | Freeman et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,576 A | 12/1996 | Perlman et al. |
| 5,583,653 A | 12/1996 | Timmermans et al. |
| 5,584,025 A | 12/1996 | Keithley et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,592,571 A | 1/1997 | Peters |
| 5,594,490 A | 1/1997 | Dawson et al. |
| 5,594,491 A | 1/1997 | Hodge et al. |
| 5,594,492 A | 1/1997 | O'Callaghan et al. |
| 5,594,507 A | 1/1997 | Hoarty |
| 5,594,509 A | 1/1997 | Florin et al. |
| 5,594,661 A | 1/1997 | Bruner et al. |
| 5,594,779 A | 1/1997 | Goodman |
| 5,595,865 A | 1/1997 | Possanza et al. |
| 5,596,373 A | 1/1997 | White et al. |
| 5,596,705 A | 1/1997 | Reimer et al. |
| 5,598,523 A | 1/1997 | Fujita |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,602,600 A | 2/1997 | Queinnec |
| 5,604,542 A | 2/1997 | Dedrick |
| 5,606,374 A | 2/1997 | Bertram |
| 5,606,642 A | 2/1997 | Stautner et al. |
| 5,608,448 A | 3/1997 | Smoral et al. |
| 5,610,653 A | 3/1997 | Abecassis |
| 5,610,664 A | 3/1997 | Bobert |
| 5,616,876 A | 4/1997 | Cluts |
| 5,617,526 A | 4/1997 | Oran et al. |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,621,579 A | 4/1997 | Yuen |
| 5,623,613 A | 4/1997 | Rowe et al. |
| 5,625,406 A | 4/1997 | Newberry et al. |
| 5,625,464 A | 4/1997 | Compoint et al. |
| 5,625,678 A | 4/1997 | Blomfield-Brown |
| 5,625,693 A | 4/1997 | Rohatgi et al. |
| 5,627,940 A | 5/1997 | Rohra et al. |
| 5,629,733 A | 5/1997 | Youman et al. |
| 5,629,867 A | 5/1997 | Goldman |
| 5,630,119 A | 5/1997 | Aristides et al. |
| 5,631,995 A | 5/1997 | Weissensteiner et al. |
| 5,632,007 A | 5/1997 | Freeman |
| 5,633,683 A | 5/1997 | Rosengren et al. |
| 5,634,051 A | 5/1997 | Thomson |
| 5,635,978 A | 6/1997 | Alten et al. |
| 5,635,979 A | 6/1997 | Kostreski et al. |
| 5,635,987 A | 6/1997 | Park et al. |
| 5,635,989 A | 6/1997 | Rothmuller |
| 5,636,346 A | 6/1997 | Saxe |
| 5,638,522 A | 6/1997 | Dunsmuir et al. |
| 5,640,002 A | 6/1997 | Ruppert et al. |
| 5,640,484 A | 6/1997 | Mankovitz |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,651,129 A | 7/1997 | Yokote et al. |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,657,414 A | 8/1997 | Lett et al. |
| 5,659,350 A | 8/1997 | Hendricks et al. |
| 5,659,366 A | 8/1997 | Kerman |
| 5,659,367 A | 8/1997 | Yuen |
| 5,659,742 A | 8/1997 | Beattie et al. |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,671,607 A | 9/1997 | Clemens et al. |
| 5,675,390 A | 10/1997 | Schindler et al. |
| 5,675,743 A | 10/1997 | Mavity |
| 5,675,752 A | 10/1997 | Scott et al. |
| 5,677,708 A | 10/1997 | Matthews, III et al. |
| 5,677,981 A | 10/1997 | Kato et al. |
| 5,682,195 A | 10/1997 | Hendricks et al. |
| 5,682,196 A | 10/1997 | Freeman |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,663 A | 11/1997 | Williams |
| 5,689,666 A | 11/1997 | Berquist et al. |
| 5,691,476 A | 11/1997 | Madaras |
| 5,692,214 A | 11/1997 | Levine |
| 5,692,335 A | 12/1997 | Magnuson |
| 5,694,163 A | 12/1997 | Harrison |

(56) References Cited

U.S. PATENT DOCUMENTS

| | | |
|---|---|---|
| 5,694,176 A | 12/1997 | Bruette et al. |
| 5,694,381 A | 12/1997 | Sako |
| 5,696,765 A | 12/1997 | Safadi |
| 5,696,905 A | 12/1997 | Reimer et al. |
| 5,699,052 A | 12/1997 | Miyahara |
| 5,699,107 A | 12/1997 | Lawler et al. |
| 5,699,125 A | 12/1997 | Rzeszewski et al. |
| 5,699,528 A | 12/1997 | Hogan |
| 5,701,383 A | 12/1997 | Russo et al. |
| 5,703,604 A | 12/1997 | McCutchen |
| 5,708,478 A | 1/1998 | Tognazzini |
| 5,708,767 A | 1/1998 | Yeo et al. |
| 5,708,780 A | 1/1998 | Levergood et al. |
| 5,708,961 A | 1/1998 | Hylton et al. |
| 5,710,601 A | 1/1998 | Marshall et al. |
| 5,710,815 A | 1/1998 | Ming et al. |
| 5,710,884 A | 1/1998 | Dedrick |
| 5,715,314 A | 2/1998 | Payne et al. |
| 5,715,399 A | 2/1998 | Bezos |
| 5,717,452 A | 2/1998 | Janin et al. |
| 5,717,923 A | 2/1998 | Dedrick |
| 5,721,829 A | 2/1998 | Dunn et al. |
| 5,722,041 A | 2/1998 | Freadman |
| 5,724,091 A | 3/1998 | Freeman et al. |
| 5,724,103 A | 3/1998 | Batchelor |
| 5,724,521 A | 3/1998 | Dedrick |
| 5,724,525 A | 3/1998 | Beyers, II et al. |
| 5,724,567 A | 3/1998 | Rose et al. |
| 5,726,702 A | 3/1998 | Hamaguchi et al. |
| 5,727,060 A | 3/1998 | Young |
| 5,727,163 A | 3/1998 | Bezos |
| 5,731,844 A | 3/1998 | Rauch et al. |
| 5,732,216 A | 3/1998 | Logan et al. |
| 5,734,119 A | 3/1998 | France et al. |
| 5,734,444 A | 3/1998 | Yoshinobu |
| 5,734,720 A | 3/1998 | Salganicoff |
| 5,734,853 A | 3/1998 | Hendricks et al. |
| 5,734,893 A | 3/1998 | Li et al. |
| 5,737,028 A | 4/1998 | Bertram et al. |
| 5,737,029 A | 4/1998 | Ohkura et al. |
| 5,737,030 A | 4/1998 | Hong et al. |
| 5,737,552 A | 4/1998 | Lavallee et al. |
| 5,740,231 A | 4/1998 | Cohn et al. |
| 5,740,549 A | 4/1998 | Reilly et al. |
| 5,742,443 A | 4/1998 | Tsao et al. |
| 5,742,816 A | 4/1998 | Barr et al. |
| 5,745,710 A | 4/1998 | Clanton, III et al. |
| 5,748,191 A | 5/1998 | Rozak et al. |
| 5,748,716 A | 5/1998 | Levine |
| 5,749,043 A | 5/1998 | Worthy |
| 5,749,081 A | 5/1998 | Whiteis |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,761,607 A | 6/1998 | Gudesen et al. |
| 5,768,528 A | 6/1998 | Stumm |
| 5,771,354 A | 6/1998 | Crawford |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,666 A | 6/1998 | Portuesi |
| 5,774,859 A | 6/1998 | Houser et al. |
| 5,774,887 A | 6/1998 | Wolff et al. |
| 5,778,181 A | 7/1998 | Hidary et al. |
| 5,778,182 A | 7/1998 | Cathey et al. |
| 5,778,187 A | 7/1998 | Monteiro et al. |
| 5,781,226 A | 7/1998 | Sheehan |
| 5,781,227 A | 7/1998 | Goode et al. |
| 5,781,228 A | 7/1998 | Sposato |
| 5,781,245 A | 7/1998 | Van Der Weij et al. |
| 5,781,246 A | 7/1998 | Alten et al. |
| 5,781,734 A | 7/1998 | Ohno et al. |
| 5,784,258 A | 7/1998 | Quinn |
| 5,787,259 A | 7/1998 | Haroun et al. |
| 5,788,507 A | 8/1998 | Redford et al. |
| 5,790,198 A | 8/1998 | Roop et al. |
| 5,790,201 A | 8/1998 | Antos |
| 5,790,202 A | 8/1998 | Kummer et al. |
| 5,790,423 A | 8/1998 | Lau et al. |
| 5,790,426 A | 8/1998 | Robinson |
| 5,790,753 A | 8/1998 | Krishnamoorthy et al. |
| 5,790,835 A | 8/1998 | Case et al. |
| 5,790,935 A | 8/1998 | Payton |
| 5,790,952 A | 8/1998 | Seazholtz et al. |
| 5,793,364 A | 8/1998 | Bolanos et al. |
| 5,793,409 A | 8/1998 | Tetsumura |
| 5,793,438 A | 8/1998 | Bedard |
| 5,793,964 A | 8/1998 | Rogers et al. |
| 5,793,971 A | 8/1998 | Fujita et al. |
| 5,793,972 A | 8/1998 | Shane et al. |
| 5,794,217 A | 8/1998 | Allen |
| 5,796,952 A | 8/1998 | Davis et al. |
| 5,797,011 A | 8/1998 | Kroll et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,155 A | 9/1998 | Allibhoy et al. |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,214 A | 9/1998 | Nureki et al. |
| 5,809,242 A | 9/1998 | Shaw et al. |
| 5,809,246 A | 9/1998 | Goldman |
| 5,809,471 A | 9/1998 | Brodsky |
| 5,812,123 A | 9/1998 | Rowe et al. |
| 5,812,124 A | 9/1998 | Eick et al. |
| 5,812,205 A | 9/1998 | Milnes et al. |
| 5,812,505 A | 9/1998 | Shimoda et al. |
| 5,812,931 A | 9/1998 | Yuen |
| 5,812,937 A | 9/1998 | Takahisa et al. |
| 5,815,145 A | 9/1998 | Matthews, III |
| 5,815,146 A | 9/1998 | Youden et al. |
| 5,815,662 A | 9/1998 | Ong |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,541 A | 10/1998 | Matsuura et al. |
| 5,818,935 A | 10/1998 | Maa |
| 5,819,019 A | 10/1998 | Nelson |
| 5,819,156 A | 10/1998 | Belmont |
| 5,819,160 A | 10/1998 | Foladare et al. |
| 5,819,284 A | 10/1998 | Farber et al. |
| 5,819,285 A | 10/1998 | Damico et al. |
| 5,822,123 A | 10/1998 | Davis et al. |
| 5,822,530 A | 10/1998 | Brown |
| 5,825,407 A | 10/1998 | Cowe et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |

(56) References Cited

U.S. PATENT DOCUMENTS

| | | | |
|---|---|---|---|
| 5,832,223 A | 11/1998 | Hara et al. | |
| 5,833,468 A | 11/1998 | Guy et al. | |
| 5,835,717 A | 11/1998 | Karlton et al. | |
| 5,838,314 A | 11/1998 | Neel et al. | |
| 5,838,383 A | 11/1998 | Chimoto et al. | |
| 5,838,419 A | 11/1998 | Holland | |
| 5,841,979 A | 11/1998 | Schulhof et al. | |
| 5,842,010 A | 11/1998 | Jain et al. | |
| 5,842,199 A | 11/1998 | Miller et al. | |
| 5,844,552 A | 12/1998 | Gaughan et al. | |
| 5,844,620 A | 12/1998 | Coleman et al. | |
| 5,847,750 A | 12/1998 | Srivastava et al. | |
| 5,848,352 A | 12/1998 | Dougherty et al. | |
| 5,848,396 A | 12/1998 | Gerace | |
| 5,848,397 A | 12/1998 | Marsh et al. | |
| 5,850,218 A | 12/1998 | LaJoie et al. | |
| 5,851,149 A | 12/1998 | Xidos et al. | |
| 5,852,437 A | 12/1998 | Wugofski et al. | |
| 5,861,881 A | 1/1999 | Freeman et al. | |
| 5,861,906 A | 1/1999 | Dunn et al. | |
| 5,862,292 A | 1/1999 | Kubota et al. | |
| 5,864,823 A | 1/1999 | Levitan | |
| 5,867,226 A | 2/1999 | Wehmeyer et al. | |
| 5,867,227 A | 2/1999 | Yamaguchi | |
| 5,867,228 A | 2/1999 | Miki et al. | |
| 5,867,233 A | 2/1999 | Tanaka et al. | |
| 5,870,543 A | 2/1999 | Ronning | |
| 5,870,754 A | 2/1999 | Dimitrova et al. | |
| 5,872,588 A | 2/1999 | Aras et al. | |
| 5,873,660 A | 2/1999 | Walsh et al. | |
| 5,874,985 A | 2/1999 | Matthews, III | |
| 5,875,108 A | 2/1999 | Hoffberg et al. | |
| 5,877,906 A | 3/1999 | Nagasawa et al. | |
| 5,880,720 A | 3/1999 | Iwafune et al. | |
| 5,880,768 A | 3/1999 | Lemmons et al. | |
| 5,881,245 A | 3/1999 | Thompson | |
| 5,883,621 A | 3/1999 | Iwamura | |
| 5,883,677 A | 3/1999 | Hofmann | |
| 5,884,028 A | 3/1999 | Kindell et al. | |
| 5,886,691 A | 3/1999 | Furuya et al. | |
| 5,886,707 A | 3/1999 | Berg | |
| 5,886,731 A | 3/1999 | Ebisawa | |
| 5,886,732 A | 3/1999 | Humpleman | |
| 5,887,243 A | 3/1999 | Harvey et al. | |
| 5,889,950 A | 3/1999 | Kuzma | |
| 5,890,138 A | 3/1999 | Godin et al. | |
| 5,892,498 A | 4/1999 | Marshall et al. | |
| 5,892,535 A | 4/1999 | Allen et al. | |
| 5,892,536 A | 4/1999 | Logan et al. | |
| 5,892,767 A | 4/1999 | Bell et al. | |
| 5,892,915 A | 4/1999 | Duso et al. | |
| 5,894,589 A | 4/1999 | Reber et al. | |
| 5,895,474 A | 4/1999 | Maarek et al. | |
| 5,896,414 A | 4/1999 | Meyer et al. | |
| 5,898,441 A | 4/1999 | Flurry | |
| 5,898,456 A | 4/1999 | Wahl | |
| 5,899,582 A | 5/1999 | DuLac | |
| 5,899,920 A | 5/1999 | DeSatnick et al. | |
| 5,900,867 A | 5/1999 | Schindler et al. | |
| 5,900,904 A | 5/1999 | Okada et al. | |
| 5,900,905 A | 5/1999 | Shoff et al. | |
| 5,903,234 A | 5/1999 | Kimura | |
| 5,903,263 A | 5/1999 | Emura | |
| 5,903,264 A | 5/1999 | Moeller et al. | |
| 5,903,314 A | 5/1999 | Niijima et al. | |
| 5,903,545 A | 5/1999 | Sabourin et al. | |
| 5,903,816 A | 5/1999 | Broadwin et al. | |
| 5,905,497 A | 5/1999 | Vaughan et al. | |
| 5,905,522 A | 5/1999 | Lawler | |
| 5,905,847 A | 5/1999 | Kobayashi et al. | |
| 5,905,865 A | 5/1999 | Palmer et al. | |
| 5,907,322 A | 5/1999 | Kelly et al. | |
| 5,907,323 A | 5/1999 | Lawler et al. | |
| 5,907,366 A | 5/1999 | Farmer et al. | |
| 5,909,638 A | 6/1999 | Allen | |
| 5,911,046 A | 6/1999 | Amano | |
| 5,912,664 A | 6/1999 | Eick et al. | |
| 5,913,039 A | 6/1999 | Nakamura et al. | |
| 5,914,712 A | 6/1999 | Sartain et al. | |
| 5,914,746 A | 6/1999 | Matthews, III et al. | |
| 5,914,941 A | 6/1999 | Janky | |
| 5,915,026 A | 6/1999 | Mankovitz | |
| 5,915,090 A | 6/1999 | Joseph et al. | |
| 5,915,094 A | 6/1999 | Kouloheris et al. | |
| 5,915,243 A | 6/1999 | Smolen | |
| 5,915,250 A | 6/1999 | Jain et al. | |
| 5,916,303 A | 6/1999 | Scott | |
| 5,917,481 A | 6/1999 | Rzeszewski et al. | |
| 5,917,538 A | 6/1999 | Asamizuya | |
| 5,917,830 A | 6/1999 | Chen et al. | |
| 5,917,835 A | 6/1999 | Barrett et al. | |
| 5,918,014 A | 6/1999 | Robinson | |
| 5,920,700 A | 7/1999 | Gordon et al. | |
| 5,920,702 A | 7/1999 | Bleidt et al. | |
| 5,920,800 A | 7/1999 | Schafer | |
| 5,922,045 A | 7/1999 | Hanson | |
| 5,922,048 A | 7/1999 | Emura | |
| 5,922,071 A | 7/1999 | Taylor et al. | |
| 5,923,361 A | 7/1999 | Sutton, Jr. | |
| 5,923,848 A | 7/1999 | Goodhand et al. | |
| 5,926,204 A | 7/1999 | Mayer | |
| 5,926,205 A | 7/1999 | Krause et al. | |
| 5,926,624 A | 7/1999 | Katz et al. | |
| 5,928,327 A | 7/1999 | Wang et al. | |
| 5,929,849 A | 7/1999 | Kikinis | |
| 5,929,850 A | 7/1999 | Broadwin et al. | |
| 5,929,932 A | 7/1999 | Otsuki et al. | |
| 5,930,473 A | 7/1999 | Teng et al. | |
| 5,930,493 A | 7/1999 | Ottesen et al. | |
| 5,931,901 A | 8/1999 | Wolfe et al. | |
| 5,931,905 A | 8/1999 | Hashimoto et al. | |
| 5,933,603 A | 8/1999 | Vahalia et al. | |
| 5,933,835 A | 8/1999 | Adams et al. | |
| 5,935,206 A | 8/1999 | Dixon et al. | |
| 5,936,569 A | 8/1999 | St.ang.hle et al. | |
| 5,936,614 A | 8/1999 | An et al. | |
| 5,936,679 A | 8/1999 | Kasahara et al. | |
| 5,937,160 A | 8/1999 | Davis et al. | |
| 5,939,695 A | 8/1999 | Nelson | |
| 5,940,071 A | 8/1999 | Treffers et al. | |
| 5,940,073 A | 8/1999 | Klosterman et al. | |
| 5,940,572 A | 8/1999 | Balaban et al. | |
| 5,940,614 A | 8/1999 | Allen et al. | |
| 5,943,046 A | 8/1999 | Cave et al. | |
| 5,943,047 A | 8/1999 | Suzuki | |
| 5,945,987 A | 8/1999 | Dunn | |
| 5,945,988 A | 8/1999 | Williams et al. | |
| 5,946,386 A | 8/1999 | Rogers et al. | |
| 5,946,678 A | 8/1999 | Aalbersberg | |
| 5,947,746 A | 9/1999 | Tsai | |
| 5,947,867 A | 9/1999 | Gierer et al. | |
| 5,949,411 A | 9/1999 | Doerr et al. | |
| 5,949,954 A | 9/1999 | Young et al. | |
| 5,951,642 A | 9/1999 | Onoe et al. | |
| 5,953,005 A | 9/1999 | Liu | |
| 5,955,988 A | 9/1999 | Blonstein et al. | |
| 5,956,482 A | 9/1999 | Agraharam et al. | |
| 5,956,716 A | 9/1999 | Kenner et al. | |
| 5,959,592 A | 9/1999 | Petruzzelli | |
| 5,959,659 A | 9/1999 | Dokic | |
| 5,959,688 A | 9/1999 | Schein et al. | |
| 5,960,411 A | 9/1999 | Hartman et al. | |
| 5,961,603 A | 10/1999 | Kunkel et al. | |
| 5,963,202 A | 10/1999 | Polish | |
| 5,963,264 A | 10/1999 | Jackson | |
| 5,963,645 A | 10/1999 | Kigawa et al. | |
| 5,964,455 A | 10/1999 | Catanzarite et al. | |
| 5,969,714 A | 10/1999 | Butcher | |
| 5,969,748 A | 10/1999 | Casement et al. | |
| 5,970,486 A | 10/1999 | Yoshida et al. | |
| 5,973,680 A | 10/1999 | Ueda | |
| 5,973,683 A | 10/1999 | Cragun et al. | |
| 5,973,722 A | 10/1999 | Wakai et al. | |
| 5,974,217 A | 10/1999 | Haraguchi | |

(56) References Cited

U.S. PATENT DOCUMENTS

| | | |
|---|---|---|
| 5,974,222 A | 10/1999 | Yuen et al. |
| 5,977,963 A | 11/1999 | Gaughan et al. |
| 5,977,964 A | 11/1999 | Williams et al. |
| 5,978,044 A | 11/1999 | Choi |
| 5,978,567 A | 11/1999 | Rebane et al. |
| 5,978,843 A | 11/1999 | Wu et al. |
| 5,983,236 A | 11/1999 | Yager et al. |
| 5,986,650 A | 11/1999 | Ellis et al. |
| 5,987,213 A | 11/1999 | Mankovitz et al. |
| 5,987,509 A | 11/1999 | Portuesi |
| 5,987,621 A | 11/1999 | Duso et al. |
| 5,988,078 A | 11/1999 | Levine |
| 5,990,881 A | 11/1999 | Inoue et al. |
| 5,990,890 A | 11/1999 | Etheredge |
| 5,990,927 A | 11/1999 | Hendricks et al. |
| 5,991,498 A | 11/1999 | Young |
| 5,991,735 A | 11/1999 | Gerace |
| 5,991,799 A | 11/1999 | Yen et al. |
| 5,995,092 A | 11/1999 | Yuen et al. |
| 5,995,155 A | 11/1999 | Schindler et al. |
| 5,997,964 A | 12/1999 | Klima, Jr. |
| 5,999,698 A | 12/1999 | Nakai et al. |
| 5,999,912 A | 12/1999 | Wodarz et al. |
| 5,999,970 A | 12/1999 | Krisbergh et al. |
| 6,002,393 A | 12/1999 | Hite et al. |
| 6,002,394 A | 12/1999 | Schein et al. |
| 6,002,443 A | 12/1999 | Iggulden |
| 6,002,444 A | 12/1999 | Marshall et al. |
| 6,002,720 A | 12/1999 | Yurt et al. |
| 6,003,030 A | 12/1999 | Kenner et al. |
| 6,005,561 A | 12/1999 | Hawkins et al. |
| 6,005,562 A | 12/1999 | Shiga et al. |
| 6,005,563 A | 12/1999 | White et al. |
| 6,005,564 A | 12/1999 | Ahmad et al. |
| 6,005,565 A | 12/1999 | Legall et al. |
| 6,005,566 A | 12/1999 | Jones et al. |
| 6,005,597 A | 12/1999 | Barrett et al. |
| 6,005,600 A | 12/1999 | Hill |
| 6,005,631 A | 12/1999 | Anderson et al. |
| 6,006,218 A | 12/1999 | Breese et al. |
| 6,006,257 A | 12/1999 | Slezak |
| 6,008,802 A | 12/1999 | Iki et al. |
| 6,008,803 A | 12/1999 | Rowe et al. |
| 6,008,836 A | 12/1999 | Bruck et al. |
| 6,009,465 A | 12/1999 | Decker et al. |
| 6,011,546 A | 1/2000 | Bertram |
| 6,012,086 A | 1/2000 | Lowell |
| 6,012,089 A | 1/2000 | Hasegawa |
| 6,012,091 A | 1/2000 | Boyce |
| 6,014,137 A | 1/2000 | Burns |
| 6,014,184 A | 1/2000 | Knee et al. |
| 6,014,381 A | 1/2000 | Troxel et al. |
| 6,014,502 A | 1/2000 | Moraes |
| 6,014,693 A | 1/2000 | Ito et al. |
| 6,014,694 A | 1/2000 | Aharoni et al. |
| 6,014,706 A | 1/2000 | Cannon et al. |
| 6,016,141 A | 1/2000 | Knudson et al. |
| 6,018,359 A | 1/2000 | Kermode et al. |
| 6,018,372 A | 1/2000 | Etheredge |
| 6,018,765 A | 1/2000 | Durana et al. |
| 6,018,768 A | 1/2000 | Ullman et al. |
| 6,020,880 A | 2/2000 | Naimpally |
| 6,020,883 A | 2/2000 | Herz et al. |
| 6,020,912 A | 2/2000 | De Lang |
| 6,020,929 A | 2/2000 | Marshall et al. |
| 6,022,223 A | 2/2000 | Taniguchi et al. |
| 6,023,267 A | 2/2000 | Chapuis et al. |
| 6,023,725 A | 2/2000 | Ozawa et al. |
| 6,025,837 A | 2/2000 | Matthews, III et al. |
| 6,025,868 A | 2/2000 | Russo |
| 6,025,886 A | 2/2000 | Koda |
| 6,028,599 A | 2/2000 | Yuen et al. |
| 6,028,600 A | 2/2000 | Rosin et al. |
| 6,029,045 A | 2/2000 | Picco et al. |
| 6,029,064 A | 2/2000 | Farris et al. |
| 6,029,176 A | 2/2000 | Cannon |
| 6,029,195 A | 2/2000 | Herz |
| 6,031,806 A | 2/2000 | Tomita |
| 6,035,091 A | 3/2000 | Kazo |
| 6,035,304 A | 3/2000 | Machida et al. |
| 6,037,933 A | 3/2000 | Blonstein et al. |
| 6,038,367 A | 3/2000 | Abecassis |
| 6,038,591 A | 3/2000 | Wolfe et al. |
| 6,047,317 A | 4/2000 | Bisdikian et al. |
| 6,049,539 A | 4/2000 | Lee et al. |
| 6,049,824 A | 4/2000 | Simonin |
| 6,052,145 A | 4/2000 | Macrae et al. |
| 6,057,872 A | 5/2000 | Candelore |
| 6,057,890 A | 5/2000 | Virden et al. |
| 6,058,238 A | 5/2000 | Ng |
| 6,061,060 A | 5/2000 | Berry et al. |
| 6,061,082 A | 5/2000 | Park |
| 6,061,097 A | 5/2000 | Satterfield |
| 6,061,719 A | 5/2000 | Bendinelli et al. |
| 6,064,376 A | 5/2000 | Berezowski et al. |
| 6,064,980 A | 5/2000 | Jacobi et al. |
| 6,065,047 A | 5/2000 | Carpenter et al. |
| 6,067,303 A | 5/2000 | Aaker et al. |
| 6,067,561 A | 5/2000 | Dillon |
| 6,072,460 A | 6/2000 | Marshall et al. |
| 6,072,982 A | 6/2000 | Haddad |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,291 A | 6/2000 | Ludwig, Jr. |
| 6,081,750 A | 6/2000 | Hoffberg et al. |
| 6,081,830 A | 6/2000 | Schindler |
| 6,088,722 A | 7/2000 | Herz et al. |
| 6,088,945 A | 7/2000 | Sanderfoot |
| 6,091,883 A | 7/2000 | Artigalas et al. |
| 6,091,884 A | 7/2000 | Yuen et al. |
| RE36,801 E | 8/2000 | Logan et al. |
| 6,097,383 A | 8/2000 | Gaughan et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,124,854 A | 9/2000 | Sartain et al. |
| 6,125,230 A | 9/2000 | Yaginuma |
| 6,130,726 A | 10/2000 | Darbee et al. |
| 6,133,909 A | 10/2000 | Schein et al. |
| 6,133,910 A | 10/2000 | Stinebruner |
| 6,137,950 A | 10/2000 | Yuen |
| 6,139,177 A | 10/2000 | Venkatraman et al. |
| 6,141,003 A | 10/2000 | Chor et al. |
| 6,141,488 A | 10/2000 | Knudson et al. |
| 6,144,702 A | 11/2000 | Yurt et al. |
| 6,147,714 A | 11/2000 | Terasawa et al. |
| 6,147,715 A | 11/2000 | Yuen et al. |
| 6,151,059 A | 11/2000 | Schein et al. |
| 6,151,643 A | 11/2000 | Cheng et al. |
| 6,154,203 A | 11/2000 | Yuen et al. |
| 6,154,752 A | 11/2000 | Ryan |
| 6,154,771 A | 11/2000 | Rangan et al. |
| 6,155,001 A | 12/2000 | Marin |
| 6,157,411 A | 12/2000 | Williams et al. |
| 6,157,413 A | 12/2000 | Hanafee et al. |
| 6,157,809 A | 12/2000 | Kambayashi |
| 6,160,545 A | 12/2000 | Eyer et al. |
| 6,160,546 A | 12/2000 | Thompson et al. |
| 6,160,570 A | 12/2000 | Sitnik |
| 6,160,989 A | 12/2000 | Hendricks et al. |
| 6,163,316 A | 12/2000 | Killian |
| 6,163,345 A | 12/2000 | Noguchi et al. |
| 6,166,778 A | 12/2000 | Yamamoto et al. |

(56) References Cited

U.S. PATENT DOCUMENTS

| | | |
|---|---|---|
| 6,167,188 A | 12/2000 | Young et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,175,362 B1 | 1/2001 | Harms et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,182,106 B1 | 1/2001 | Casey et al. |
| 6,184,877 B1 | 2/2001 | Dodson et al. |
| 6,185,360 B1 | 2/2001 | Inoue et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,195,501 B1 | 2/2001 | Perry et al. |
| 6,201,536 B1 | 3/2001 | Hendricks et al. |
| 6,202,058 B1 | 3/2001 | Rose et al. |
| 6,202,062 B1 | 3/2001 | Cameron et al. |
| 6,202,212 B1 | 3/2001 | Sturgeon et al. |
| 6,208,335 B1 | 3/2001 | Gordon et al. |
| 6,208,384 B1 | 3/2001 | Schultheiss |
| 6,208,799 B1 | 3/2001 | Marsh et al. |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,219,839 B1 | 4/2001 | Sampsell |
| 6,226,444 B1 | 5/2001 | Goldschmidt Iki et al. |
| 6,226,447 B1 | 5/2001 | Sasaki et al. |
| 6,233,389 B1 | 5/2001 | Barton et al. |
| 6,233,734 B1 | 5/2001 | Macrae et al. |
| 6,237,049 B1 | 5/2001 | Ludtke |
| 6,237,145 B1 | 5/2001 | Narasimhan et al. |
| 6,237,146 B1 | 5/2001 | Richards et al. |
| 6,239,794 B1 | 5/2001 | Yuen et al. |
| 6,240,555 B1 | 5/2001 | Shoff et al. |
| 6,243,129 B1 | 6/2001 | Deierling |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,772 B1 | 7/2001 | Shen et al. |
| 6,263,501 B1 | 7/2001 | Schein et al. |
| 6,263,505 B1 | 7/2001 | Walker et al. |
| 6,263,507 B1 | 7/2001 | Ahmad et al. |
| 6,266,814 B1 | 7/2001 | Lemmons et al. |
| 6,268,849 B1 | 7/2001 | Boyer et al. |
| 6,275,268 B1 | 8/2001 | Ellis et al. |
| 6,275,648 B1 | 8/2001 | Knudson et al. |
| 6,275,989 B1 | 8/2001 | Broadwin et al. |
| 6,279,157 B1 | 8/2001 | Takasu |
| 6,282,713 B1 | 8/2001 | Kitsukawa et al. |
| 6,285,713 B1 | 9/2001 | Nakaya et al. |
| 6,286,005 B1 | 9/2001 | Cannon |
| 6,286,140 B1 | 9/2001 | Ivanyi |
| 6,289,346 B1 | 9/2001 | Milewski et al. |
| 6,292,624 B1 | 9/2001 | Saib et al. |
| 6,298,482 B1 | 10/2001 | Seidman et al. |
| 6,310,886 B1 | 10/2001 | Barton |
| 6,311,877 B1 | 11/2001 | Yang |
| 6,312,336 B1 | 11/2001 | Handelman et al. |
| 6,314,575 B1 | 11/2001 | Billock et al. |
| 6,317,784 B1 | 11/2001 | Mackintosh et al. |
| 6,317,881 B1 | 11/2001 | Shah-Nazaroff et al. |
| 6,317,885 B1 | 11/2001 | Fries |
| 6,320,588 B1 | 11/2001 | Palmer et al. |
| 6,321,991 B1 | 11/2001 | Knowles |
| 6,323,911 B1 | 11/2001 | Schein et al. |
| 6,323,931 B1 | 11/2001 | Fujita et al. |
| 6,324,338 B1 | 11/2001 | Wood et al. |
| 6,326,982 B1 | 12/2001 | Wu et al. |
| 6,327,049 B1 | 12/2001 | Ohtsuka |
| 6,327,418 B1 | 12/2001 | Barton |
| 6,330,586 B1 | 12/2001 | Yates et al. |
| 6,331,877 B1 | 12/2001 | Bennington et al. |
| 6,334,022 B1 | 12/2001 | Ohba et al. |
| 6,335,722 B1 | 1/2002 | Tani et al. |
| 6,335,963 B1 | 1/2002 | Bosco |
| 6,337,715 B1 | 1/2002 | Inagaki et al. |
| 6,341,195 B1 | 1/2002 | Mankovitz et al. |
| 6,341,374 B2 | 1/2002 | Schein et al. |
| 6,342,926 B1 | 1/2002 | Hanafee et al. |
| 6,343,311 B1 | 1/2002 | Nishida et al. |
| 6,349,410 B1 | 2/2002 | Lortz |
| 6,353,929 B1 | 3/2002 | Houston |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,359,661 B1 | 3/2002 | Nickum |
| 6,363,525 B1 | 3/2002 | Dougherty et al. |
| 6,366,890 B1 | 4/2002 | Usrey |
| 6,367,080 B1 | 4/2002 | Enomoto et al. |
| 6,373,528 B1 | 4/2002 | Bennington et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,370 B1 | 6/2002 | Jarrell |
| 6,405,371 B1 | 6/2002 | Oosterhout et al. |
| 6,405,926 B1 | 6/2002 | Yomogida et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,415,438 B1 | 7/2002 | Blackketter et al. |
| 6,418,556 B1 | 7/2002 | Bennington et al. |
| 6,421,067 B1 | 7/2002 | Kamen et al. |
| 6,426,779 B1 | 7/2002 | Noguchi et al. |
| 6,430,743 B1 | 8/2002 | Matsuura |
| 6,434,614 B1 | 8/2002 | Blumenau |
| 6,437,836 B1 | 8/2002 | Huang et al. |
| 6,438,579 B1 | 8/2002 | Hosken |
| 6,441,832 B1 | 8/2002 | Tao et al. |
| 6,442,332 B1 | 8/2002 | Knudson et al. |
| 6,445,306 B1 | 9/2002 | Trovato et al. |
| 6,446,261 B1 | 9/2002 | Rosser |
| 6,453,471 B1 | 9/2002 | Klosterman |
| RE37,881 E | 10/2002 | Haines |
| 6,460,180 B1 | 10/2002 | Park et al. |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,473,559 B1 | 10/2002 | Knudson et al. |
| 6,477,579 B1 | 11/2002 | Kunkel et al. |
| 6,477,705 B1 | 11/2002 | Yuen et al. |
| 6,480,667 B1 | 11/2002 | O'Connor |
| 6,483,986 B1 | 11/2002 | Krapf |
| 6,486,892 B1 | 11/2002 | Stern |
| 6,486,920 B2 | 11/2002 | Arai et al. |
| 6,487,362 B1 | 11/2002 | Yuen et al. |
| 6,493,876 B1 | 12/2002 | DeFreese et al. |
| 6,498,895 B2 | 12/2002 | Young et al. |
| 6,499,138 B1 | 12/2002 | Swix et al. |
| 6,502,241 B1 | 12/2002 | Kretz et al. |
| 6,505,348 B1 | 1/2003 | Knowles et al. |
| 6,507,953 B1 | 1/2003 | Horlander et al. |
| 6,509,908 B1 | 1/2003 | Croy et al. |
| 6,515,680 B1 | 2/2003 | Hendricks et al. |
| 6,516,323 B1 | 2/2003 | Kamba |
| 6,516,467 B1 | 2/2003 | Schindler et al. |
| 6,526,577 B1 | 2/2003 | Knudson et al. |
| 6,530,082 B1 | 3/2003 | Del Sesto et al. |
| 6,532,589 B1 | 3/2003 | Proehl et al. |
| 6,536,515 B2 | 3/2003 | Freitag et al. |
| 6,539,548 B1 | 3/2003 | Hendricks et al. |
| 6,542,169 B1 | 4/2003 | Marshall et al. |
| 6,545,722 B1 | 4/2003 | Schultheiss et al. |
| 6,546,399 B1 | 4/2003 | Reed et al. |
| 6,546,556 B1 | 4/2003 | Kataoka et al. |
| 6,564,005 B1 | 5/2003 | Berstis |

(56) References Cited

U.S. PATENT DOCUMENTS

| | | |
|---|---|---|
| 6,564,378 B1 | 5/2003 | Satterfield et al. |
| 6,564,379 B1 | 5/2003 | Knudson et al. |
| 6,567,892 B1 | 5/2003 | Horst et al. |
| 6,567,982 B1 | 5/2003 | Howe et al. |
| 6,571,390 B1 | 5/2003 | Dunn et al. |
| 6,574,424 B1 | 6/2003 | Dimitri et al. |
| 6,580,870 B1 | 6/2003 | Kanazawa et al. |
| 6,587,127 B1 | 7/2003 | Leeke et al. |
| 6,588,013 B1 | 7/2003 | Lumley et al. |
| 6,591,058 B1 | 7/2003 | O'Connor et al. |
| 6,598,228 B2 | 7/2003 | Hejna, Jr. |
| 6,600,364 B1 | 7/2003 | Liang et al. |
| 6,600,503 B2 | 7/2003 | Stautner et al. |
| 6,601,074 B1 | 7/2003 | Liebenow |
| 6,601,237 B1 | 7/2003 | Ten Kate et al. |
| 6,606,128 B2 | 8/2003 | Hanafee et al. |
| 6,611,654 B1 | 8/2003 | Shteyn |
| 6,611,842 B1 | 8/2003 | Brown |
| 6,611,958 B1 | 8/2003 | Shintani et al. |
| 6,614,987 B1 | 9/2003 | Ismail et al. |
| 6,622,306 B1 | 9/2003 | Kamada |
| 6,631,523 B1 | 10/2003 | Matthews, III et al. |
| 6,637,029 B1 | 10/2003 | Maissel et al. |
| 6,640,337 B1 | 10/2003 | Lu |
| 6,646,685 B1 | 11/2003 | Kim |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,668,377 B1 | 12/2003 | Dunn |
| 6,670,971 B1 | 12/2003 | Oral et al. |
| 6,675,385 B1 | 1/2004 | Wang |
| 6,675,386 B1 | 1/2004 | Hendricks et al. |
| 6,678,706 B1 | 1/2004 | Fishel |
| 6,681,396 B1 | 1/2004 | Bates et al. |
| 6,687,906 B1 | 2/2004 | Yuen et al. |
| 6,696,373 B2 | 2/2004 | Kinn et al. |
| 6,698,020 B1 | 2/2004 | Zigmond et al. |
| 6,704,931 B1 | 3/2004 | Schaffer et al. |
| 6,715,126 B1 | 3/2004 | Chang et al. |
| 6,718,324 B2 | 4/2004 | Edlund et al. |
| 6,718,551 B1 | 4/2004 | Swix et al. |
| 6,721,954 B1 | 4/2004 | Nickum |
| 6,727,914 B1 | 4/2004 | Gutta |
| 6,728,967 B2 | 4/2004 | Bennington et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,744,967 B2 | 6/2004 | Kaminski et al. |
| 6,745,391 B1 | 6/2004 | Macrae et al. |
| 6,750,881 B1 | 6/2004 | Appelman |
| 6,750,885 B1 | 6/2004 | Finch, II et al. |
| 6,751,800 B1 | 6/2004 | Fukuda et al. |
| 6,754,904 B1 | 6/2004 | Cooper et al. |
| 6,756,987 B2 | 6/2004 | Goyins et al. |
| 6,756,997 B1 | 6/2004 | Ward, III et al. |
| 6,757,691 B1 | 6/2004 | Welsh et al. |
| 6,757,906 B1 | 6/2004 | Look et al. |
| 6,760,537 B2 | 7/2004 | Mankovitz |
| 6,760,538 B1 | 7/2004 | Bumgardner et al. |
| 6,766,100 B1 | 7/2004 | Komar et al. |
| 6,766,956 B1 | 7/2004 | Boylan, III et al. |
| 6,771,317 B2 | 8/2004 | Ellis et al. |
| 6,771,886 B1 | 8/2004 | Mendelsohn |
| 6,772,433 B1 | 8/2004 | LaJoie et al. |
| 6,788,882 B1 | 9/2004 | Geer et al. |
| 6,792,197 B1 | 9/2004 | Helmstetter |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,802,074 B1 | 10/2004 | Mitsui et al. |
| 6,820,278 B1 | 11/2004 | Ellis |
| 6,828,993 B1 | 12/2004 | Hendricks et al. |
| 6,837,791 B1 | 1/2005 | McNutt et al. |
| 6,847,387 B2 | 1/2005 | Roth |
| 6,850,693 B2 | 2/2005 | Young et al. |
| 6,857,131 B1 | 2/2005 | Yagawa et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,920,278 B1 | 7/2005 | Yano et al. |
| 6,920,281 B1 | 7/2005 | Agnibotri et al. |
| 6,925,035 B2 | 8/2005 | Ueki |
| 6,925,567 B1 | 8/2005 | Hirata et al. |
| 6,934,964 B1 | 8/2005 | Schaffer et al. |
| 6,938,208 B2 | 8/2005 | Reichardt |
| 6,973,669 B2 | 12/2005 | Daniels |
| 6,983,478 B1 | 1/2006 | Grauch et al. |
| 6,983,483 B2 | 1/2006 | Maze et al. |
| 6,985,188 B1 | 1/2006 | Hurst, Jr. |
| 6,999,698 B2 | 2/2006 | Yamauchi et al. |
| 7,003,792 B1 | 2/2006 | Yuen |
| 7,007,294 B1 | 2/2006 | Kurapati |
| 7,013,478 B1 | 3/2006 | Hendricks et al. |
| 7,017,118 B1 | 3/2006 | Carroll |
| 7,017,179 B1 | 3/2006 | Asamoto et al. |
| 7,027,716 B1 | 4/2006 | Boyle et al. |
| 7,028,323 B2 | 4/2006 | Franken et al. |
| 7,028,326 B1 | 4/2006 | Westlake et al. |
| 7,029,935 B2 | 4/2006 | Negley et al. |
| 7,039,935 B2 | 5/2006 | Knudson et al. |
| 7,047,241 B1 | 5/2006 | Erickson |
| 7,047,550 B1 | 5/2006 | Yasukawa et al. |
| 7,050,988 B2 | 5/2006 | Atcheson et al. |
| 7,053,964 B2 | 5/2006 | Moon |
| 7,058,635 B1 | 6/2006 | Shah-Nazaroff et al. |
| 7,065,709 B2 | 6/2006 | Ellis et al. |
| 7,069,576 B1 | 6/2006 | Knudson et al. |
| 7,073,187 B1 | 7/2006 | Hendricks et al. |
| 7,088,910 B2 | 8/2006 | Potrebic et al. |
| 7,096,486 B1 | 8/2006 | Ukai et al. |
| 7,100,185 B2 | 8/2006 | Bennington et al. |
| 7,117,518 B1 | 10/2006 | Takahashi et al. |
| 7,134,131 B1 | 11/2006 | Hendricks et al. |
| 7,143,430 B1 | 11/2006 | Fingerman et al. |
| 7,151,886 B2 | 12/2006 | Young et al. |
| 7,159,232 B1 | 1/2007 | Blackketter et al. |
| 7,165,098 B1 | 1/2007 | Boyer et al. |
| 7,181,128 B1 | 2/2007 | Wada et al. |
| 7,185,355 B1 | 2/2007 | Ellis et al. |
| 7,187,847 B2 | 3/2007 | Young et al. |
| 7,188,356 B1 | 3/2007 | Miura et al. |
| 7,200,852 B1 | 4/2007 | Block |
| 7,200,859 B1 | 4/2007 | Perlman et al. |
| 7,209,640 B2 | 4/2007 | Young et al. |
| 7,209,915 B1 | 4/2007 | Taboada et al. |
| 7,218,839 B2 | 5/2007 | Plourde, Jr. et al. |
| 7,229,012 B1 | 6/2007 | Enright et al. |
| 7,229,354 B2 | 6/2007 | McNutt et al. |
| 7,243,139 B2 | 7/2007 | Ullman et al. |
| 7,243,364 B2 | 7/2007 | Dunn et al. |
| 7,266,833 B2 | 9/2007 | Ward, III et al. |
| 7,277,859 B2 | 10/2007 | Watanabe et al. |
| 7,284,202 B1 | 10/2007 | Zenith |
| 7,287,267 B2 | 10/2007 | Knudson et al. |
| 7,293,276 B2 | 11/2007 | Phillips et al. |
| 7,293,279 B1 | 11/2007 | Asmussen |
| 7,328,450 B2 | 2/2008 | Macrae et al. |
| 7,343,614 B1 | 3/2008 | Hendricks et al. |
| 7,349,976 B1 | 3/2008 | Glaser et al. |
| 7,356,246 B1 | 4/2008 | Kobb |
| 7,356,547 B2 | 4/2008 | Ozer et al. |
| 7,363,645 B1 | 4/2008 | Hendricks |
| 7,369,749 B2 | 5/2008 | Ichioka et al. |
| 7,369,750 B2 | 5/2008 | Cheng et al. |
| 7,370,342 B2 | 5/2008 | Ismail et al. |
| 7,392,532 B2 | 6/2008 | White et al. |
| 7,398,541 B2 | 7/2008 | Bennington et al. |
| 7,403,935 B2 | 7/2008 | Horvitz et al. |
| 7,412,441 B2 | 8/2008 | Scott, III et al. |
| 7,437,751 B2 | 10/2008 | Daniels |
| 7,440,677 B2 | 10/2008 | Strasser |
| 7,440,993 B1 | 10/2008 | Philyaw et al. |
| 7,454,515 B2 | 11/2008 | Lamkin et al. |

(56) References Cited

U.S. PATENT DOCUMENTS

| | | |
|---|---|---|
| 7,454,772 B2 | 11/2008 | Fellenstein et al. |
| 7,467,398 B2 * | 12/2008 | Fellenstein et al. ............. 725/53 |
| 7,477,832 B2 | 1/2009 | Young et al. |
| 7,478,414 B1 | 1/2009 | Glusker et al. |
| 7,480,929 B2 | 1/2009 | Klosterman et al. |
| 7,487,528 B2 | 2/2009 | Satterfield et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,506,350 B2 | 3/2009 | Johnson |
| 7,519,268 B2 | 4/2009 | Juen et al. |
| 7,533,400 B1 | 5/2009 | Hailey et al. |
| 7,540,010 B2 | 5/2009 | Hanaya et al. |
| 7,567,747 B2 | 7/2009 | Hira |
| 7,577,336 B2 | 8/2009 | Srinivasan et al. |
| 7,590,993 B1 | 9/2009 | Hendricks et al. |
| 7,599,753 B2 | 10/2009 | Taylor et al. |
| 7,603,685 B2 | 10/2009 | Knudson et al. |
| 7,624,412 B2 | 11/2009 | McEvilly et al. |
| 7,634,786 B2 | 12/2009 | Knee et al. |
| 7,665,109 B2 | 2/2010 | Matthews, III et al. |
| 7,673,315 B1 | 3/2010 | Wong et al. |
| 7,685,620 B2 * | 3/2010 | Fellenstein et al. ............. 725/53 |
| 7,689,995 B1 | 3/2010 | Francis et al. |
| 7,707,617 B2 | 4/2010 | Birleson |
| 7,721,307 B2 | 5/2010 | Hendricks et al. |
| 7,725,467 B2 | 5/2010 | Yamamoto et al. |
| 7,757,254 B2 | 7/2010 | Shoff et al. |
| 7,770,196 B1 | 8/2010 | Hendricks |
| 7,778,158 B2 | 8/2010 | Vogel et al. |
| 7,779,437 B2 | 8/2010 | Barton |
| 7,779,445 B2 | 8/2010 | Ellis |
| 7,793,326 B2 | 9/2010 | McCoskey et al. |
| 7,801,888 B2 | 9/2010 | Rao et al. |
| 7,813,822 B1 | 10/2010 | Hoffberg |
| 7,823,055 B2 | 10/2010 | Sull et al. |
| 7,840,577 B2 | 11/2010 | Ortega et al. |
| 7,859,571 B1 | 12/2010 | Brown et al. |
| 7,882,520 B2 | 2/2011 | Beach et al. |
| 7,895,218 B2 | 2/2011 | Venkataraman et al. |
| 7,895,625 B1 | 2/2011 | Bryan et al. |
| 7,925,141 B2 | 4/2011 | Geer et al. |
| 7,962,935 B2 | 6/2011 | Kurosaki et al. |
| 7,996,864 B2 | 8/2011 | Yuen et al. |
| 8,051,450 B2 | 11/2011 | Robarts et al. |
| 8,065,702 B2 | 11/2011 | Goldberg et al. |
| 8,078,751 B2 | 12/2011 | Janik et al. |
| 8,087,050 B2 | 12/2011 | Ellis et al. |
| 8,091,110 B2 | 1/2012 | Ellis et al. |
| 8,112,776 B2 | 2/2012 | Schein et al. |
| 8,230,343 B2 | 7/2012 | Logan et al. |
| 8,265,458 B2 | 9/2012 | Helmstetter |
| 8,275,764 B2 | 9/2012 | Jeon et al. |
| 8,302,127 B2 | 10/2012 | Klarfeld et al. |
| 8,363,679 B2 | 1/2013 | Sorenson et al. |
| 8,370,884 B2 | 2/2013 | Ellis |
| 8,397,255 B2 | 3/2013 | Wachtfogel et al. |
| 8,478,750 B2 | 7/2013 | Rao et al. |
| 8,490,134 B2 | 7/2013 | Gerba et al. |
| 8,528,019 B1 | 9/2013 | Dimitrova et al. |
| 8,613,020 B2 | 12/2013 | Knudson et al. |
| 8,613,024 B2 | 12/2013 | Bovenschulte et al. |
| 8,635,649 B2 | 1/2014 | Ward, III et al. |
| 8,707,366 B2 | 4/2014 | Wong et al. |
| 2001/0001160 A1 | 5/2001 | Shoff et al. |
| 2001/0013122 A1 | 8/2001 | Hirata |
| 2001/0013124 A1 | 8/2001 | Klosterman et al. |
| 2001/0019338 A1 | 9/2001 | Roth |
| 2001/0021994 A1 | 9/2001 | Nash |
| 2001/0025375 A1 | 9/2001 | Ahmad et al. |
| 2001/0027555 A1 | 10/2001 | Franken et al. |
| 2001/0027562 A1 | 10/2001 | Schein et al. |
| 2001/0028782 A1 | 10/2001 | Ohno et al. |
| 2001/0029610 A1 | 10/2001 | Corvin et al. |
| 2001/0034237 A1 | 10/2001 | Garahi |
| 2001/0042246 A1 | 11/2001 | Yuen et al. |
| 2001/0043795 A1 | 11/2001 | Wood et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0009283 A1 | 1/2002 | Ichioka et al. |
| 2002/0010930 A1 | 1/2002 | Shah-Nazaroff et al. |
| 2002/0026496 A1 | 2/2002 | Boyer et al. |
| 2002/0032907 A1 | 3/2002 | Daniels |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0048448 A1 | 4/2002 | Daniels |
| 2002/0049973 A1 | 4/2002 | Alten et al. |
| 2002/0056087 A1 | 5/2002 | Berezowski et al. |
| 2002/0056098 A1 | 5/2002 | White |
| 2002/0057893 A1 | 5/2002 | Wood et al. |
| 2002/0059599 A1 | 5/2002 | Schein et al. |
| 2002/0059602 A1 | 5/2002 | Macrae et al. |
| 2002/0073424 A1 | 6/2002 | Ward et al. |
| 2002/0076203 A1 | 6/2002 | Takahashi |
| 2002/0078450 A1 | 6/2002 | Bennington et al. |
| 2002/0083439 A1 | 6/2002 | Eldering |
| 2002/0087981 A1 | 7/2002 | Daniels |
| 2002/0090203 A1 | 7/2002 | Mankovitz |
| 2002/0092017 A1 | 7/2002 | Klosterman et al. |
| 2002/0095676 A1 | 7/2002 | Knee et al. |
| 2002/0104096 A1 | 8/2002 | Cramer et al. |
| 2002/0110353 A1 | 8/2002 | Potrebic et al. |
| 2002/0112239 A1 | 8/2002 | Goldman |
| 2002/0112249 A1 | 8/2002 | Hendricks et al. |
| 2002/0120933 A1 | 8/2002 | Knudson et al. |
| 2002/0124249 A1 | 9/2002 | Shintani et al. |
| 2002/0129360 A1 | 9/2002 | Lee |
| 2002/0129368 A1 | 9/2002 | Schlack et al. |
| 2002/0138840 A1 | 9/2002 | Schein et al. |
| 2002/0144279 A1 | 10/2002 | Zhou |
| 2002/0147975 A1 | 10/2002 | Seo |
| 2002/0147976 A1 | 10/2002 | Yuen et al. |
| 2002/0147977 A1 | 10/2002 | Hammett et al. |
| 2002/0154157 A1 | 10/2002 | Sherr et al. |
| 2002/0154888 A1 | 10/2002 | Allen et al. |
| 2002/0174424 A1 | 11/2002 | Chang et al. |
| 2002/0174430 A1 | 11/2002 | Ellis et al. |
| 2002/0174433 A1 | 11/2002 | Baumgartner et al. |
| 2002/0184457 A1 | 12/2002 | Yuasa et al. |
| 2002/0184626 A1 | 12/2002 | Darbee et al. |
| 2002/0184629 A1 | 12/2002 | Sie et al. |
| 2002/0188746 A1 | 12/2002 | Drosset et al. |
| 2002/0191954 A1 | 12/2002 | Beach et al. |
| 2002/0194585 A1 | 12/2002 | Connelly |
| 2002/0194595 A1 | 12/2002 | Miller et al. |
| 2002/0194596 A1 | 12/2002 | Srivastava |
| 2002/0194598 A1 | 12/2002 | Connelly |
| 2002/0194607 A1 | 12/2002 | Connelly |
| 2002/0199185 A1 | 12/2002 | Kaminski et al. |
| 2003/0005432 A1 | 1/2003 | Ellis et al. |
| 2003/0005445 A1 | 1/2003 | Schein et al. |
| 2003/0009766 A1 | 1/2003 | Marolda |
| 2003/0010454 A1 | 1/2003 | Bailey et al. |
| 2003/0012554 A1 | 1/2003 | Zeidler et al. |
| 2003/0031465 A1 | 2/2003 | Blake |
| 2003/0066089 A1 | 4/2003 | Andersen |
| 2003/0070182 A1 | 4/2003 | Pierre et al. |
| 2003/0088872 A1 | 5/2003 | Maissel et al. |
| 2003/0088873 A1 | 5/2003 | McCoy et al. |
| 2003/0098891 A1 | 5/2003 | Molander |
| 2003/0103088 A1 | 6/2003 | Dresti et al. |
| 2003/0106071 A1 | 6/2003 | Akamatsu et al. |
| 2003/0110171 A1 | 6/2003 | Ozer et al. |
| 2003/0110494 A1 | 6/2003 | Bennington et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0118323 A1 | 6/2003 | Ismail et al. |
| 2003/0126607 A1 | 7/2003 | Phillips et al. |
| 2003/0131355 A1 | 7/2003 | Berenson et al. |
| 2003/0135490 A1 | 7/2003 | Barrett et al. |

(56) References Cited

U.S. PATENT DOCUMENTS

| | | |
|---|---|---|
| 2003/0145323 A1 | 7/2003 | Hendricks et al. |
| 2003/0146940 A1 | 8/2003 | Ellis et al. |
| 2003/0149988 A1 | 8/2003 | Ellis et al. |
| 2003/0154485 A1 | 8/2003 | Johnson et al. |
| 2003/0154486 A1 | 8/2003 | Dunn et al. |
| 2003/0163813 A1 | 8/2003 | Klosterman et al. |
| 2003/0164858 A1 | 9/2003 | Klosterman et al. |
| 2003/0177494 A1 | 9/2003 | Satterfield et al. |
| 2003/0182659 A1 | 9/2003 | Ellis et al. |
| 2003/0182661 A1 | 9/2003 | Ellis et al. |
| 2003/0188310 A1 | 10/2003 | Klosterman et al. |
| 2003/0188311 A1 | 10/2003 | Yuen et al. |
| 2003/0188314 A1 | 10/2003 | Ellis et al. |
| 2003/0192050 A1 | 10/2003 | Fellenstein et al. |
| 2003/0196201 A1 | 10/2003 | Schein et al. |
| 2003/0196203 A1 | 10/2003 | Ellis et al. |
| 2003/0198462 A1 | 10/2003 | Bumgardner et al. |
| 2003/0204847 A1 | 10/2003 | Ellis et al. |
| 2003/0206719 A1 | 11/2003 | Bumgardner et al. |
| 2003/0208756 A1 | 11/2003 | Macrae et al. |
| 2003/0208758 A1 | 11/2003 | Schein et al. |
| 2003/0208759 A1 | 11/2003 | Gordon et al. |
| 2003/0208767 A1 | 11/2003 | Williamson et al. |
| 2003/0210898 A1 | 11/2003 | Juen et al. |
| 2003/0212996 A1 | 11/2003 | Wolzien |
| 2003/0226144 A1 | 12/2003 | Thurston et al. |
| 2004/0001690 A1 | 1/2004 | Boston et al. |
| 2004/0003397 A1 | 1/2004 | Boston et al. |
| 2004/0003407 A1 | 1/2004 | Hanafee et al. |
| 2004/0003413 A1 | 1/2004 | Boston et al. |
| 2004/0015397 A1 | 1/2004 | Barry et al. |
| 2004/0019900 A1 | 1/2004 | Knightbridge et al. |
| 2004/0022278 A1 | 2/2004 | Thomas et al. |
| 2004/0049787 A1 | 3/2004 | Maissel et al. |
| 2004/0049788 A1 | 3/2004 | Mori et al. |
| 2004/0049794 A1 | 3/2004 | Shao et al. |
| 2004/0060063 A1 | 3/2004 | Russ et al. |
| 2004/0070594 A1 | 4/2004 | Burke |
| 2004/0073923 A1 | 4/2004 | Wasserman |
| 2004/0073924 A1 | 4/2004 | Pendakur |
| 2004/0078809 A1 | 4/2004 | Drazin |
| 2004/0078815 A1 | 4/2004 | Lemmons et al. |
| 2004/0088729 A1 | 5/2004 | Petrovic et al. |
| 2004/0098744 A1 | 5/2004 | Gutta |
| 2004/0103434 A1 | 5/2004 | Ellis |
| 2004/0103439 A1 | 5/2004 | Macrae et al. |
| 2004/0111742 A1 | 6/2004 | Hendricks et al. |
| 2004/0111745 A1 | 6/2004 | Schein et al. |
| 2004/0128686 A1 | 7/2004 | Boyer et al. |
| 2004/0133655 A1 | 7/2004 | Yen et al. |
| 2004/0133910 A1 | 7/2004 | Gordon et al. |
| 2004/0139465 A1 | 7/2004 | Matthews et al. |
| 2004/0156614 A1 | 8/2004 | Bumgardner et al. |
| 2004/0160862 A1 | 8/2004 | Ueki |
| 2004/0168189 A1 | 8/2004 | Reynolds et al. |
| 2004/0172661 A1 | 9/2004 | Yagawa et al. |
| 2004/0181814 A1 | 9/2004 | Ellis et al. |
| 2004/0187164 A1 | 9/2004 | Kandasamy et al. |
| 2004/0194131 A1 | 9/2004 | Ellis et al. |
| 2004/0194138 A1 | 9/2004 | Boylan et al. |
| 2004/0194141 A1 | 9/2004 | Sanders |
| 2004/0210932 A1 | 10/2004 | Mori et al. |
| 2004/0210935 A1 | 10/2004 | Schein et al. |
| 2004/0221310 A1 | 11/2004 | Herrington et al. |
| 2004/0243470 A1 | 12/2004 | Ozer et al. |
| 2004/0264920 A1 | 12/2004 | Helmstetter |
| 2005/0010949 A1 | 1/2005 | Ward et al. |
| 2005/0015804 A1 | 1/2005 | LaJoie et al. |
| 2005/0015815 A1 | 1/2005 | Shoff et al. |
| 2005/0020439 A1 | 1/2005 | Ishii et al. |
| 2005/0028218 A1 | 2/2005 | Blake |
| 2005/0076363 A1 | 4/2005 | Dukes et al. |
| 2005/0097622 A1 | 5/2005 | Zigmond et al. |
| 2005/0125240 A9 | 6/2005 | Speiser et al. |
| 2005/0129049 A1 | 6/2005 | Srinivasan et al. |
| 2005/0132264 A1 | 6/2005 | Joshi et al. |
| 2005/0138660 A1 | 6/2005 | Boyer et al. |
| 2005/0147378 A1 | 7/2005 | Hira |
| 2005/0149964 A1 | 7/2005 | Thomas et al. |
| 2005/0155056 A1 | 7/2005 | Knee et al. |
| 2005/0157217 A1 | 7/2005 | Hendricks |
| 2005/0160461 A1 | 7/2005 | Baumgartner et al. |
| 2005/0183123 A1 | 8/2005 | Lee et al. |
| 2005/0198668 A1 | 9/2005 | Yuen et al. |
| 2005/0204379 A1 | 9/2005 | Yamamori |
| 2005/0204382 A1 | 9/2005 | Ellis |
| 2005/0204388 A1 | 9/2005 | Knudson et al. |
| 2005/0216936 A1 | 9/2005 | Knudson et al. |
| 2005/0229214 A1 | 10/2005 | Young et al. |
| 2005/0229215 A1 | 10/2005 | Schein et al. |
| 2005/0235318 A1 | 10/2005 | Grauch et al. |
| 2005/0235320 A1 | 10/2005 | Maze et al. |
| 2005/0235323 A1 | 10/2005 | Ellis et al. |
| 2005/0240962 A1 | 10/2005 | Cooper et al. |
| 2005/0240968 A1 | 10/2005 | Knudson et al. |
| 2005/0244138 A1 | 11/2005 | O'Connor et al. |
| 2005/0251824 A1 | 11/2005 | Thomas et al. |
| 2005/0251827 A1 | 11/2005 | Ellis et al. |
| 2005/0267819 A1 | 12/2005 | Kaplan |
| 2005/0273819 A1 | 12/2005 | Knudson et al. |
| 2005/0278741 A1 | 12/2005 | Robarts et al. |
| 2005/0283796 A1 | 12/2005 | Flickinger |
| 2005/0283800 A1 | 12/2005 | Ellis et al. |
| 2006/0010470 A1 | 1/2006 | Kurosaki et al. |
| 2006/0031916 A1 | 2/2006 | Colter et al. |
| 2006/0037044 A1 | 2/2006 | Daniels |
| 2006/0083484 A1 | 4/2006 | Wada et al. |
| 2006/0136965 A1 | 6/2006 | Ellis et al. |
| 2006/0140584 A1 | 6/2006 | Ellis et al. |
| 2006/0146787 A1 | 7/2006 | Wijnands et al. |
| 2006/0161952 A1 | 7/2006 | Herz et al. |
| 2006/0165379 A1 | 7/2006 | Agnihotri et al. |
| 2006/0174277 A1 | 8/2006 | Sezan et al. |
| 2006/0190966 A1 | 8/2006 | McKissick et al. |
| 2006/0206912 A1 | 9/2006 | Klarfeld et al. |
| 2006/0212900 A1 | 9/2006 | Ismail et al. |
| 2006/0212904 A1 | 9/2006 | Klarfeld et al. |
| 2006/0218587 A1 | 9/2006 | Kelts |
| 2006/0248555 A1 | 11/2006 | Eldering |
| 2006/0248558 A1 | 11/2006 | Barton et al. |
| 2007/0005653 A1 | 1/2007 | Marsh |
| 2007/0016926 A1 | 1/2007 | Ward et al. |
| 2007/0033613 A1 | 2/2007 | Ward et al. |
| 2007/0067800 A1 | 3/2007 | Wachtfogel et al. |
| 2007/0074245 A1 | 3/2007 | Nyako et al. |
| 2007/0101377 A1 | 5/2007 | Six et al. |
| 2007/0113244 A1 | 5/2007 | Verschueren et al. |
| 2007/0136751 A1 | 6/2007 | Garbow et al. |
| 2007/0136753 A1 | 6/2007 | Bovenschulte et al. |
| 2007/0157242 A1 | 7/2007 | Cordray et al. |
| 2007/0162934 A1 | 7/2007 | Roop et al. |
| 2007/0180465 A1 | 8/2007 | Ou et al. |
| 2007/0186240 A1 | 8/2007 | Ward et al. |
| 2007/0204308 A1 | 8/2007 | Nicholas et al. |
| 2007/0212023 A1 | 9/2007 | Whillock |
| 2007/0214480 A1 | 9/2007 | Kamen |
| 2007/0234393 A1 | 10/2007 | Walker et al. |
| 2007/0244902 A1 | 10/2007 | Seide et al. |
| 2007/0266401 A1 | 11/2007 | Hallberg |
| 2007/0271582 A1 | 11/2007 | Ellis et al. |
| 2008/0066111 A1 | 3/2008 | Ellis et al. |
| 2008/0098436 A1 | 4/2008 | White |
| 2008/0109284 A1 | 5/2008 | Slaney et al. |
| 2008/0115169 A1 | 5/2008 | Ellis et al. |
| 2008/0126303 A1 | 5/2008 | Park et al. |
| 2008/0127265 A1 | 5/2008 | Ward et al. |
| 2008/0127266 A1 | 5/2008 | Ward et al. |
| 2008/0178216 A1 | 7/2008 | Bennington et al. |
| 2008/0178221 A1 | 7/2008 | Schein et al. |
| 2008/0178222 A1 | 7/2008 | Bennington et al. |
| 2008/0178223 A1 | 7/2008 | Kwoh et al. |
| 2008/0184286 A1 | 7/2008 | Kwoh et al. |
| 2008/0184305 A1 | 7/2008 | Schein et al. |
| 2008/0184308 A1 | 7/2008 | Herrington et al. |

(56) References Cited

U.S. PATENT DOCUMENTS

| | | | |
|---|---|---|---|
| 2008/0184312 A1 | 7/2008 | Schein et al. |
| 2008/0184315 A1 | 7/2008 | Ellis et al. |
| 2008/0184319 A1 | 7/2008 | Mankovitz |
| 2008/0189744 A1 | 8/2008 | Schein et al. |
| 2008/0196053 A1 | 8/2008 | Thomas et al. |
| 2008/0222106 A1 | 9/2008 | Rao et al. |
| 2008/0232769 A1 | 9/2008 | Jureczki et al. |
| 2008/0235725 A1 | 9/2008 | Hendricks |
| 2008/0276275 A1 | 11/2008 | Ellis |
| 2008/0281689 A1 | 11/2008 | Blinnikka et al. |
| 2008/0288980 A1 | 11/2008 | Schein et al. |
| 2009/0025033 A1 | 1/2009 | Stautner et al. |
| 2009/0031335 A1 | 1/2009 | Hendricks et al. |
| 2009/0049481 A1 | 2/2009 | Fellenstein et al. |
| 2009/0060468 A1 | 3/2009 | Carlberg et al. |
| 2009/0060469 A1 | 3/2009 | Olague et al. |
| 2009/0070817 A1 | 3/2009 | Ellis et al. |
| 2009/0074380 A1 | 3/2009 | Boston et al. |
| 2009/0077589 A1 | 3/2009 | Boyer et al. |
| 2009/0119723 A1 | 5/2009 | Tinsman |
| 2009/0193458 A1 | 7/2009 | Finseth et al. |
| 2010/0115413 A1 | 5/2010 | Schein et al. |
| 2010/0115541 A1 | 5/2010 | Schein et al. |
| 2010/0122282 A1 | 5/2010 | DuBose |
| 2010/0146543 A1 | 6/2010 | Knee et al. |
| 2010/0175078 A1 | 7/2010 | Knudson et al. |
| 2010/0175081 A1 | 7/2010 | Boylan, III et al. |
| 2010/0192172 A1 | 7/2010 | Thomas et al. |
| 2010/0211969 A1 | 8/2010 | Schein et al. |
| 2010/0211975 A1 | 8/2010 | Boyer et al. |
| 2010/0247065 A1 | 9/2010 | Cooper et al. |
| 2010/0275230 A1 | 10/2010 | Yuen et al. |
| 2010/0299692 A1 | 11/2010 | Rao et al. |
| 2010/0319013 A1 | 12/2010 | Knudson et al. |
| 2011/0013885 A1 | 1/2011 | Wong et al. |
| 2011/0035771 A1 | 2/2011 | Ward, III et al. |
| 2011/0078628 A1 | 3/2011 | Rosenberg |
| 2011/0131601 A1 | 6/2011 | Alten et al. |
| 2011/0167451 A1 | 7/2011 | Yuen et al. |
| 2011/0173660 A1 | 7/2011 | Schein et al. |
| 2011/0185387 A1 | 7/2011 | Schein et al. |
| 2011/0209170 A1 | 8/2011 | Schein et al. |
| 2011/0258663 A1 | 10/2011 | Lemmons et al. |
| 2011/0265124 A1 | 10/2011 | Goldenberg et al. |
| 2011/0276995 A1 | 11/2011 | Alten et al. |
| 2012/0079539 A1 | 3/2012 | Schein et al. |
| 2012/0102523 A1 | 4/2012 | Herz et al. |
| 2012/0185901 A1 | 7/2012 | Macrae et al. |
| 2012/0272270 A1 | 10/2012 | Boyer et al. |
| 2012/0304211 A1 | 11/2012 | Berezowski et al. |
| 2013/0031582 A1 | 1/2013 | Tinsman et al. |
| 2013/0304586 A1 | 11/2013 | Angles et al. |

FOREIGN PATENT DOCUMENTS

| | | |
|---|---|---|
| AU | 733993 B2 | 5/2001 |
| AU | 749209 B2 | 6/2002 |
| AU | 760568 B2 | 5/2003 |
| AU | 765648 B2 | 9/2003 |
| AU | 2008201306 A1 | 4/2008 |
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 1203625 A1 | 4/1986 |
| CA | 2151458 A1 | 6/1994 |
| CA | 2345161 A1 | 6/1994 |
| CA | 2164608 A1 | 12/1994 |
| CA | 2285645 A1 | 7/1998 |
| CA | 2297039 A1 | 1/1999 |
| CA | 2312326 A1 | 6/1999 |
| CA | 2322217 A1 | 9/1999 |
| CA | 2454011 A1 | 9/1999 |
| CA | 2324278 A1 | 11/1999 |
| CA | 2513282 A1 | 11/1999 |
| CA | 2364020 A1 | 5/2002 |
| CN | 1200221 A | 11/1998 |
| CN | 1226030 A | 8/1999 |
| CN | 1298604 A | 6/2001 |
| CN | 1494321 | 5/2004 |
| CN | 1555191 | 12/2004 |
| CN | 1567986 | 1/2005 |
| DE | 29 18 846 | 11/1980 |
| DE | 31 51 492 | 7/1983 |
| DE | 3246225 A1 | 6/1984 |
| DE | 3337204 | 4/1985 |
| DE | 3505006 A1 | 8/1986 |
| DE | 36 21 263 A1 | 1/1988 |
| DE | 3640436 A1 | 6/1988 |
| DE | 3702220 A1 | 8/1988 |
| DE | 3909334 A1 | 9/1990 |
| DE | 41 43 074 A1 | 7/1992 |
| DE | 4201031 A1 | 7/1993 |
| DE | 4217246 A1 | 12/1993 |
| DE | 4240187 A1 | 6/1994 |
| DE | 4407701 A1 | 9/1995 |
| DE | 4440419 A1 | 5/1996 |
| DE | 19 531 121 A1 | 2/1997 |
| DE | 19 740 079 A1 | 3/1999 |
| DE | 19 931 046 A1 | 1/2001 |
| DE | 42 90 947 B4 | 11/2006 |
| EP | 0 072 153 A2 | 2/1983 |
| EP | 0122626 A2 | 10/1984 |
| EP | 0133985 A2 | 3/1985 |
| EP | 0 148 733 A1 | 7/1985 |
| EP | 0 222 025 A1 | 5/1987 |
| EP | 0 229 526 A2 | 7/1987 |
| EP | 0 239 884 A1 | 10/1987 |
| EP | 0 276 425 A2 | 8/1988 |
| EP | 0337336 A2 | 10/1989 |
| EP | 0339675 | 11/1989 |
| EP | 0 363 847 A1 | 4/1990 |
| EP | 0 393 555 | 10/1990 |
| EP | 0396062 A2 | 11/1990 |
| EP | 0 401 015 A2 | 12/1990 |
| EP | 0401930 | 12/1990 |
| EP | 0408892 A1 | 1/1991 |
| EP | 0420123 A2 | 4/1991 |
| EP | 0424469 | 5/1991 |
| EP | 0424648 A2 | 5/1991 |
| EP | 0444496 | 9/1991 |
| EP | 0447968 A2 | 9/1991 |
| EP | 0 463 451 A2 | 1/1992 |
| EP | 0 477 754 A2 | 4/1992 |
| EP | 0477756 A2 | 4/1992 |
| EP | 0 489 387 A2 | 6/1992 |
| EP | 0488379 | 6/1992 |
| EP | 0 492 853 A2 | 7/1992 |
| EP | 0497 235 | 8/1992 |
| EP | 0532322 A2 | 3/1993 |
| EP | 0535749 A2 | 4/1993 |
| EP | 0536901 A2 | 4/1993 |
| EP | 0550911 A1 | 7/1993 |
| EP | 0 560 593 | 9/1993 |
| EP | 0 572 090 | 12/1993 |
| EP | 0 575 956 A2 | 12/1993 |
| EP | 0617563 A1 | 9/1994 |
| EP | 0 620 689 A1 | 10/1994 |
| EP | 0 624 040 A2 | 11/1994 |
| EP | 0624039 A2 | 11/1994 |
| EP | 0 644 689 A2 | 3/1995 |
| EP | 0 650 114 A2 | 4/1995 |
| EP | 0648054 A2 | 4/1995 |
| EP | 0 658 048 A1 | 6/1995 |
| EP | 0662771 A2 | 7/1995 |
| EP | 0 669 760 | 8/1995 |
| EP | 0 669 761 A2 | 8/1995 |
| EP | 0 673 164 A1 | 9/1995 |
| EP | 0 682 452 A2 | 11/1995 |
| EP | 0 705 036 | 4/1996 |
| EP | 0711076 A2 | 5/1996 |
| EP | 0 723 369 A1 | 7/1996 |

(56) References Cited

FOREIGN PATENT DOCUMENTS

| | | |
|---|---|---|
| EP | 0721253 A2 | 7/1996 |
| EP | 0725539 A2 | 8/1996 |
| EP | 0 742669 | 11/1996 |
| EP | 0752767 A2 | 1/1997 |
| EP | 0753964 | 1/1997 |
| EP | 0758833 A2 | 2/1997 |
| EP | 0762751 A2 | 3/1997 |
| EP | 0762756 A2 | 3/1997 |
| EP | 0763938 | 3/1997 |
| EP | 0 774 853 | 5/1997 |
| EP | 0 774 868 A1 | 5/1997 |
| EP | 0772360 | 5/1997 |
| EP | 0774866 A2 | 5/1997 |
| EP | 0775417 A1 | 5/1997 |
| EP | 0784405 | 7/1997 |
| EP | 0 789 488 | 8/1997 |
| EP | 0 793 225 | 9/1997 |
| EP | 0797355 | 9/1997 |
| EP | 0 804 028 A1 | 10/1997 |
| EP | 0 805 590 A2 | 11/1997 |
| EP | 0 806 111 A1 | 11/1997 |
| EP | 0805594 A2 | 11/1997 |
| EP | 0822718 | 2/1998 |
| EP | 0827340 A2 | 3/1998 |
| EP | 0 836 320 | 4/1998 |
| EP | 0 836 321 | 4/1998 |
| EP | 0 837599 A2 | 4/1998 |
| EP | 0834798 | 4/1998 |
| EP | 0843468 | 5/1998 |
| EP | 0848554 A2 | 6/1998 |
| EP | 0849948 | 6/1998 |
| EP | 0 852 361 A2 | 7/1998 |
| EP | 0 854 645 | 7/1998 |
| EP | 0851681 | 7/1998 |
| EP | 0852442 A1 | 7/1998 |
| EP | 0854654 | 7/1998 |
| EP | 0874524 | 10/1998 |
| EP | 0880856 A1 | 12/1998 |
| EP | 0 892 554 A2 | 1/1999 |
| EP | 0905985 A2 | 3/1999 |
| EP | 0 921 682 A2 | 6/1999 |
| EP | 0924927 | 6/1999 |
| EP | 0935393 A2 | 8/1999 |
| EP | 0 940 983 | 9/1999 |
| EP | 0 945 003 B1 | 9/1999 |
| EP | 0940985 | 9/1999 |
| EP | 0944253 A1 | 9/1999 |
| EP | 0963119 A1 | 12/1999 |
| EP | 0988876 A1 | 3/2000 |
| EP | 1014715 A2 | 6/2000 |
| EP | 1 058 999 A1 | 12/2000 |
| EP | 1 059 749 | 12/2000 |
| EP | 1060617 A1 | 12/2000 |
| EP | 1067792 A2 | 1/2001 |
| EP | 1 093 305 A2 | 4/2001 |
| EP | 1095504 A2 | 5/2001 |
| EP | 1107588 A2 | 6/2001 |
| EP | 1135929 A1 | 9/2001 |
| EP | 0 856 847 | 11/2001 |
| EP | 1170944 | 1/2002 |
| EP | 1213919 A2 | 6/2002 |
| EP | 1217832 A1 | 6/2002 |
| EP | 1036466 | 3/2003 |
| EP | 0936811 B1 | 5/2003 |
| EP | 1763234 A2 | 3/2007 |
| EP | 1961228 A2 | 8/2008 |
| FR | 2662895 A1 | 12/1991 |
| GB | 1 554 411 | 10/1979 |
| GB | 2034995 A | 6/1980 |
| GB | 2126002 A | 3/1984 |
| GB | 2164194 A | 3/1986 |
| GB | 2185670 A | 7/1987 |
| GB | 2217144 A | 10/1989 |
| GB | 2 227 622 | 8/1990 |
| GB | 2 229 595 | 9/1990 |
| GB | 2 256 115 | 11/1992 |
| GB | 2256546 A | 12/1992 |
| GB | 2264409 A | 8/1993 |
| GB | 2265792 | 10/1993 |
| GB | 2 275 585 A | 8/1994 |
| GB | 2305049 A | 3/1997 |
| GB | 2307381 | 5/1997 |
| GB | 2309134 A | 7/1997 |
| GB | 2325537 A | 11/1998 |
| GB | 2 346 251 | 8/2000 |
| GB | 2 375 674 A | 11/2002 |
| HK | 1035285 | 3/2005 |
| JP | 58137334 A | 8/1983 |
| JP | 58137344 A | 8/1983 |
| JP | 58196738 A | 11/1983 |
| JP | 58210776 A | 12/1983 |
| JP | 59141878 A | 8/1984 |
| JP | 61050470 A | 3/1986 |
| JP | 61074476 A | 4/1986 |
| JP | 62-060370 | 3/1987 |
| JP | 62060372 | 3/1987 |
| JP | 62060384 A | 3/1987 |
| JP | 63-084396 | 4/1988 |
| JP | 06392177 | 4/1988 |
| JP | 63234679 A | 9/1988 |
| JP | 11-32311 A | 5/1989 |
| JP | 11-88280 A | 7/1989 |
| JP | 1177782 A | 7/1989 |
| JP | 01307944 A | 12/1989 |
| JP | 02048879 A | 2/1990 |
| JP | 02-119307 A | 5/1990 |
| JP | 06-141250 | 5/1990 |
| JP | 2189753 A | 7/1990 |
| JP | 10-234007 | 9/1990 |
| JP | 03-022770 | 1/1991 |
| JP | 03063990 A | 3/1991 |
| JP | 03-167975 A | 7/1991 |
| JP | 3178278 A | 8/1991 |
| JP | 03-214919 A | 9/1991 |
| JP | 03-243076 A | 10/1991 |
| JP | 09-009244 | 1/1992 |
| JP | 04-44475 | 2/1992 |
| JP | 04079053 | 3/1992 |
| JP | 04-162889 A | 6/1992 |
| JP | 04-180480 A | 6/1992 |
| JP | 04227380 | 8/1992 |
| JP | 04250760 A | 9/1992 |
| JP | 04-335395 A | 11/1992 |
| JP | 4340258 A | 11/1992 |
| JP | 05-103281 A | 4/1993 |
| JP | 05-122692 A | 5/1993 |
| JP | 05-183826 | 7/1993 |
| JP | 05260400 A | 10/1993 |
| JP | 05284437A A | 10/1993 |
| JP | 05-314186 B2 | 11/1993 |
| JP | 05-339100 A | 12/1993 |
| JP | 06-21907 | 1/1994 |
| JP | 06038165 | 2/1994 |
| JP | 06-090408 A | 3/1994 |
| JP | 60-61935 A | 3/1994 |
| JP | 06111413 | 4/1994 |
| JP | 06-124309 | 5/1994 |
| JP | 06-133235 A | 5/1994 |
| JP | 61-024309 | 5/1994 |
| JP | 06504165 | 5/1994 |
| JP | 06-164973 | 6/1994 |
| JP | 06-217271 | 8/1994 |
| JP | 06243539 | 9/1994 |
| JP | 06-295312 A | 10/1994 |
| JP | 06303541 | 10/1994 |
| JP | 06-350546 | 12/1994 |
| JP | 07-021619 | 1/1995 |
| JP | 0723356 | 1/1995 |
| JP | 07020254 | 1/1995 |
| JP | 07-050259 | 2/1995 |
| JP | 07-076592 | 3/1995 |
| JP | 07-135621 A | 5/1995 |
| JP | 07123326 | 5/1995 |
| JP | 07-162776 | 6/1995 |

(56) References Cited

FOREIGN PATENT DOCUMENTS

| | | |
|---|---|---|
| JP | 07147657 A | 6/1995 |
| JP | 07154349 A | 6/1995 |
| JP | 07160732 | 6/1995 |
| JP | 7-193788 | 7/1995 |
| JP | 07184131 A | 7/1995 |
| JP | 07193762 A | 7/1995 |
| JP | 07193763 A | 7/1995 |
| JP | 07212732 A | 8/1995 |
| JP | 7-262200 A | 10/1995 |
| JP | 07-284033 A | 10/1995 |
| JP | 07-288759 | 10/1995 |
| JP | 07-321748 | 12/1995 |
| JP | 08-32528 | 2/1996 |
| JP | 08-056352 | 2/1996 |
| JP | 0832538 | 2/1996 |
| JP | 08032528 A | 2/1996 |
| JP | 08032538 | 2/1996 |
| JP | 08-137334 A | 5/1996 |
| JP | 08125497 | 5/1996 |
| JP | 08130517 A | 5/1996 |
| JP | 08-168046 | 6/1996 |
| JP | 8-506469 | 7/1996 |
| JP | 08506941 | 7/1996 |
| JP | 08-196738 A | 8/1996 |
| JP | 08-234709 | 9/1996 |
| JP | 08251122 | 9/1996 |
| JP | 08275077 | 10/1996 |
| JP | 08289281 A | 11/1996 |
| JP | 08-331546 A | 12/1996 |
| JP | 09-009245 | 1/1997 |
| JP | 09-037223 | 2/1997 |
| JP | 09037151 A | 2/1997 |
| JP | 9037168 | 2/1997 |
| JP | 09037171 | 2/1997 |
| JP | 09037172 A | 2/1997 |
| JP | 09-065321 | 3/1997 |
| JP | 09-070020 | 3/1997 |
| JP | 9-83888 | 3/1997 |
| JP | 09083888 A | 3/1997 |
| JP | 9-098362 | 4/1997 |
| JP | 09-102827 A | 4/1997 |
| JP | 9-102944 | 4/1997 |
| JP | 09-114781 | 5/1997 |
| JP | 09 162818 | 6/1997 |
| JP | 09-162821 | 6/1997 |
| JP | 09-247565 A | 9/1997 |
| JP | 092-44475 A | 9/1997 |
| JP | 09-261609 A | 10/1997 |
| JP | 09-270965 A | 10/1997 |
| JP | 09289630 | 11/1997 |
| JP | 09322213 | 12/1997 |
| JP | 10-013774 A | 1/1998 |
| JP | 10-042235 | 2/1998 |
| JP | 10-42235 A | 2/1998 |
| JP | 10-501936 | 2/1998 |
| JP | 10042215 | 2/1998 |
| JP | 10042218 | 2/1998 |
| JP | 10-093933 | 4/1998 |
| JP | 10-143340 | 5/1998 |
| JP | 10-143349 | 5/1998 |
| JP | 10-228500 | 8/1998 |
| JP | 10228687 | 8/1998 |
| JP | 10257400 A | 9/1998 |
| JP | 2838892 | 10/1998 |
| JP | 1998289205 | 10/1998 |
| JP | 10-512420 | 11/1998 |
| JP | 11008810 | 1/1999 |
| JP | 11-136615 A | 5/1999 |
| JP | 11-136658 | 5/1999 |
| JP | 11177962 A | 7/1999 |
| JP | 11-266414 A | 9/1999 |
| JP | 11261917 A | 9/1999 |
| JP | 11-313280 A | 11/1999 |
| JP | 11308561 A | 11/1999 |
| JP | 11-353071 A | 12/1999 |
| JP | 2000-013708 | 1/2000 |
| JP | 2000/038886 A | 2/2000 |
| JP | 2000-138886 | 5/2000 |
| JP | 2000-224533 | 8/2000 |
| JP | 2000-235546 | 8/2000 |
| JP | 2000216845 A | 8/2000 |
| JP | 2000-261750 A | 9/2000 |
| JP | 2000-287179 A | 10/2000 |
| JP | 2000-306314 | 11/2000 |
| JP | 2000-312333 A | 11/2000 |
| JP | 2000-339931 A | 12/2000 |
| JP | 2001/008372 A | 1/2001 |
| JP | 2001-022282 A | 1/2001 |
| JP | 2001-086423 A | 3/2001 |
| JP | 2001-088372 | 4/2001 |
| JP | 2001103404 A | 4/2001 |
| JP | 2001-165669 | 6/2001 |
| JP | 2001-167522 | 6/2001 |
| JP | 2001167491 A | 6/2001 |
| JP | 2001-213595 | 8/2001 |
| JP | 2001-257950 | 9/2001 |
| JP | 2001-513595 | 9/2001 |
| JP | 2002/010153 A | 1/2002 |
| JP | 2002506327 A | 2/2002 |
| JP | 2002/185931 A | 6/2002 |
| JP | 2002/185951 A | 6/2002 |
| JP | 2002/199318 A | 7/2002 |
| JP | 2002-223425 | 8/2002 |
| JP | 2002-279969 | 9/2002 |
| JP | 2003-189200 A | 7/2003 |
| JP | 2003-199004 A | 7/2003 |
| JP | 2004-007592 A | 1/2004 |
| JP | 2004-023326 A | 1/2004 |
| JP | 2004-159004 A | 6/2004 |
| JP | 2006066968 A | 3/2006 |
| JP | 2006-340396 | 12/2006 |
| JP | 2007/053566 A | 3/2007 |
| JP | 4062577 | 3/2008 |
| JP | 2010/057201 A | 3/2010 |
| JP | 2010-119149 A | 5/2010 |
| JP | 4510282 | 7/2010 |
| JP | 5053378 B2 | 10/2012 |
| TW | 0247388 | 10/1994 |
| WO | WO-86/01359 A1 | 2/1986 |
| WO | WO-86/01962 | 3/1986 |
| WO | WO-87/03766 | 6/1987 |
| WO | WO-88/04057 A1 | 6/1988 |
| WO | WO-88/04507 | 6/1988 |
| WO | WO-89/02682 A1 | 3/1989 |
| WO | WO-89/03085 | 4/1989 |
| WO | WO-89/12370 | 12/1989 |
| WO | WO-90/00847 A1 | 1/1990 |
| WO | WO-90/01243 A1 | 2/1990 |
| WO | WO-90/07844 A1 | 7/1990 |
| WO | WO-90/15507 | 12/1990 |
| WO | WO-91/00670 | 1/1991 |
| WO | WO-91/05436 A1 | 4/1991 |
| WO | WO-91/06367 A2 | 5/1991 |
| WO | WO-91/06912 A1 | 5/1991 |
| WO | WO-91/07050 A1 | 5/1991 |
| WO | WO-91/18476 A1 | 11/1991 |
| WO | WO-92/04801 | 3/1992 |
| WO | WO-92/22983 A2 | 12/1992 |
| WO | WO-93/04473 | 3/1993 |
| WO | WO-93/05452 A1 | 3/1993 |
| WO | WO-9308542 | 4/1993 |
| WO | WO-93/11638 | 6/1993 |
| WO | WO-93/11639 | 6/1993 |
| WO | WO-93/11640 | 6/1993 |
| WO | WO-93/23957 A1 | 11/1993 |
| WO | WO-9322877 | 11/1993 |
| WO | WO-94/13107 | 6/1994 |
| WO | WO-94/13284 | 6/1994 |
| WO | WO-94/14281 A1 | 6/1994 |
| WO | WO-94/14282 A1 | 6/1994 |
| WO | WO-94/14283 A1 | 6/1994 |
| WO | WO-94/14284 A1 | 6/1994 |
| WO | WO-94/16441 A1 | 7/1994 |
| WO | WO-94/21085 A1 | 9/1994 |

(56) References Cited

FOREIGN PATENT DOCUMENTS

| | | |
|---|---|---|
| WO | WO-94/23383 A1 | 10/1994 |
| WO | WO-94/29811 A1 | 12/1994 |
| WO | WO-95/01056 | 1/1995 |
| WO | WO-95/01057 A1 | 1/1995 |
| WO | WO-95/01058 A1 | 1/1995 |
| WO | WO-95/01059 A1 | 1/1995 |
| WO | WO-95/02945 A1 | 1/1995 |
| WO | WO-95/04431 A2 | 2/1995 |
| WO | WO-95/06389 A1 | 3/1995 |
| WO | WO-95/07003 | 3/1995 |
| WO | WO-95/10910 | 4/1995 |
| WO | WO-95/15658 A1 | 6/1995 |
| WO | WO-95/16568 A1 | 6/1995 |
| WO | WO-9515649 A1 | 6/1995 |
| WO | WO-9515657 A1 | 6/1995 |
| WO | WO-95/19092 A1 | 7/1995 |
| WO | WO-95/26095 A2 | 9/1995 |
| WO | WO-95/26608 A1 | 10/1995 |
| WO | WO-95/28055 A1 | 10/1995 |
| WO | WO-95/28799 A1 | 10/1995 |
| WO | WO-95/30961 A1 | 11/1995 |
| WO | WO-95/32585 | 11/1995 |
| WO | WO-95/32587 | 11/1995 |
| WO | WO-9530302 A1 | 11/1995 |
| WO | WO-9531069 | 11/1995 |
| WO | WO-9532583 A1 | 11/1995 |
| WO | WO-9532584 | 11/1995 |
| WO | WO-95/33338 A1 | 12/1995 |
| WO | WO-96/07270 A1 | 3/1996 |
| WO | WO-96/08109 A1 | 3/1996 |
| WO | WO-96/08113 A1 | 3/1996 |
| WO | WO-96/08923 A1 | 3/1996 |
| WO | WO-96/09721 A1 | 3/1996 |
| WO | WO-96/13013 A1 | 5/1996 |
| WO | WO-96/13932 A1 | 5/1996 |
| WO | WO-96/13935 A1 | 5/1996 |
| WO | WO-96/17467 A2 | 6/1996 |
| WO | WO-96/17473 | 6/1996 |
| WO | WO-96/20555 | 7/1996 |
| WO | WO-96/21990 A2 | 7/1996 |
| WO | WO-96/25821 A1 | 8/1996 |
| WO | WO-96/26605 | 8/1996 |
| WO | WO-96/27270 A1 | 9/1996 |
| WO | WO-96/27982 | 9/1996 |
| WO | WO-96/27989 | 9/1996 |
| WO | WO-96/31980 A1 | 10/1996 |
| WO | WO-96/33572 | 10/1996 |
| WO | WO-96/34467 A1 | 10/1996 |
| WO | WO-96/34486 A1 | 10/1996 |
| WO | WO-96/34491 A1 | 10/1996 |
| WO | WO-96/36172 | 11/1996 |
| WO | WO-96/37075 | 11/1996 |
| WO | WO-96/37983 A1 | 11/1996 |
| WO | WO-96/37996 A1 | 11/1996 |
| WO | WO-96/38799 A1 | 12/1996 |
| WO | WO-96/38962 | 12/1996 |
| WO | WO-96/41418 A1 | 12/1996 |
| WO | WO-96/41470 A1 | 12/1996 |
| WO | WO-96/41471 A1 | 12/1996 |
| WO | WO-96/41472 | 12/1996 |
| WO | WO-96/41477 A1 | 12/1996 |
| WO | WO-96/41478 | 12/1996 |
| WO | WO-97/02702 A2 | 1/1997 |
| WO | WO-97/04595 A1 | 2/1997 |
| WO | WO-97/07656 | 3/1997 |
| WO | WO-97/12486 | 4/1997 |
| WO | WO-97/13368 | 4/1997 |
| WO | WO-97/17774 A1 | 5/1997 |
| WO | WO-97/18675 | 5/1997 |
| WO | WO-97/19555 A1 | 5/1997 |
| WO | WO-97/21291 A2 | 6/1997 |
| WO | WO-97/23997 A1 | 7/1997 |
| WO | WO-97/26612 A1 | 7/1997 |
| WO | WO-97/29458 A1 | 8/1997 |
| WO | WO-97/31480 | 8/1997 |
| WO | WO-97/32434 A1 | 9/1997 |
| WO | WO-97/34413 | 9/1997 |
| WO | WO-97/34414 | 9/1997 |
| WO | WO-97/36422 | 10/1997 |
| WO | WO-97/37500 A1 | 10/1997 |
| WO | WO-97/40623 | 10/1997 |
| WO | WO-97/41673 A2 | 11/1997 |
| WO | WO-97/42763 | 11/1997 |
| WO | WO-97/45786 | 12/1997 |
| WO | WO-97/46016 | 12/1997 |
| WO | WO-97/46943 A1 | 12/1997 |
| WO | WO-97/47106 | 12/1997 |
| WO | WO-97/47124 | 12/1997 |
| WO | WO-97/47143 | 12/1997 |
| WO | WO-97/48228 A1 | 12/1997 |
| WO | WO-97/48230 | 12/1997 |
| WO | WO-97/49237 | 12/1997 |
| WO | WO-97/49241 | 12/1997 |
| WO | WO-97/49242 | 12/1997 |
| WO | WO-97/50251 | 12/1997 |
| WO | WO-98/00975 A1 | 1/1998 |
| WO | WO-98/00976 | 1/1998 |
| WO | WO-98/01995 | 1/1998 |
| WO | WO-98/06219 | 2/1998 |
| WO | WO-98/07277 A1 | 2/1998 |
| WO | WO-98/10589 A1 | 3/1998 |
| WO | WO-98/12872 | 3/1998 |
| WO | WO-98/14009 A1 | 4/1998 |
| WO | WO-98/16062 | 4/1998 |
| WO | WO-98/17033 A1 | 4/1998 |
| WO | WO-98/17063 A1 | 4/1998 |
| WO | WO-98/17064 A1 | 4/1998 |
| WO | WO-98/18260 A1 | 4/1998 |
| WO | WO-98/19459 A1 | 5/1998 |
| WO | WO-98/20675 A1 | 5/1998 |
| WO | WO-98/21664 A1 | 5/1998 |
| WO | WO-98/21877 | 5/1998 |
| WO | WO-98/21877 A2 | 5/1998 |
| WO | WO-98/26569 A2 | 6/1998 |
| WO | WO-98/26584 | 6/1998 |
| WO | WO-98/26596 | 6/1998 |
| WO | WO-98/27723 | 6/1998 |
| WO | WO-98/28906 A2 | 7/1998 |
| WO | WO-98/31115 A2 | 7/1998 |
| WO | WO-98/31116 A2 | 7/1998 |
| WO | WO-98/31148 A1 | 7/1998 |
| WO | WO-98/34405 A1 | 8/1998 |
| WO | WO-98/37695 | 8/1998 |
| WO | WO-98/38831 A1 | 9/1998 |
| WO | WO-98/39893 A2 | 9/1998 |
| WO | WO-98/41020 A1 | 9/1998 |
| WO | WO-98/43183 A1 | 10/1998 |
| WO | WO-98/43406 A1 | 10/1998 |
| WO | WO-98/47279 | 10/1998 |
| WO | WO-98/47283 | 10/1998 |
| WO | WO-98/47290 A1 | 10/1998 |
| WO | WO-98/48566 A2 | 10/1998 |
| WO | WO-98/53611 A1 | 11/1998 |
| WO | WO-98/56172 A1 | 12/1998 |
| WO | WO-98/56173 A1 | 12/1998 |
| WO | WO-98/56176 A1 | 12/1998 |
| WO | WO-98/56712 A1 | 12/1998 |
| WO | WO-99/01984 A1 | 1/1999 |
| WO | WO-99/03267 A1 | 1/1999 |
| WO | WO-99/04561 | 1/1999 |
| WO | WO-99/04570 | 1/1999 |
| WO | WO-99/07142 A1 | 2/1999 |
| WO | WO-99/11060 A1 | 3/1999 |
| WO | WO-99/12320 A1 | 3/1999 |
| WO | WO-99/12346 A2 | 3/1999 |
| WO | WO-99/14947 A1 | 3/1999 |
| WO | WO-99/18721 A1 | 4/1999 |
| WO | WO-99/18722 | 4/1999 |
| WO | WO-99/22502 A1 | 5/1999 |
| WO | WO-99/27681 A2 | 6/1999 |
| WO | WO-99/28897 A1 | 6/1999 |
| WO | WO-99/29109 A1 | 6/1999 |
| WO | WO-99/30491 A1 | 6/1999 |
| WO | WO-99/31480 A1 | 6/1999 |

(56) References Cited

FOREIGN PATENT DOCUMENTS

| | | |
|---|---|---|
| WO | WO-99/33265 A1 | 7/1999 |
| WO | WO-99/35584 A2 | 7/1999 |
| WO | WO-99/35827 A1 | 7/1999 |
| WO | WO-99/37045 A1 | 7/1999 |
| WO | WO-99/38092 A1 | 7/1999 |
| WO | WO-99/39280 | 8/1999 |
| WO | WO-99/39466 A1 | 8/1999 |
| WO | WO-99/45700 | 9/1999 |
| WO | WO-99/45701 A1 | 9/1999 |
| WO | WO-99/45702 | 9/1999 |
| WO | WO-99/52279 | 10/1999 |
| WO | WO-99/52285 A1 | 10/1999 |
| WO | WO-99/56466 | 11/1999 |
| WO | WO-99/56473 A1 | 11/1999 |
| WO | WO-99/57707 A1 | 11/1999 |
| WO | WO-99/57837 A2 | 11/1999 |
| WO | WO-99/57839 | 11/1999 |
| WO | WO-99/59275 A1 | 11/1999 |
| WO | WO-99/60493 A1 | 11/1999 |
| WO | WO-99/60783 | 11/1999 |
| WO | WO-99/60789 | 11/1999 |
| WO | WO-99/60790 | 11/1999 |
| WO | WO-99/65237 A1 | 12/1999 |
| WO | WO-99/65244 A1 | 12/1999 |
| WO | WO-99/66725 | 12/1999 |
| WO | WO-99/66726 A1 | 12/1999 |
| WO | WO-00/04706 A2 | 1/2000 |
| WO | WO-00/04708 A1 | 1/2000 |
| WO | WO-00/04709 A1 | 1/2000 |
| WO | WO-0002380 A2 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-0005889 A1 | 2/2000 |
| WO | WO-00/11865 A1 | 3/2000 |
| WO | WO-00/13415 A2 | 3/2000 |
| WO | WO-00/14951 A1 | 3/2000 |
| WO | WO-00/16548 | 3/2000 |
| WO | WO-0011869 A1 | 3/2000 |
| WO | WO-0013416 A1 | 3/2000 |
| WO | WO-0016336 A1 | 3/2000 |
| WO | WO-00/28379 A1 | 5/2000 |
| WO | WO-00/28734 | 5/2000 |
| WO | WO-00/28739 | 5/2000 |
| WO | WO-0027122 A1 | 5/2000 |
| WO | WO-0027124 A1 | 5/2000 |
| WO | WO-00/33560 A2 | 6/2000 |
| WO | WO-00/33573 A1 | 6/2000 |
| WO | WO-00/33578 A1 | 6/2000 |
| WO | WO-0033160 A2 | 6/2000 |
| WO | WO-0033224 A1 | 6/2000 |
| WO | WO-0035193 A1 | 6/2000 |
| WO | WO-00/40014 A1 | 7/2000 |
| WO | WO-00/40025 A1 | 7/2000 |
| WO | WO-00/49801 A1 | 8/2000 |
| WO | WO-00/51310 A1 | 8/2000 |
| WO | WO-00/57645 A1 | 9/2000 |
| WO | WO-00/58214 A1 | 10/2000 |
| WO | WO-00/58833 | 10/2000 |
| WO | WO-00/58967 | 10/2000 |
| WO | WO-00/59214 A1 | 10/2000 |
| WO | WO-00/59220 A1 | 10/2000 |
| WO | WO-00/59223 | 10/2000 |
| WO | WO-00/62298 | 10/2000 |
| WO | WO-00/62299 | 10/2000 |
| WO | WO-00/62533 | 10/2000 |
| WO | WO-00/67475 | 11/2000 |
| WO | WO-00/78050 A1 | 12/2000 |
| WO | WO-00/79798 | 12/2000 |
| WO | WO-01/01308 A2 | 1/2001 |
| WO | WO-01/01677 A1 | 1/2001 |
| WO | WO-01/06784 A2 | 1/2001 |
| WO | WO-0103088 A1 | 1/2001 |
| WO | WO-01/11865 A1 | 2/2001 |
| WO | WO-0110126 A1 | 2/2001 |
| WO | WO-0110128 A1 | 2/2001 |
| WO | WO 01/15438 A1 | 3/2001 |
| WO | WO-01/22729 | 3/2001 |
| WO | WO-0119086 | 3/2001 |
| WO | WO-01/35662 A1 | 5/2001 |
| WO | WO-01/37549 A2 | 5/2001 |
| WO | WO-01-46843 A2 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-0146869 | 6/2001 |
| WO | WO-0150743 | 7/2001 |
| WO | WO-0158158 | 8/2001 |
| WO | WO-01/75649 A2 | 10/2001 |
| WO | WO-01/76239 | 10/2001 |
| WO | WO-01/76248 A2 | 10/2001 |
| WO | WO-01/76704 A2 | 10/2001 |
| WO | WO-01/89213 A1 | 11/2001 |
| WO | WO-0182600 A2 | 11/2001 |
| WO | WO-01/93588 A2 | 12/2001 |
| WO | WO-02/25938 | 3/2002 |
| WO | WO-02/31731 | 4/2002 |
| WO | WO-02/31731 A2 | 4/2002 |
| WO | WO-02/067579 A1 | 8/2002 |
| WO | WO-02/069636 A1 | 9/2002 |
| WO | WO-02/078317 | 10/2002 |
| WO | WO-02/084992 A2 | 10/2002 |
| WO | WO-03/005712 A1 | 1/2003 |
| WO | WO-03/036970 A1 | 5/2003 |
| WO | WO-03/047235 A2 | 6/2003 |
| WO | WO-03/051051 A1 | 6/2003 |
| WO | WO-2004/002156 A1 | 12/2003 |
| WO | WO-2004/066180 A1 | 8/2004 |
| WO | WO-2004066180 | 8/2004 |
| WO | WO-2004/100526 A2 | 11/2004 |
| WO | WO-2005/027512 A1 | 3/2005 |
| WO | WO-2006/079977 A2 | 8/2006 |
| WO | WO-2006079977 | 8/2006 |
| WO | WO-2007/070422 A2 | 6/2007 |
| WO | WO-2007/096815 A1 | 8/2007 |
| WO | WO-2007/106464 A2 | 9/2007 |

OTHER PUBLICATIONS

"Final Office Action", U.S. Appl. No. 11/716,236, (Jul. 2, 2009),11 pages.
"Final Office Action", U.S. Appl. No. 11/716,236, (Nov. 4, 2009),11 pages.
"Non Final Office Action", U.S. Appl. No. 11/716,236, (Feb. 26, 2009),10 pages.
"Non-Final Office Action", U.S. Appl. No. 12/846,442, (Sep. 20, 2012),11 pages.
"Notice of Allowance", U.S. Appl. No. 11/716,236, (May 27, 2010), 7 pages.
"Notice of Allowance", U.S. Appl. No. 12/846,442, (Mar. 1, 2013), 7 pages.
"PCT Search Report and Written Opinion", Application No. PCT/US2008055460, (Aug. 8, 2008),13 pages.
Gutta, Srinivas et al., "TV Content Recommender System", http://pages.stern.nyu.edu/~ksk227/TV_content_recommender_AAAI2000.pdf, (2000), 3 pages.
Gutta, Srinivas et al., "TV Content Recommender System", Proceedings of the Seventeenth National Conference on Artificial Intelligence and Twelfth Conference on Innovative Applications of Artificial Intelligence, (Jul. 30, 2000), 2 pages.
Kojima, Akira et al., "Implementation Measures to Expand Metadata Application Services", http://www/ntt.co.jp/tr/0306/files/ntr200306051.pdf, (Jun. 2003), 6 pages.
Lee, Hee-Kyung et al., "Personalized Contents Guide and Browsing based on User Preference", http://vega.icu.ac.kr/~mccb-lab/publications/Paper/PersonalizedTV(2002).pdf, (2002),10 Pages.
Tol, et al., "Requirements and Scenarios for the Bi-directional Transport of Metadata", TV Anytime Meeting, Version 1.0, Document TV150,(Aug. 2, 2002), 7 pages.

(56) References Cited

OTHER PUBLICATIONS

U.S. Appl. No. 60/061,119, Oct. 6, 1997, Ward et al.
U.S. Appl. No. 09/356,268, Jul. 16, 1999, Rudnick et al.
U.S. Appl. No. 09/332,244, Jun. 11, 1999, Ellis et al.
U.S. Appl. No. 09/330,792, Jun. 11, 1999, Knudson et al.
"A New Approach to Addressability," CableData Brochure, 9 pages, undated.
"A Wonderworld of Services," The Sunday Times, Innovation section, p. 4, Jan. 7, 1996.
"Advanced Analog Systems—Addressable Terminals," General Instrument Corp. of Horsham, Pennsylvania, URL:http—www.gi.com-BUSAREA-AALOG-TERMINAL-WATCH-watch.html)—Printed from the Internet on Mar. 4, 1999.
"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013, 1 page.
"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013, 3 pages.
"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013, 2 pages.
"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013, 1 page.
"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013, 1 page.
"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013, 5 pages.
"Columbia House Laser Disc Club: Join the Club," accessed from the internet at http://web.archive.org/web/19961221094037/http://www.columbiahouse.com/repl/lc/t . . . , copyright 1996, printed on Sep. 20, 2013, 2 pages.
"Columbia House Music Club: Join the Club," accessed from the internet at http://web.archive.org/web/19961221091101/http://www.columbiahouse.com/repl/mc . . . , copyright 1996, printed on Sep. 20, 2013.
"Columbia House Music Club: Search," accessed from the internet at http://web.archive.org/web/19961221114653/http://www.columbiahouse.com/repl/mc . . . , copyright 1996, printed on Sep. 19, 2013, 1 page.
"Columbia House Music Club: Shopping Cart," accessed from the internet at http://web.archive.org/web/19961221120941/http://www.columbiahouse.com/mc/cgis . . . , copyright 1996, printed on Sep. 19, 2013, 1 page.
"Columbia House Video Club: Essential Collection," accessed from the internet at http://web.archive.org/web/199612211131908/http://www.columbiahouse.com/vc/cgis/j . . . , copyright 1996, printed on Sep. 20, 2013, 1 page.
"Comdex—Mitsubishi Previews 40-Inch DiamondWeb TV," Newsbytes, Nov. 19, 1996, Abstract 2 pages.
"Cool Websites: [2 Star Edition]," Houston Chronicle, Houston, Texas, Jul. 11, 1996, p. 3, Abstract.
"Description of Digital Audio-Visual Functionalities (Technical Report)," Digital Audio-Visual Council (DAVIC), 1.3.1 Par 1:1998, 86 pages.
"Directv Digital Satellite Receiver—Operating Instructions," Sony Electronics Inc. (2001).
"Directv Plus2 System", Thompson Consumer Electronics, Inc. (1999).
"Directv Receiver—Owner's Manual," Directv, Inc. (2002).
"Directv Receiver with TiVo Digital Satellite Receiver-Recorder SAT-T60—Installation Guide," Sony Corporation (2000).
"Directv Receiver with TiVo Installation Guide," Philips (2000).
"Directv Receiver with TiVo Viewer's Guide" (1999, 2000).
"DishPro Satellite System—User's Guide," Dish Network, (undated), accessed 2008.
"Hobbes' Internet Timeline," RFC 2235, Mar. 22, 2007, 17 pages.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998, 1 page.
"Lists> What's On Tonite TV Listings" Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006].
"Neue, Digitale Strategien—Bericht Von Den 5. Dermastaedter Fernsehtagen," FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947.
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 8, 1999, 3 pages.
"Personal Entertainment Guide—User's Guide," Version 1.0, Copyright 1991 by Lookahead Communications Inc, 82 pages.
"Prevue Channel Sep. 1, 1995 (part 1)," Prevue Guide, from the internet at http://www.youtube.com/watch?v=OVul78nH6RY, retrieved on Nov. 26, 2013, 1 page.
"Prevue Online Debuts Local Listings for 250 Systems; System-Specific Listings Include Multimedia Features—Free Build Acceleration," PR Newswire, Jun. 5, 1997, 2 pages.
"Prevue Online," Dec. 28, 1996, extract from web.archive.org, printed on Nov. 18, 2014, http://www.prevue.com, 1 page.
"PTV Recorder Setup Guide," Philips (2000).
"Reaching your subscribers is a complex and costly process-until now," from the Internet at http://www.evolveproducts.com/info.html, printed on Dec. 28, 1998, 1 page.
"Rewind, replay and unwind with new high-tech TV devices," by Lawrence J. Magid, LA Times. This document was printed from the Internet on Jun. 6, 1999 and bears a date of May 19, 1999.
"SONICblue Incorporated: ReplayTV 4000 User Guide 12.17, Chapter Five: Networking, Sep. 10, 2001, retrieved from the internet: (2001)."
"StarSight Interactive Television Program Guide III" Jim Leftwich and Steve Schein, Functional/Interactional Architecture Specification Document, Orbit Interaction, Palo Alto, California, Published before Apr. 19, 1995, 36 pages.
"Start Here," Sony, TiVo and Directv, (undated), accessed 2008.
"Step Up to the Superhighway," The Sunday Times, Innovation section, p. 6, Jan. 7, 1996.
"Sun's Next Steps in Digital Set-Tops," article in Cablevision, p. 56, Nov. 16, 1998.
"Television Viewing Habits of Three IQ Groups of Urban Middle School Students", KUNST, University of Pittsburgh, 1986, pp. 2-219 (54 pages).
"The Evolve EZ Guide. The Remote Control," from the Internet at http://www.evolveproducts.com/display2.html, printed on Dec. 28, 1998, 1 page.
"Viewdata Service Terminal Specification," British Post Office, Issue 5, Aug. 1978, 57 pages.
"VPV-Videotext Programs Videorecorder", by Bensch, IEEE Jun. 1988, pp. 788-792.
"What is Jini?", from the Internet at http://java.sun.com/products/jini/whitepapers/whatsjini.pdf, printed on Jan. 25, 1999, 4 pages.
"What's New @ Prevue Online—Real™Video," May 2, 1997, extract from web.archive.org, printed on Nov. 18, 2014, http://www.prevue.com/scripts/whatsnew.asp, 5 pages.
"What's On Tonite!," Jan. 28, 1995, retrieved from the internet at http://www.library.georgetown.edu/newjour/publication/whats-tonite-tm, retrieved on Dec. 11, 2013, 9 pages.

(56) References Cited

OTHER PUBLICATIONS

"Why Jini Now?", from the internet at http://java.sun.com/products/jini/whitepapers/whyjininow.pdf, printed on Jan. 25, 1999. The document bears a copyright date of 1998, 16 pages.
"Windows 98 Feature Combines TV, Terminal and the Internet," New York Times, Aug. 18, 1998.
"Yearling's Free Personalised TV Guide," from the internet at http://www.yearling.com/, Dec. 30, 1996, 15 pages.
272OR Satellite Receiver User's Guide, General Instrument, 1991, pp. 58-61.
A Financial Times Survey: Viewdata (Advertisement), Financial Times, Mar. 20, 1979.
A Financial Times Survey: Viewdata (Advertisement), Financial Times, May 20, 1979, 3 pages.
ACM Multimedia 93 Proceedings, "A Digital On-Demand Video Service Supporting Content-Based Queries," Little et al. pp. 427-436, Jul. 1993.
Addressable Converters: A New Development at CableData, Via Cable, vol. 1, No. 12, Dec. 1981.
Advertisement for "TV Decisions," Cable Vision, Aug. 4, 1986.
Aho, Debra, "New Delphi Ads Push Envelope: Starting Visuals From Upstart Agency Go Too Far for One Paper's Tastes," Advertising Age 0.0, May 30, 1994, 2 pages, Abstract.
Alexander, Michael "*Visualizing cleared-off desktops,*" *Computerworld*, May 6, 1991, p. 20.
Anderson et al., UNIX Communications and the Internet (3d ed. 1995), 846 pages.
Antonoff, "Interactive Television," Popular Science, Nov. 1992, 7 pages.
Antonoff, M., "*Stay Tuned for Smart TV,*" *Popular Science*, Nov. 1990, pp. 62-65.
Armstrong, "Channel-Surfing's next wave: Henry Yuen's interactive TV guide takes on TCI and Viacom," BusinessWeek, Jul. 31, 1995, 3 pages.
Arnold, "Britain to get wired city—via telephone," Electronics, Mar. 4, 1976, at 76, 3 pages.
Bach, et al., "Multimedia TV Set, Part 1" Radio-Fernsehen Elektronik (RFE), Sep. 1996, pp. 28, 30, 31, 12 pages. (English language translation attached.)
Bach, et al., "Multimedia TV Set, Part 2 and Conclusion," Radio-Fernsehen Elektronik (RFE), 10/96, 11 pages. (English language translation attached.).
Baer, R.H, "Innovative Add-On TV Products," IEEE Transactions on Consumer Electronics, vol. CE-25, Nov. 1979, pp. 765-771.
Beddow, "The Virtual Channels Subscriber Interface," Communications Technology, Apr. 30, 1992, 2 pages.
Bell Atlantic Buys Cable TV Company for $22bn, Financial Times (London), Oct. 14, 1993 p. 65.
Benson, U., "*VPV Videotext Programs Videorecorder,*" *IEEE Paper*, Jun. 1988, pp. 788-792.
Berniker, "TV Guide going online", Broadcasting & Cable, pp. 49-52, Jun. 13, 1994, 6 pages.
Bertuch, "New Realities for PCs: Multimedia between aspiration and commerce," (translation), Exhibit NK 12 of TechniSat's nullity action against EP'111, (1991), 12 pages.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Blahut et al., "Interactive Television," Proceedings of the IEEE, pp. 1071-1085, Jul. 1995.
Boyd-Merritt, "Television wires two-way video," Electronic Engineering Times, Apr. 25, 1994, 3 pages.
Brochure, "Weststar and Videotoken Network Present the CableComputer," Revised Aug. 15, 1985, 41 pages.
Brochure, Time Inc., "Now, Through the Advances of the Computer Age, You Can Get the Information You Want, When You Want It. Instantly and Conveniently, On Your Home TV Screen," Time Teletext, Time Video Information Services, Inc., 9 pages, undated (V 79167-79175).
Brochure, VTN "Videotoken Network, New Dimension Television," Dec. 1985 (Plaintiffs Exhibit 313).
Brochure, VTN "Videotoken Network, New Dimension Television," Dec. 1985, 10 pages.
Brugliera, "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39. (English language translation attached.).
*Cable Computer User's Guide*, Rev. 1, Dec. 1985 (Plaintiff's Exhibit 289).
Cable Computer User's Guide, Rev. 1, Dec. 1985, 4 pages.
Cable Television Equipment, Jerrold Communications Publication, dated 1992 and 1993, pp. 8-2.1 to 8-6 and 8-14.1 to 8-14.3.
CableData, Roseville Consumer Presentation, Mar. 1985 12 pages.
Came, E.B., "*The Wired Household,*" *IEEE Spectrum*, vol. 16 No. 10, Oct. 1979, pp. 61-66.
Case 4:11-cv-06591-PJH, Complaint for Declaratory Relief (plaintiff), dated Dec. 21, 2011, 16 pages.
Chan, "Learning Considerations in User Interface Design: The Room Model," Publication of the Software Portability Laboratory, University of Waterloo, Ontario, Canada, Jul. 1984, 52 pages.
Chang et al., "An Open-Systems Approach to Video on Demand," IEEE Communications Magazine, May 1994, pp. 68-80.
Chen et al., "Real Time video and Audio in the World Wide Web," Proc. 4th World Wide Web Conference, 1995, 15 pages.
Cherrick et al., "An Individually Addressable TV Receiver With Interactive Channel Guide Display, VCR, and Cable Box Control", IEEE Transactions on Consumer Electronics, vol. 4:3 (Aug. 1994), pp. 317-28.
Christodoulakis, Steven and Graham, Stephen "*Browsing Within Time-Driven Multimedia Documents,*" publication of the Institute for Computer Research, University of Waterloo, Waterloo, Ontario, Canada Jul. 1988 pp. 219-227.
Cleland, Kim, "Look Out MSN, Here Comes MCI," Advertising Age, vol. 66, No. 32, Aug. 14, 1995, 2 pages.
CNN Tech: Sonicblue revives ReplayTV, articles cnn.com, Sep. 10, 2001, retrieved from the internet: http://articles.cnn.com/2001-09-10/tech/replay.tv.idg_1_replaytv-sonicblue-digital-video?_s=PM:TECH, 2 pages.
Communication of a Notice of Opposition, European Patent Application No. 08103167.6, Jan. 11, 2012, 24 pages.
Complainant's Post-Hearing Brief (redacted) filed Mar. 22, 2013, 43 pages.
Complainant's Post-Hearing Reply Brief (redacted) filed Mar. 29, 2013, 21 pages.
Complainants' Opp to Netflix's MSD of Invalidity of USP '776 and Complainants' Statement of Facts filed Jan. 14, 2013, 62 pages.
Complainants' Pre-Hearing Statement (redacted) filed Feb. 8, 2013, 96 pages.
Compton et al., "Internet CNN Newsroom: A digital video news magazine and library," Proceedings of the Intl. Conf. on Multimedia Computing and Systems, Washington, May 15-18, 1995; Los Alamitos, IEEE Comp. Soc. Press, U.S., May 15, 1995, pp. 296-301, XP010154611.
Computer Network: Current Status and Outlook on Leading Science and Technology, Bureau of Science & Technology (Japan), vol. 1, Dec. 1986, 326 pages.
Contents of the website of StarSight Telecast, Inc. (http://www.StarSight.com) as of Apr. 21, 2004, 1 page.
U.S. Appl. No. 60/179,548, filed Feb. 1, 2000, 11 pages.
Cox, J. et al, "Extended Services in a Digital Compression System," Proceedings from Eleven Technical Sessions: 42nd Annual Convention and Exposition of the National Cable Television Association, Jun. 1993, pp. 185-191.

(56) References Cited

OTHER PUBLICATIONS

Creation/Modification of the Audio Signal Processor Setup for a PC Audio Editor, IBM Technical Disclosure Bulletin, vol. 30, No. 10, Mar. 1988, pp. 367-376.
Cue Readers, Digital: Convergence Corporation, at http://www.crq.com/rnastertempl.cfm?view=products&products=cuereader (printed Sep. 24, 2001).
D2B-Home Bus Fur Audio and Video, Selektor, Apr. 1990, pp. 10, 12, 8 total pages.
Daily, "Addressable Decoder with Downloadable Operation," Proceedings from the Eleven Technical Sessions, 42nd Annual Convention and Exposition of the NCTA, Jun. 6-9, 1993, pp. 82-89.
Damouny, "Teletext Decoders—Keeping Up With the Latest Advances," IEEE Transactions on Consumer Electronics, vol. CE-30, No. 3, Aug. 1984, pp. 429-435.
Das, D. and ter Horst, H., Recommender Systems for TV, Technical Report WS-98-08—Papers from the AAAI Workshop, Madison, WI (1998), 2 pages.
Davic 1.0 Specifications, Part 1, "Description of Davic Functionalities," Revision 3.2, Digital Audio-Visual Council, Jul. 10, 1995, 61 pages.
Davic Digital Audio-Visual Council, Davic 1.5 Specification, Baseline Document 1, Revised 4.0, Applications for Home Storage and Internet Based Systems, Published by Digital Audio-Visual Council 1995-1999, 27 pages.
Davis, TV Guide On Screen, "Violence on Television", House of Representatives, Committee on Energy and Commerce, Subcommittee on Telecommunications and Finance, pp. 93-163, Jun. 25, 1993.
Day, "The Great PC/TV Debate," OEM Magazine, Jul. 1, 1996, 6 pages.
Dec., "Presenting Java," Sams.net Publishing, published Sep. 20, 1995, 219 pages.
Defence and Counterclaim of the First and Second Defendants, No. HC11 C 04556, between Starsight Telecast and United Video Properties (Claimants) and Virgin Media, Virgin Media Payments, and TiVo (Defendants), Mar. 14, 2012, 16 pages.
Dial M for Movie, Funkschau 11/94 Perspektiven, Video on Demand, vol. Nov. 1994, 5 pages. (English language translation attached).
Dialing the printed page, ITT in Europe Profile, 11/Spring 1977, 2 pages.
Digital TV—at a price, New Scientist, Sep. 15,1983, vol. 99. No. 1375, 3 pages.
Digital Video Broadcasting (DVB); DVB specification for data broadcasting, European Telecommunication Standards Institute, Draft EN 301 192 V1.2.1 (Jan. 1999).
Dinwiddle et al., "Combined-User Interface for Computers, Televison, Video Recorders, and Telephone, etc." IBM Technical Disclosure Bulletin, vol. 33(3B), pp. 116-118 (1990), 3 pages.
Directv Plus2 System, Thompson Consumer Electronics, Inc. (1999), 2 pages.
Directv Receiver—Owner's Manual, Samsung, Directv, Inc. (2002), 118 pages.
Directv Receiver with TiVo Digital Satellite Receiver/Recorder SAT-T60- .
Directv Receiver with TiVo Installation Guide, Philips, TiVo Inc. (2000), 68 pages.
Directv Receiver with TiVo Viewer's Guide, TiVo Inc., Sony Corp. (1999, 2000), 152 pages.
DiRosa, S. "Bigsurf Netguide", Jul. 1995, vol. 3.1 (Sections 18,21, and 28—renumbered as pp. 1-27).
DishPro Satellite System—User's Guide, Dish Network (Sep. 1, 2001), 144 pages.
Does NBC Get It, Aug. 14, 1995, retrieved from the internet at http://www.open4success.org/db/bin19/019687.html, retrieved on Dec. 11, 2013, 1 page.
Dr. Dobb's, "Implementing a Web Shopping Cart," from the internet at https://www.drdobbs.com/article/print?articleId=184409959&siteSect . . . , Sep. 1, 1996, printed from the internet on Sep. 13, 2012, 15 pages.

Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.
Duck Tales, (1987)[TV Series 1987-1990], Internet Movie Database (IMDB) [Retrieved on Apr. 7, 2007], 5 pages.
Eckhoff, "TV Listing Star on the Computer," Central Penn Business Journal, High Beam Research, Mar. 15, 1996, 4 pages.
Edwardson, S.M., & Gee, A., "CEEFAX: A Proposed New Broadcasting Service," Journal of the SMPTE, Jan. 1974, vol. 83 No. 1, pp. 14-19.
Ehrmantraut et al., "The Personal Electronic Program Guide—Towards the Pre-Selection of Individual TV Programs," CIKM 96, Rockville, MD., Dec. 31, 1996.
Eitz et al., "Videotext Programmiert Videoheimgerate," Rundfunktech Mitteilungen, Jahrg. 30, H.5, 1986, S. 223 bis 229, 21 pages. (English translation attached).
Eitz, Gerhard, "Zukunftige Informations-und Datenangebote beim dig italen Femsehen-EPG Und 'Lesezeichen'," RTM Rundfunktechnische Mitteilungen, Jun. 1997, vol. 41, pp. 67-72.
Electronic Program Guide via Internet, Research Disclosure, Kenneth Mason Publications, Hampshire, GB vol. 385(2) (May 1996) p. 276, ISSN:0374-4353.
Electronic Programme Guide (EPG); Protocol for a TV Guide using electronic data transmission, by European Telecommunication Standards Institute, May 1997, Valbonne, France, publication No. ETS 300 707.
Enhanced Content Specification, ATVEF, from the internet at http://www.atvetcomilibraryispec.html, printed Aug. 22, 2001, the document bears a Copyright date of 1998, 1999, 2000, 41 pages.
EP1099347 Opposition File History—Foreign Counterpart of U.S. Pat. No. 6,898,762 (priority date Aug. 21, 1998) (73 pages).
Ernst & Young "On track: A primer on media asset identification" May 2011, retrieved from the internet May 29, 2014, URL http://www.ey.com/Publication/vwLUAssets/Media_asset_identification_primer/$FILE/Media_Entertainment.pdf, 52 pages.
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994, 64 pages.
Facsimile Transmission, NHK Research Monthly Report, Dec. 1987, 78 pages. (unknown author).
Fall 2001 TiVo Service Update with Dual Tuner!, TiVo Inc. (2001), 9 pages.
Fry et al., "Delivering QoS Controlled Continuous Media on the World Wide Web," Proceedings of the 4th International IFIP Workshop on QoS, Paris, Mar. 6-8, 1996, 12 pages.
Fuller, C., Streaming gijutsu no genzai Web video system no gaiyou [Current Streaming Technology, Outline of Web Video System], UNIX Magazine, Japan, ASCII K.K., Mar. 1, 2000, vol. 15, No. 3, 11 pages.
GameSpot's Downloads for Allied General, accessed from the internet at http://web.archive.org/web/19970205060703/http://www.gamespot.com/strategy/allie . . . , copyright 1997, printed on Sep. 19, 2013, 1 page.
GameSpot: Allied General—Download It Now!!!!, accessed from the internet at http://web.archive.org/web/19970206133452/http://www.gamespot.com/strategy/allie . . . , copyright 1997, printed on Sep. 19, 2013.
GameSpot: Allied General at a Glance, accessed from the internet at http://web.archive.org/web/19970205153530/http://www.gamespot.com/strategy/allie . . . , copyright 1996, printed on Sep. 19, 2013.
Garneau, "Information Highway in Quebec," Editor & Publisher, vol. 127, No. 5, Jan. 29, 1994, 4 pages.
Gateway Destination: The PC for the Office and the Family Room, PC Magazine, First Looks section, pp. 39-41, Jun. 11, 1996, 3 pages.
Gavron, Jacquelyn, Moran, Joseph, How to Use Microsoft Windows NT 4 Workstation, 1996, entire document, 5 pages.
Gemstar Development Corporation, VCR plus +, 1990 pp. 1-6.
Getting Started Installation Guide, Using StarSight 1 Manual, and Remote Control Quick Reference Guide, copyright 1994, 93 pages.

(56) References Cited

OTHER PUBLICATIONS

GoCode, The Code Corporate at http://www.gocode.com/products/reader.htm (printed Sep. 24, 2001).
Goff, Leslie, "Subs Find Lots of Program Guides Online," Multichannel News, vol. 17, No. 19, May 6, 1996, p. 38, Abstract, 3 pages.
Google News Archives—printout, received at the EPO on Mar. 22, 2007, 2 pages.
Grounds, facts and Evidence in Support of Opposition to EP-1961228 (Dec. 11, 2011; 22 pages).
Growing US interest in the impact of viewdata, Computing Weekly, Jul. 20, 1978, 1 page.
Gutta, Srinivas et al., "TV Content Recommender System", Proceedings of the Seventeenth National Conference on Artificial Intelligence and Twelfth Conference on Innovative Applications of Artificial Intelligence, (Jul. 30, 2000),2 pages.
Hallenbeck, P., Developing an interactive television system that works, R&D Magazine, vol. 39:7, Jun. 1997, 4 pages.
Harada, Mamoru et al., "Internet de telebi housou ga hajimaru," ("Television Broadcasting Starts with the Internet"), Nikkei Electronics, Japan, Nikkei BP, No. 653, Jan. 15, 1996, 14 pages. (Concise explanation included in IDS letter.).
Hartwig et al. "Broadcasting and Processing of Program Guides for Digital TV," SMPTE Journal, pp. 727-732, Oct. 1997.
Hauptmann et al., "News on Demand," News-on-Demand: An Application of Informedia® Technology D-Lib Magazine, Sep. 13, 1995, XP002675162, Retrieved from the Internet: URL:http://www.dlib.org/dlib/september95/nod/page3.html [retrieved on May 2, 2012], 1 page.
Hedger, "Telesoftware: Home Computing Via Broadcast Teletext," IEEE Transactions on Consumer Electronics, vol. CE-25, No. 3, Jul. 1979, 11 pages.
Hendrix, "A Natural Language Interface Facility", Artificial Intelligence Center, Stanford Research Institute, SIGART Newsletter, No. 61, Feb. 1977, 2 pages.
Hill, et al., "Recommending and Evaluating Choices in a Virtual Community of Use" CHI '95 Mosaic of Creativity, pp. 194-201 (1995).
Hitachi Consumer Electronics Co., Ltd., Certification of market introduction in 1993 of Hitachi Projection TV Model 55EX7K, Dec. 17, 2012, 1 page.
Hitachi Projection Color TV Operating Guide, for Models 55EX7K, 50EX6K, 50ES1B/K, and 46EX3B/4K, 38 pages, undated.
Hitachi Service Manual, No. 0021, Projection Color Television, Models 55EX7K, 50EX6K, 50ES1B/K, 46EX3B/4K, and 46EX3BS/4KS, Aug. 1993, 1 page.
Hoarty, "Multimedia on Cable Television Systems," Symposium Record Table TV Sessions, 18th International Television Symposium and Technical Exhibition, Montreux, Switzerland, Jun. 10, 1993, 22 pages.
Hobbes Internet Timeline, Mar. 22, 2007.
Hobbes' Internet Timeline 10.2, by Robert H'obbes' Zakon, from the internet at http://www.zakon.org/robert/internet/timeline/, printed from the internet on Sep. 13, 2012, 29 pages.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
Holland, "NAPLPS standard defines graphics and text communications," EDN, Jan. 10, 1985, 11 pages.
Iitusuka, Honbashi, Kuwana, Building Internet TV Guide Service 1 and 2, the 53rd National Conference Proceedings, Japan, Information Processing Society of Japan, Sep. 6, 1996 p. 3-227 to 230.
Iizuka et al., "The Overview of Internet TV Guide Japan—1 and 2," the 53rd National Conference Proceedings, Japan, Information Processing Society of Japan, Sep. 6, 1996, 4 pages. (Concise explanation included in IDS letter.).
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise explanation included in IDS letter.).
Imke, S., Interactive Video Management and Production, Educational Technology Publications, May 1991, http://www.amazon.com/Interactive-Video-Management-Production-Steven/dp/0877782334/ref=sr_1_1?ie=UTF8&qid=1416426739&sr=8-1&keywords=interactive+video+management+and+production&pebp=1416426742553, 2 pages.
Installation Guide, "Getting Started 1" Manual, and Remote Control "Quick Reference Guide".
Instruction Manual, "Using StarSight 2," StarSight Telecast, Inc., 1994, 27 pages.
Instruction Manual, "Using StarSight 2," StarSight Telecast, Inc., StarSight CB 1500 Customer Letter, 1994.
Instructional Manual, "Sonic the Hedgehog," Sega of America, 1992, 11 pages.
Interactive Computer Conference Server, IBM Technical Bulletin, vol. 34, No. 7A, Dec. 1991, pp. 375-377.
Interface Device for Conventional TVs to Improve Functionality, IBM Technical Disclosure Bulletin, vol. 36, No. 7, Jul. 1993, pp. 53-54.
Internet User Forecast by Country, Computer Industry Almanac—Press Release, from the internet at http://www.c-i-a.com/internetusersexec.html, printed from the internet on Sep. 13, 2012, 3 pages.
IPG Attitude and Usage Study, prepared by Lieberman Research Worldwide for Gemstar-TV Guide International, Oct. 2002, 99 pages.
Irven, "Multi-Media Information Services: A Laboratory Study," IEEE Communications Magazine, vol. 26, No. 6, Jun. 1988, pp. 27-33 and 36-44.
Ishii et al, "Toward an Open Shared Workspace: Computer and Video Fusion Approach of Team Workstation," Communications of the ACM, Dec. 1991, vol. 34 No. 12, pp. 37-50.
Ishii, Hiroshi et al, "Clearface: Translucent Multiuser Interface for TeamWorkStation," ECSCW, Sep. 1991, 6 pages.
James Sorce, David Fay, Brian Raila and Robert Virzi, "Designing a Broadband Residential Entertainment Service: A Case Study," GTE Laboratories Incorporated, undated, pp. 141-148.
James, A., "*Oracle—Broadcasting the Written Word*," *Wireless World*, Jul. 1973, vol. 79 No. 1453, pp. 314-316.
Judice, "Move Over Cable, Here Comes Video Via Voice Lines," Network World, Sep. 1986, 3 pages.
JVC Service Manual, 27" Color Monitor/Receiver, Model AV-2771S (U.S.), Jul. 1991, 89 pages.
Kai et al., Development of a Simulation System for Integrated Services Television, Report from Information Processing Society of Japan, Japan, Sep. 13, 1996, vol. 96, No. 90 p. 13-20.
Karstad, K., "Microprocessor Control for Color-TV Receivers," IEEE Transactions on Consumer Electronics, vol. CE-26, May 1980, pp. 149-155.
Karunanithi, et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Khoo et al., "An Expert System Approach to Online Catalog Subject Searching," Information Processing & Management: An International Journal, vol. 30, No. 2, 1994, pp. 223-238.
Kojima, Akira et al., "Implementation Measures to Expand Metadata Application Services", http://www/ntt.co.jp/tr/0306/files/ntr200306051.pdf. (Jun. 2003), 6 pages.
Komarinski, Anonymous FTP p. 1, May 1, 1995 Linux Journal, 5 pages.
Kornhaas, W., "*Von der Textprogrammierung uber TOP zum Archivsystem*," *Radio Fernsehen Elektronik*, vol. 40, No. 8, Aug. 30, 1991, pp. 465-468, XP 000240875 Veb Verlag Technik. Berlin, DE ISSN: 1436-1574.
Large, "Throw away the books—Viewdata's coming," Guardian, Jan. 10, 1978, 1 page.

(56) References Cited

OTHER PUBLICATIONS

Large, "Viewdata, the invention that brings boundless advice and information to the home, also sets a test for the Post Office," Financial Guardian, Jun. 20, 1978, 3 pages.
Lee, Hee-Kyung et al., "Personalized Contents Guide and Browsing based on User Preference", http://vega.icu.ac.kr/~mccb-lab/publications/Paper/PersonalizedTV(2002).pdf, (2002), 10 pages.
Leftwich, Jim & Schein, Steve, *StarSight Interactive Television Program Guide, Phase III*, Functional/Interactional Architecture Specification Document, Orbit Interaction, Palo Alto, California.
Leftwich, Jim, Lai, Willy & Schein, Steve, *StarSight Interactive Television Program Guide, Phase IV*, Functional/Interactional Architecture Specification Document, Orbit Interaction, Palo Alto, California, published before Apr. 19, 1995.
Letter from StarSight Telecast, Inc. to a StarSight IPG subscriber (with subscriber name, address and account number redacted) notifying the subscriber of termination of the StarSight IPG, 2003, 1 page.
Listing of computer code for operating system within the Cable Computer in 1985, 97 pages.
Listing of computer code for Video HTU Program (Plaintiff's Exhibit 299).
Listing of computer code for Video HTU Program, 1 page.
Lists> What's On Tonite! TV Listings (fwd), Internet article (On line), Jan. 28, 1995, XP 002378869 Retrieved from the Internet: URL: www.scout.wisc.edu/Projects/PastProjects/NH/95-01-31/0018.html> [Retrieved on Apr. 28, 2006]. The whole document, 4 pages.
Little et al., "Prospects for Interactive Video-on-Demand," IEEE Multimedia, Fall 1994, pp. 14-24.
Lloyd, "Impact of technology," Financial Times, Jul. 1978, 2 pages.
Loen et al., "Subscriber Terminal Units for Video Dial Tone Systems," IEEE Network, Sep./Oct. 1995, 10 pages.
Lowenstein, R.L. and Aller, H.E., "*The Inevitable March of Videotex*," Technology Review, vol. 88, Oct. 1985, p. 22.
Lynch, Keith, timeline of net related terms and concepts, Mar. 22, 2007, 8 pages.
M-A-Com, Inc., "Videocipher II Satellite Descrambler Owner's Manual," dated Prior Feb. 1986, pp. 1-17.
M/A-Com, Inc., "Videocipher II Satellite Descrambler Owners Manual," dated Feb. 1986, pp. 1-24.
Make Room for POP, Popular Science, Jun. 1993, 5 pages.
Mannes, "List-Mania, On-Screen, interactive TV guides that can program your VCR are just around the corner," Video Review, May 1992, 4 pages.
Mannes, "Smart Screens: Development of Personal Navigation Systems for TV Viewers," Video Magazine, Dec. 1993, 6 pages.
Mar. 19, 1985 letter from G. Knapp of CableData to R. Hansen of Weststar Communications, Inc. 6 pages.
Markowitz, "Companies Jump on Interactive Bandwagon," Discount Store News, Dec. 6, 1993, 3 pages.
McKenzie, G.A., "*Oracle—An Information Broadcasting Service Using Data Transmission in the Vertical Interval*," Journal of the SMPTE, Jan. 1974, vol. 83 No. 1, pp. 6-10.
Melton, "The Uniden Super 4800," OnSat magazine, Jun. 10-16, 1990, 4 pages.
Merrell, R.G., "Tac Timer," 1986 NCTA Technical Papers, pp. 203-206.
Miller, "A Scenario for the Deployment of Interactive Multimedia Cable Television Systems in the United States in the 1990s," IEEE, vol. 82:(4), 1994, 5 pages.
Money, "Teletext and Viewdata," Butterworth & Co. Ltd., London, 1979, 159 pages.
Mosley, J.D., "NAPLPS chip sets, though scarce, satisfy limited US videotex demand," EDN, Mar. 21, 1985, at p. 57, 4 pages.
Motohashi, Iizuka, Kuwana, Building Internet TV Guide Service 1 and 2, the 53rd National Conference Proceedings, Japan, Information Processing Society of Japan, Sep. 6, 1996, 5 pages [english translation].
MSI Datacasting Systems, TV Communications Journal, Jan. 1973, 2 pages.
Neumann, Andreas, "WDR Online Aufbau and Perspektiven Automatisierter Online Dienste im WDR," RTM Rundfunktechnische Mitteilungen, vol. 41, Jun. 1997, 45 pages.
Nikkei Click, You can do it now with your existing computer, Nikkei Business Publications, Inc., Aug. 8, 2000, vol. 7, No. 11, pp. 185-188 (No US Translation), 8 pages.
Oberlies, et al.; "VPS-Anzeige Und Uberwachungsgerat", Rundfunktechnische Mitteilungen, vol. 30, No. 1 Jan. 1986-Feb. 1986, Norderstedt (DE).
Okimi, Katsuya et al., "Shinban ISDN," ("New ISDN Edition"), Japan, Ohmsha, Ltd., First Edition, Oct. 5, 1995, 27 pages (Concise explanation included in IDS letter).
Open TV fur interaktives Fernsehen, Trend and Technik, 9 -95 RFE, retrieved from the internet Sep. 2, 2006, 4 pages (English language translation attached).
Open TV Launches OpenStreamer TM Technology for Broadcasters to Deliver First Ever Real-Time Digital Interactive Television, from the internet at http://www.opentv.corn/news/openstreamer_press_final.htm, printed on Jun. 28, 1999, the document bears a copyright date of 1999, 2 pages.
Order No. 40 Denying Summary Determination Motion filed Apr. 5, 2013, 6 pages.
Owen, "How dial-a-fact is coming closer to home," The Times, Sep. 30, 1977, 2 pages.
Owen, "Why the Post Office is so excited by its plans for a TV screen information service," The Times, Sep. 26, 1976, 4 pages.
Panasonic TX-33A1G Operating Instructions (undated), 33 pages.
Paperclick, NeoMedia Technologies, Inc., at http://www.paperclick.com/How works,htm (printed Sep. 24, 2001).
Periodical RFE, vol. 9'95, p. 100: Trend and Technology Open TV for Interactive Television.
Pfister, Larry T., "Teletext: Its Time Has Come," Prepared for the IGC Videotext/Teletext Conference, Andover, Massachusetts, Dec. 14, 1982, pp. 1-11.
Philips TV Set, model No. 25 PT 910A, User Manual; 40 pages (undated).
Poole, "Demand for Viewdata grows," Sunday Times, Feb. 10, 1977, 3 pages.
Postel, J., Reynolds, J., Request for Comments: 959 File Transfer Protocol, Oct. 1985, 70 pages.
Prevue Guide Brochure, Spring 1984, 2 pages.
Prevue Guide Brochure, Spring 1994, 22 pages.
Prevue Networks and OpenTV(R) Agree to Work Together on Deploying Interactive Program Guides Worldwide, from the internet at http://www.opentv.com/news/prevuefinal.htm, printed on Jun. 28, 1999, 2 pages.
Prevue Networks, Inc. Promotional Materials (undated), 22 pages.
Probe XL Brochure, Auto Tote Systems Inc., (Newark, Delaware) (undated) 57 pages.
Prodigy Launches Interactive TV Listing, Apr. 22, 1994, Public Broadcasting Report, 1 page.
PTV Recorder Setup Guide, Philips Electronics, TiVo Inc. (2000), 68 pages.
Qayyum, "Using IVDS and VBI for Interactive Television," IEEE, Jun. 10, 1996, 11 pages.
Rajapakshe et al., "Video on demand," (last modified Jun. 1995) <http://www-dse.doc.ic.ac.uk/~nd/suprise_95 /Journal/vol4/shr/report.html>, 14 pages.
Ramachandran, "Space-Time Memory: a parallel programming abstraction for interactive multimedia applications, SIGPLAN Notices", vol. 34:8 (Aug. 1999), pp. 183-92.
Rath et al., "Set-Top Box Control Software: A Key Component in Digital Video," Philips Journal of Research, vol. 50, No. 1/2 1996, 8 pages.
Rayers, D.J., "*Telesoftware by Teletext*," 1984 IEEE Conference Papers, vol. 240, p. 323.
RCA Satellite Receiver User's Guide, Thomson Multimedia Inc. (2001), 80 pages.
Replay TV 5000 series manual, 2002, entire document.
Respondents' Corrected PHS (Parts 1 and 2) (redacted) filed Feb. 25, 2013, 87 pages.

(56) References Cited

OTHER PUBLICATIONS

Respondents' Notice of Prior Art and Exhibit filed Oct. 12, 2012, 31 pages.
Respondents' Post-Hearing Statement (redacted) filed Mar. 22, 2013, 50 pages.
Robertson, "Reaching Through Technology," CHI '91 Conference Proceedings, Apr. 27-May 2, 1991, 6 pages.
Rogers, "Telcos vs. Cable TV: The Global View With Markets Converging and Regulatory Barriers Falling, Service Carriers Are Ready to Rumble," Data Communications, Sep. 21, 1995, vol. 24, No. 13, pp. 75-76, 78, 80, XP000526196, 8 pages.
Roizen, Joseph "*Teletext in the USA*," Society of Motion Picture and Television Engineers Journal, Jul. 1981, pp. 602-610.
Rosch, "New data and information system set for commercial market trial," Telephony, Mar. 20, 1978, 4 pages.
*Roseville City Council Presentation*, Mar. 13, 1985 (Defendant's Exhibit 226).
Roseville City Council Presentation, Mar. 13, 1985, 12 pages.
Ross Peddicord, "New on TV: You Bet Your Horse," The Sun, Baltimore Maryland, Dec. 15, 1994, 1 pg.
Ruffler et al., "InfoRadio on Demand, WebTV and digiTaz—Telecommerce Case Studies," 3rd International Workshop on Community Networking, 1996, May 23-24, 1996, 8 pages.
Ryan, "Interactive TV Takes a Corporate Twist," Electronic Engineering Times, Jul. 10, 1995, 3 pages.
Ryan, K., "Free Interactive TV Guide," Google Newsgroup, Alleged Date Sep. 29, 1995, 1 page.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64.
Sandringham, "Dress rehearsal for the PRESTEL show," New Scientist, Jun. 1, 1978, 3 pages.
Sato, T. et al., WWW jou no eizou browsing kikou no teian to Jitsugen [A Proposal for A Video Browsing Mechanism on World Wide Web and its Implementation], Japan Society for Software Science and Technology, collection of 14th convention articles, Japan, Japan Society for Software Science and Technology, Sep. 30, 1997, 6 pages.
Savage, "Internet's 'What's on Tonite!' Tells You Just That and More," The News, InfoWatch, May 29, 1995, 1 page.
Schauer, Tom, No subject, (tschauer@moscow.com) Thu, Sep. 28, 1995 16:46:48-700, XP-002378870 [Retrieved from the Internet Apr. 28, 2006], 1 page.
Schauer: Internet Article, [Online] Sep. 28, 1995, XP002378870, Retrieved from the Internet: URL: www.vision2020.moscow.com/Archives/1995/9509/0058.htlm> [retrieved on Apr. 28, 2006].
Schlender, B.R., "*Couch Potatoes! Now It's Smart TV*," Fortune, Nov. 20, 1989, pp. 111-116.
Schmuckler, Eric "A marriage that's made in cyberspace (television networks pursue links with online information services)," May 16, 1994 Mediaweek, vol. 4, No. 20, 5 pages.
Sealfon, Peggy, "High Tech TV," Photographic, Dec. 1984, 2 pages.
Selected pages from the "BBC Online—Schedules" web page. This web page is located at http://www.bbc.co.uk/schedules/ (as printed from the Internet on Oct. 19, 1999 and being dated as early as May 24, 1997, 6 pages.
Sharpless et al., "An advanced home terminal for interactive data communication," Conf. Rec. Int. Conf. Commun. ICC '77, IEEE, Jun. 12-15, 1977, 6 pages.
Soin et al., "Analogue-Digital ASICs", Peter Peregrinus Limited, 1991, 9 pages.
Split Personality, Popular Science, Jul. 1993, at p. 52, 5 pages.
StarSight CB 1500 Customer Letter, 1994, 1 page.
StarSight Interactive Television Program Guide III Jim Leftwich and Steve Schein, Functional/Interactional Architecture Specification Document, Orbit Interaction, Palo Alto, California, Published before Apr. 19, 1995.

StarSight Interactive Television Program Guide IV, Jim Leftwich and Steve Schein, Functional/Interactional Architecture Specification Document, Orbit Interaction, Palo Alto, California, Published before Apr. 19, 1995.
StarSight Interactive Television Program Guide, Jim Leftwich, Willy Lai & Steve Schein Published before Apr. 19, 1995.
StarSight Operating Guide and Quick Reference, 19 sheets (undated).
StarSight Telecast, StarSight introduces TVGuide-like programmer for homes, 1994, 1 page.
Start Here, Sony, TiVo and DIRECTV (undated), 8 pages.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ", 2 pages.
Stickland, D.C., "It's a common noun," The Economist, Jun. 5, 1978, 1 page.
Stokes, "The viewdata age: Power to the People," Computing Weekly, Jan. 1979, 2 pages.
STORit, Report on the IBC'99 Demonstration, Deliverable #8 AC312/phi/prl/ds/p/008b1 Oct. 1999, 35 pages.
Sunada, et al, "Teletext Color Television Receiver Model C-29M950, C26M940," NEC Home Electronics, NEC Giho, 1987, 16 pages.
Super-TVs, Popular Science, Jul. 1985, at p. 64, 7 pages.
SuperGuide On Screen Satellite Program Guide, User's Guide, Owner's Manual, and sales literature, 74 pages (undated).
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's™ Features," undated, 12 pages.
Sussman, "GTE Tunes In to Home TV Shopping," PC Week, vol. 5(26), Jun. 28, 1988, 2 pages.
Symposium Record Cable Sesssions, "Digital On-Screen Display of a New Technology for the Consumer Interface," Publication Date May 1993, 17 pages.
Tech Notes: Product Updates from M/A-Com Cable Home Group, "Videocipher Owners Manual Update," Issue No. 6, Feb. 1986, 19 pages.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Image Software, Japan, Mar. 1988, 127 pages.
Technology Overview for TV Guide On Screen Information Sheets, 9 pages (undated).
Technology: Turn on, tune in and print out—An experimental interactive television service is set to alter our viewing habits, Financial Times (London), Oct. 14, 1993, p. 11.
Teletext presents the alternative view, Financial Times, Oct. 24, 1977, 2 pages.
The clickTV television program guide website of TVData of Queensbury, New York. This website is located at www.clicktv.com (as printed from the Internet on Aug. 13, 1997), 5 pages.
The Columbia House Video Club: Download Software, accessed from the internet at http://web.archive.org/web/19961223163101/http://www.columbiahouse.com/repl/vc . . . , copyright 1996, printed on Sep. 19, 2013, p. 1.
The InfoBeat television program guide website of InfoBeat, Inc. This website is located at www.infobeat.com (as printed from the Internet on Dec. 8, 1997), 46 pages.
The New Media and Broadcast Policy: An Investigation & Research Conference Report on Broadcasting Diversification, Radio Regulatory Bureau, Japan Ministry of Posts & Telecommunications, Mar. 1982, 114 pages.
The television program guide website of Gist Communications, Inc. of New York, New York. This website is located at www.gist.com (as printed from the Internet on Aug. 14, 1997), 133 pages.
The television program guide website of TV Guide Entertainment Network. This website is located at www.tvguide.com (as printed from the Internet on Aug. 13-18, 1997) pp. 139.

(56) References Cited

OTHER PUBLICATIONS

Thomas, "Electronic Program Guide Applications—The Basics of System Design," NCTA Technical Papers, 1994, pp. 15-20.
Three men on a Viewdata bike, The Economist, Mar. 25, 1978, pp. 1-2.
Today's Stop: What's On Tonite, Oct. 3, 1995, retrieved from the internet at http://internettourbus.com/arch/1995/TB100395.TXT, 3 pages.
Tol, et al., "Requirements and Scenarios for the Bi-directional Transport of Metadata", TV Anytime Meeting, Version 1.0, Document TV150,(Aug. 2, 2002),7 pages.
TV Guide movie database Internet web pages printed on Aug. 12, 1999 (9 pages).
TV Guide on Screen prior Use Transcript of Proceedings—"Violence on Television," House of Representatives, Committee on Energy and Commerce, Subcommittee on Telecommunications and Finance, Jun. 25, 1993, 36 pages.
TV Guide Online Set for Fall, Entertainment Marketing Letter, Aug. 1994, p. 1.
TV Listings Functional Spec., Time Video Information Services, Inc., 11 pages, undated.
Ueda, Hirotada et al, "Impact: An Interactive Natural-Motion-Picture Dedicated Multi-Media Authoring System," Communications of the ACM, Mar. 1991, pp. 343-350.
Uniden, UST-4800 Super Integrated Receiver/Descrambler, Preliminary Reference Manual, 80 pages, Novermber 12, 1991.
Uniden, UST-4800, Integrated Receiver/Descrambler, Installation Guide, 60 pages, ©1990, Uniden America Corporation.
User's Guide RCA Color TV with TV Plus + Guide, Thomson Consumer Electronics(1997), 88 pages.
UVSG Offers System-Specific Web Site Development for OPS, press release of United Video Satellite Group, Apr. 12, 1996, 2 pages.
UVSG Teams With Microsoft on Internet Information Server, press release of United Video Satellite Group, Feb. 22, 1996, 2 pages.
Various publications of Insight Telecast, 1992 and 1993, 10 pages.
Veith, R.H., "Television's Teletext," Elsevier Science Publishing Co., Inc, 1983, pp. 13-20, 41-51.
Verknupfung Von TV Mit Internet, Forschung & Entwicklung, vol. 68, No. 18, Aug. 16, 1996, 5 pages.
Verlag, Wilhelm Goldmann, Revolution on the Screen, 2nd Ed. 1979, 17 pages. (English Translation).
Video Plus+, Gemstar Development Limited, at http://www.gernstarco.ukien/videoplus/intromain.html (printed Sep. 24, 2001).
Video Plus, Billboard, vol. 98, No. 4, Jan. 25, 1986, at p. 25, 4 pages.
Videocipher Stipulation, May 1996, 5 pages.
VideoGuide, "VideoGuide User's Manual," pp. 1-28 (p. 11 is the most relevant).
Viewdata and its potential impact in the USA: Final Report/vol. One, The UK Experience, Link and Butler Cox & Partners Limited, Oct. 1978, 129 pages.
Viewdata moves in US but GEC may lose out, Computing Weekly, Jan. 25, 1978, 1 page.
Vision/1 from Tecmar, IBM transforms PS/1 into a TV, Info World, vol. 14(9), Mar. 2, 1992, at p. 34, 3 pages.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998, 18 pages.
Web TV and Its Consumer Electronics Licenses debut First Internet Television Network and Set Top Box XP 002113265 Retrieved from the Internet: <URL http://www.webtv.net/company/news/archive/License.html> Jul. 10, 1996, 6 pages [retrieved on Dec. 1, 2005].
Welcome to Columbia House Online, accessed from the internet at http://web.archive.org/web/19961221085121/http://www.columbiahouse.com/, copyright 1996, printed on Sep. 19, 2013, 1 page.
Whale, "Identification of Program Similarity in Large Populations," The Computer Journal, vol. 33, No. 2, 1990, pp. 140-146.
Whitehorn, "Viewdata and you," Observer, Jul. 30, 1978, 1 page.
Wikipedia article on CompuServe, Mar. 22, 2007, 7 pages.
Wikipedia article, "Geschichte des Internets," from the internet at http://de.wikipedia.org/wiki/Geschichte_des_Internets, page last modified on Apr. 28, 2012, printed from the internet on May 18, 2012, 17 pages (Concise explanation included in IDS letter).
Wikipedia article, "Internet Explorer," from the internet at http://de.wikipedia.org/wiki/Internet_Explorer, page last modified on Sep. 9, 2012, printed from the internet on Sep. 13, 2012, 14 pages (Concise explanation included in IDS letter).
Wikipedia article, "MSN TV," from the internet at http://en.wikipedia.org/wiki/MSN_TV, page last modified on May 15, 2012, printed from the internet on Sep. 13, 2012, 10 pages.
Wikipedia article, "NCSA Mosaic," from the internet at http://de.wikipedia.org/wiki/NCSA_Mosaic, page last modified on Sep. 3, 2012, printed from the internet on Sep. 13, 2012, 2 pages (Concise explanation included in IDS letter).
Wikipedia article, "TVGN," from the internet at http://en.wikipedia.org/wiki/TVGN, page last modified on Nov. 17, 2014, printed from the internet on Nov. 18, 2014, 12 pages.
Wikipedia-Teletext Excerpt (English Translation), printed from the internet Jul. 1, 2013, 18 pages.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
Windows 98 Feature Combines TV, Terminal and the Internet, New York Times, Aug. 18, 1998.
Winkler, M., "Computer Cinema: Computer and video: from TV converter to TV studio," Computerkino, (translation) Exhibit NK 13 of TechniSat's nullity action against EP'111, 14 pages (1992).
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Wolfe, Alexander, "Beyond the SIPC," Electronic Engineering Times, No. 910, Jul. 15, 1996, 2 pages, Abstract.
Wolfe, Alexander, "Microsoft Poses PC Specs.," Electronic Engineering Times, Jul. 8, 1996, Abstract, 2 pages.
Yarrow, "The Media Business; Pay-Per-View Television is Ready for Takeoff," The New York Times, Archives, Nov. 14, 1988, 3 pages.
Yoshida, "Interactive TV a Blur," Electronic Engineering Times, Jan. 30, 1995, 2 pages.
Zakon, "Hobbes' Internet Timeline 10.2," http://www.zakon.org/robert/internet/timeline, retrieved Sep. 13, 2012.

* cited by examiner

MEDIA CONTENT SEARCH RESULTS RANKED BY POPULARITY

RELATED APPLICATIONS

This application is a continuation of and claims priority to U.S. patent application Ser. No. 12/846,442, filed Jul. 29, 2010, entitled "Media Content Search Results Ranked by Popularity", which is a continuation of and claims priority to U.S. patent application Ser. No. 11/716,236, filed Mar. 9, 2007, entitled "Media Content Search Results Ranked by Popularity", the disclosures of which are incorporated herein by reference in their entirety.

BACKGROUND

As the variety of television programming and media content sources continues to increase, viewers may want to locate television media content and programming choices that may be of interest to them. In addition to scheduled television program broadcasts, television viewing options also include on-demand choices which enable a viewer to search for and request media content for viewing when convenient rather than at a scheduled broadcast time.

A viewer can initiate a search for a list of television programming choices in a program guide (also commonly referred to as an electronic program guide or "EPG"). A search is typically based on text-string matching, and an alphabetical list of programs and/or movies is filtered and returned in response to the search request. Another type of search for television programming choices is a field-based search, such as a search for "new movies" or "sports". Text-string matching is a fairly limited form of searching, in that a viewer's results will be limited to a set of programs that happen to have the search string in a particular field, and therefore the search results are dependent on what the metadata creators add to the field descriptions. This leads to the viewer obtaining results that either do not have the desired program or bury the desired program in a long list of results because many programs have the same text-string. In addition, if a viewer misspells a search term, the search system can return unwanted results or even no results at all.

Unwanted, too many, or even no search results can lead to viewer dissatisfaction when wanting to locate television programming that may be of interest to the viewer. In addition, a search initiated via a program guide may be cumbersome for a viewer who enters the search term(s) with a remote control device. Further, a slowly delivered search response from a search system of a content provider can increase the frustration of repeated searching for the viewer.

SUMMARY

This summary is provided to introduce simplified concepts of media content search results ranked by popularity. The simplified concepts are further described below in the Detailed Description. This summary is not intended to identify essential features of the claimed subject matter, nor is it intended for use in determining the scope of the claimed subject matter.

In embodiments, a search request for television media content can be initiated by a viewer, and the television media content that is relevant to the search request can be identified. The relevant television media content can then be ranked based on a popularity rating and the relevant television media content can be displayed in an ordered list that is ordered by popularity rankings.

In other embodiments, a television client device can receive a search request for television media content, and a search module can identify the television media content that is relevant to the search request. A tracking module can track one or more searches for the television media content, information requests, programming choices, recordings, and/or new television media content to develop a popularity rating. The tracking module can then rank the relevant television media content based on the popularity rating to determine popular media content. A list of the popular media content can be displayed to include likely viewer choices. The tracking module can be implemented as a component of the television client device, as a component of a content provider that provides the television media content to the television client device, or as a component of both.

BRIEF DESCRIPTION OF THE DRAWINGS

Embodiments of media content search results ranked by popularity are described with reference to the following drawings. The same numbers are used throughout the drawings to reference like features and components.

DETAILED DESCRIPTION

One or more embodiments of media content search results ranked by popularity enables a viewer to enter search term(s) to initiate a search request for television media content, and to receive a list of media content whose identification and ordering is informed by a popularity measure, such as a popularity rating. The list of media content can be organized based on the popularity of the television media content as determined from tracked television media content. The television media content, such as programs, movies, music, on-demand media content, network-based applications, and the like, can be tracked to identify and rank the media content that a viewer or viewers would likely search and request for viewing. The popularity of the tracked media content can be estimated to provide a viewer with likely programming choices for viewing, rather than simply returning an alphabetical list of television viewing selections when a viewer initiates a search request.

While features and concepts of the described systems and methods for media content search results ranked by popularity can be implemented in any number of different environments, computing systems, entertainment systems, and/or other various configurations, embodiments of media content search results ranked by popularity are described in the context of the following example systems and environments.

Figure 1:
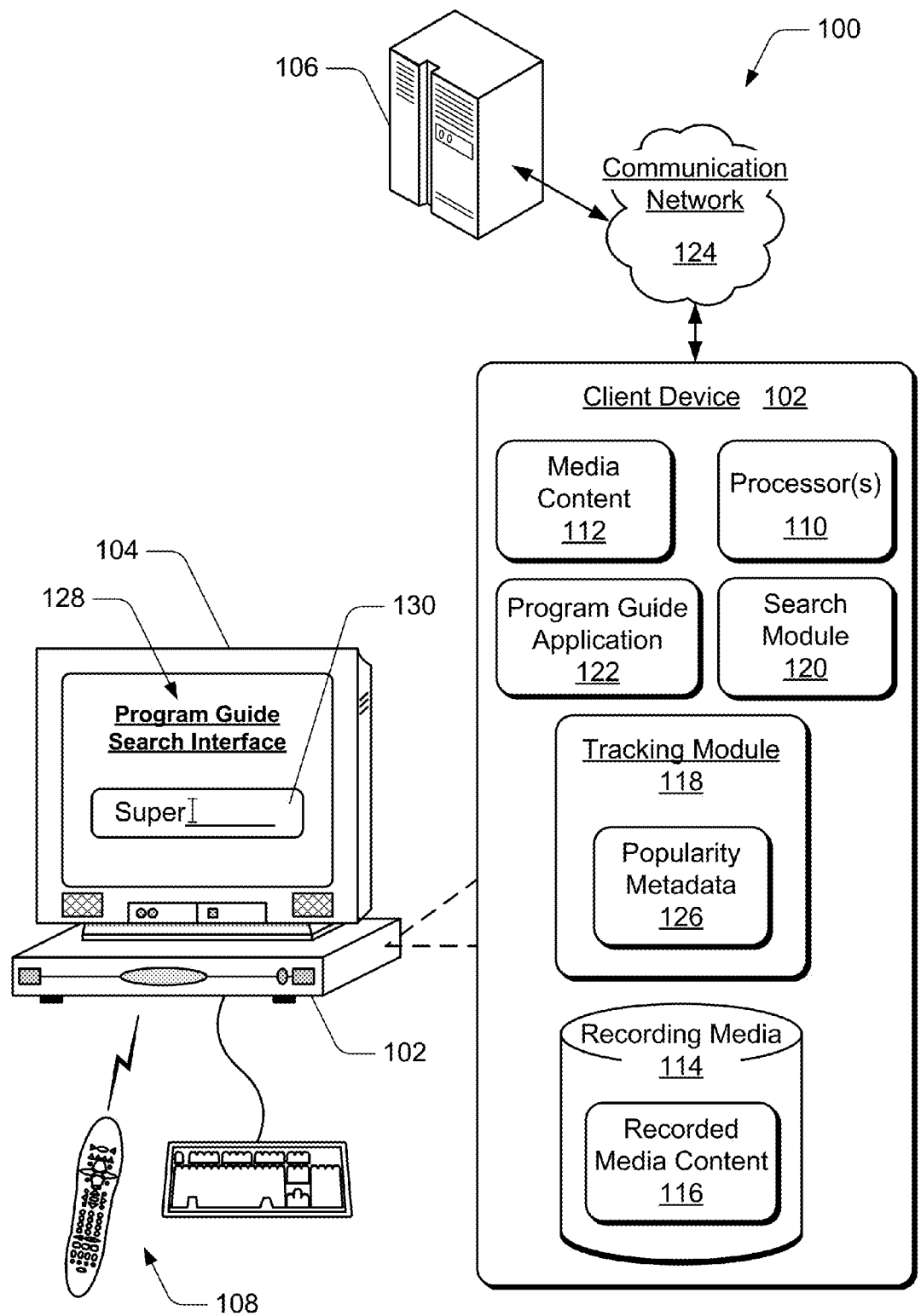
FIG. 1 illustrates an example system in which embodiments of media content search results ranked by popularity can be implemented.

FIG. 1 illustrates an example system 100 in which various embodiments of media content search results ranked by popularity can be implemented. In this example, system 100 includes a television client device 102, a display device 104, content provider(s) 106, and input devices 108, such as a remote control device and/or a computer keyboard. The display device 104 can be implemented as any type of television, LCD, or similar television-based display system that renders audio, video, and/or image data. The client device 102 and display device 104 together are just one example of a television client system, examples of which are described with reference to the example entertainment and information system shown in FIG. 7.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. In this example, client device 102 includes one or more processor(s) 110, media content 112 (e.g., received media content or media content that is being received), and recording media 114 that maintains recorded media content 116.

Client device 102 also includes a tracking module 118, a search module 120, and a program guide application 122, all of which can be implemented as computer-executable instructions and executed by the processor(s) 110 to implement embodiments of media content search results ranked by popularity. Additionally, client device 102 can be implemented with any number and combination of differing components as further described with reference to the example client device shown in FIG. 6.

Although the tracking module 118, search module 120, and program guide application 122 are each illustrated and described as single applications, each can be implemented as several component applications or modules distributed to perform one or more functions of media content search results ranked by popularity. Further, although the tracking module 118, search module 120, and program guide application 122 are illustrated and described as separate applications, the tracking module 118, search module 120, and/or program guide application 122 can be implemented together as a single application in the client device 102 to implement embodiments of media content search results ranked by popularity.

The media content 112 and/or the recorded media content 116 can include television programs (or programming), which may be any form of programs, commercials, music, movies, and video on-demand media content. Other media content can include interactive games, network-based applications, music streamed from a computing device to the client device 102, as well as any other audio, video, and/or image content received from any type of media content source.

The recording media 114 along with a playback application can be implemented as a DVR system to record and maintain the recorded media content 116. The television client device 102 can be configured for communication with the content provider(s) 106 via a communication network 124, which in this example can include an IP-based network as described with reference to the communication network(s) shown in FIGS. 2 and 6. Client device 102 receives the media content 112 and/or the recorded media content 116 from content server(s) of the content provider(s) 106 via the communication network 124. The communication network 124 can be implemented using any type of network topology and/or communication protocol, and can be represented or otherwise implemented as a combination of two or more networks.

In one or more embodiments, the tracking module 118 can be implemented to track various aspects of television programming and recordings at the client device 102. For example, the tracking module 118 can track television programming choices selected by a viewer who interacts with the client device 102; searches for television media content initiated by a viewer; the recorded media content 116; listings for new television media content; and/or any other type of requests for television media content initiated by a viewer at client device 102.

The tracking module 118 can include popularity metadata 126 from which a popularity rating for television media content can be determined or generated. The popularity of television media content can be determined according to a popularity factor, ranking, and/or index when tracking various aspects of television programming and recordings at client device 102. The popularity metadata 126 can include data and real-time tracking information corresponding to viewer programming choices (e.g., specific shows or a series of programs that a viewer selects to watch), search requests for media content, recordings, information requests, new television media content, and the like.

Further, the popularity metadata 126 can include the data and tracking information corresponding to one or multiple viewers. For example, many search requests from different viewers can be encompassed in the metadata associated with a particular program. The tracking module 118 can then determine the popularity of the particular program based on how often the media content is selected for viewing, recording, information requests, and/or any other type of viewer interaction. The tracking module 118 can also be implemented for collaborative filtering to identify a series of programs as popular media content for a viewer at the client device 102.

In addition to the traditional metadata associated with television media content, such as a title, the actors, a genre, and a description of the media content, the popularity metadata 126 can include the tracking data as well as additional information. For example, the popularity metadata 126 can include ratings from ratings providers, such as NIELSEN and/or ARBITRON data for a previous week, month, or other duration to approximate how many viewers watched a particular program.

The popularity metadata 126 can also include projected popularity rankings for new and/or upcoming television media content that will likely be requested often by many viewers. For example, the ranking of programming associated with the SUPER BOWL can be increased in advance of when the SUPER BOWL is played. In addition, the popularity metadata 126 can include any other popularity metrics upon which to base a popularity factor, ranking, and/or index to determine popular media content.

In one or more embodiments, client device 102 includes the program guide application 122 that can be implemented to process program guide data from which a program guide can be rendered and/or displayed for viewing on display device 104. A program guide may also be commonly referred to as an electronic program guide or an "EPG". In this example, a program guide search interface 128 is displayed on display device 104 and includes a search input field 130 via which a viewer can input search term(s) to initiate a search request for television media content. A viewer can input the search term(s) to initiate the search request utilizing an input device 108, such as the remote control.

In an embodiment, the search module 120 can receive a search request for television media content when initiated by a viewer, and identify the television media content that is relevant to the search request. The tracking module 118 can then rank the relevant television media content based on a popularity rating and the relevant television media content can be displayed in an ordered list that is ordered by popularity rankings. The relevant television media content can include one or more likely viewer choices of popular media content displayed in the ordered list.

In an embodiment, the search results for television media content can include relevant media content based on a partial match to a search term of a viewer-initiated search request. For example, a viewer may enter only "Super" as shown on the display device 104 in the search input field 130. The search module 120 may identify many different media content choices having a partial match to the search term "Super". From the identified media content that is relevant to the search request, the tracking module 118 can determine that the viewer is likely requesting television media content associated with the SUPER BOWL if the search request is initiated at a time when the SUPER BOWL is an often requested and/or anticipated event. For example, the popularity metadata 126 associated with the SUPER BOWL will reflect many search, viewing, and/or recording requests from multiple viewers. The tracking module 118 can then rank the relevant television media content based on a popularity rating generated from the popularity metadata 126.

Once a viewer learns that a specific and/or complete text match is not necessary when initiating a search request to find television media content, the viewer can reduce the inputs needed via the search input field 130. Reducing the number of search inputs also makes searching easier for the viewer, particularly when utilizing the remote control input device 108 which can be cumbersome to enter the search characters.

In another embodiment, the search module 120 can be implemented to identify media content that is relevant to a search request from the popularity metadata 126 based on an incorrect search term of the search request. For example, a viewer may want to watch a particular movie, such as a movie entitled "Irretrievably Broken", but has forgotten the title of the movie. The viewer may inadvertently enter a search request of "Retrievable". If the entered text string "Retrievable" were compared in a text-based search to the "title" metadata fields for television media content, a match to the sought after movie will not be located. However, the search module 120 can compare the entered text string "Retrievable" to the popularity metadata 126. A popularity result of the movie "Irretrievably Broken" which most closely matches the viewer request will be returned when the popularity metadata 126 associated with the movie reflects multiple search, viewing, and/or recording requests. The likely viewer choice can then be displayed in a list of popular media content from which the viewer can select to receive the requested movie for viewing.

In another example, the popularity of media content can optionally be customized for a particular viewer in the popularity metadata 126. For example, a viewer may enter a search request for a particular word, such as "Star", in the search input field 130 on display device 104. The search module 120 may identify the programs "Star Gazers" and "Star Singers" as relevant media content to the search request. The tracking module 118 may then rank "Star Gazers" as the most likely relevant media content for the viewer because a history of this viewer's television programming choices in the popularity metadata 126 indicates that the viewer watches the program "Star Gazers", even though the program "Star Singers" may currently be a more popular program among multiple viewers.

In another example, one friend may call another to say, "watch the reality show that is on right now", and the called viewer can then enter a search request for "Reality" in the search input field 130. The search module 120 can receive the search request for "Reality" and compare the search term entry to the popularity metadata 126 and the "genre" metadata fields to locate the likely television reality program. The reality show can be identified by the tracking module 118 as the likely viewer choice because the program is currently being broadcast and has been selected for viewing by many other viewers.

In an embodiment, the tracking module 118 can also rank television media content that is identified as being relevant to a search request based on a projected popularity of new television media content. When new or upcoming television media content is scheduled to be available, the media content can be weighted to establish a popularity-basis for the new media content.

In a projected popularity ranking scenario, or optionally a manual ranking scenario, a network operator at a content provider 106 may assume that an upcoming event or program will be popular and often requested for viewing and/or recording. However, the upcoming event or program will not have any associated tracking and/or popularity metadata to indicate a popularity history of the program before the program is available for viewing. Projected rankings may therefore be accomplished by manual assignment of popularity values to the upcoming media assets to match the operator's prediction of the popularity of the media. Alternatively, popularity values can be derived from historical data (e.g. for an annual show, popularity ratings for the program historically), or popularity of the content in other media forms (e.g. for a new Pay-Per-View movie, the popularity ranking can be derived from the movie's success in the theatres).

The tracking module 118 can then rank the program having the weighted popularity as a likely selectable viewing option for a viewer. For example, if a new movie that has been popular in the theatres is about to be released for video on-demand viewing, a network operator can project the popularity of the movie by weighting it to influence the popularity of the media content.

After the relevant television media content is identified by the search module 120, the tracking module 118 can rank the relevant television media content based on a popularity rating to determine popular media content in one or more embodiments. A list of the popular media content, or just the higher-ranking popular media content, can then be displayed on the display device 104 in response to a viewer-initiated search request. An example of a list of popular media content is further described with reference to the example shown in FIG. 3. The media content can be ranked according to viewer(s) programming choices, viewer(s) recording choices, information requests that are initiated or spawned from initial search results, and/or by any other metric by which the media content can be ranked.

In alternate embodiments of media content search results ranked by popularity, a content provider 106 can be implemented to include a tracking module. A tracking module at a content provider can also update popularity metadata to track the various aspects of television programming and recording selections of multiple viewers at multiple television client devices. These embodiments are further described with reference to the example system shown in FIG. 2. Alternatively, both content provider(s) and television client devices can include an implementation of tracking modules to track the television programming and recording selections together, or optionally independently.

Figure 2:
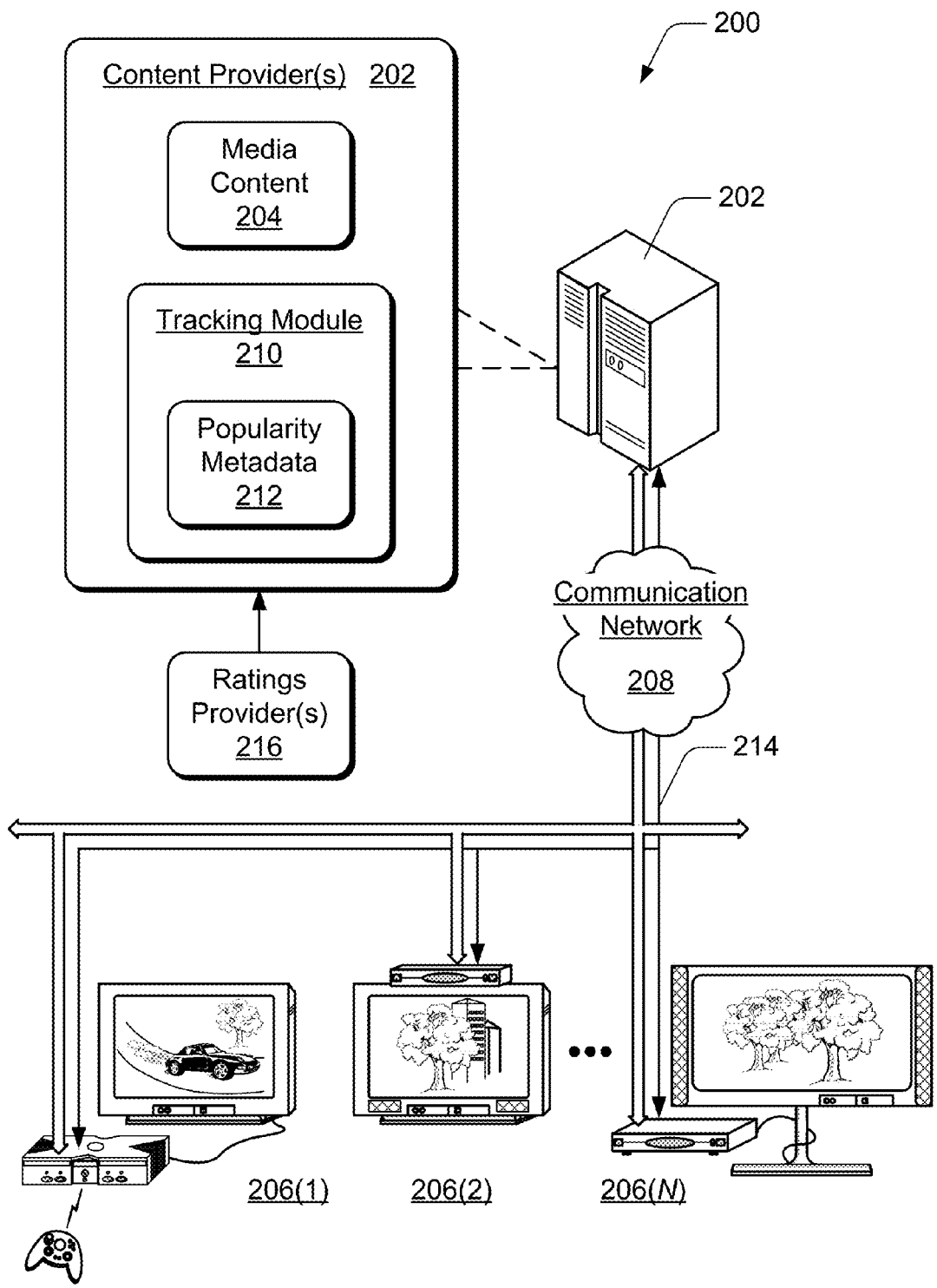
FIG. 2 illustrates another example system in which embodiments of media content search results ranked by popularity can be implemented.

FIG. 2 illustrates another example system 200 in which various embodiments of media content search results ranked by popularity can be implemented. The system 200 includes a content provider 202 that communicates media content 204 to any number "N" of various television client systems 206 (1-N) via a communication network 208. An example of a communication network is described with reference to communication network 124, and examples of client devices in television client systems are described with reference to television client device 102 as shown in FIG. 1.

Each of the client systems 206(1-N) include a television client device and a respective display device, such as any type of television, monitor, LCD, or similar television-based display system that renders audio, video, and/or image data. Any of the client devices of the client systems 206(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. A television client device may also be associated with a user (i.e., a person) and/or an entity that operates a client device such that a television client device describes logical clients that include users, software, and/or devices.

Any of the television client devices of the respective client systems 206(1-N) can be implemented with one or more processors, a communication module, memory components, and a media content rendering system. Additionally, each of the television client devices can be configured for communication with any number of the different content providers to receive any type of media content from the content provider(s) via the communication network 208. Further, any of the television client devices can be implemented with any number and combination of differing components as further described with reference to the example client device shown in FIG. 6.

In this example, content provider 202 includes a tracking module 210 having popularity metadata 212. In one or more embodiments, tracking module 210 can be implemented to track various aspects of television programming and recordings at the client systems 206(1-N). For example, the tracking module 210 can track television programming choices selected by multiple viewers that interact with the client devices; searches for television media content initiated by the multiple viewers; television media content recorded by the multiple viewers; listings for new television media content; and/or any other type of requests for television media content initiated by the multiple viewers at the various client systems 206(1-N).

The tracking module 210 can include popularity metadata 212 from which the more popular media content can be determined. The popularity of television media content can be determined according to a popularity rating, factor, ranking, and/or index when tracking the various aspects of television programming and recordings at the client systems 206(1-N). The tracking module 210 can determine or develop a popularity rating for particular media content based on how often the media content is selected for viewing, recording, information requests, and/or any other type of viewer interaction.

Figure 7:
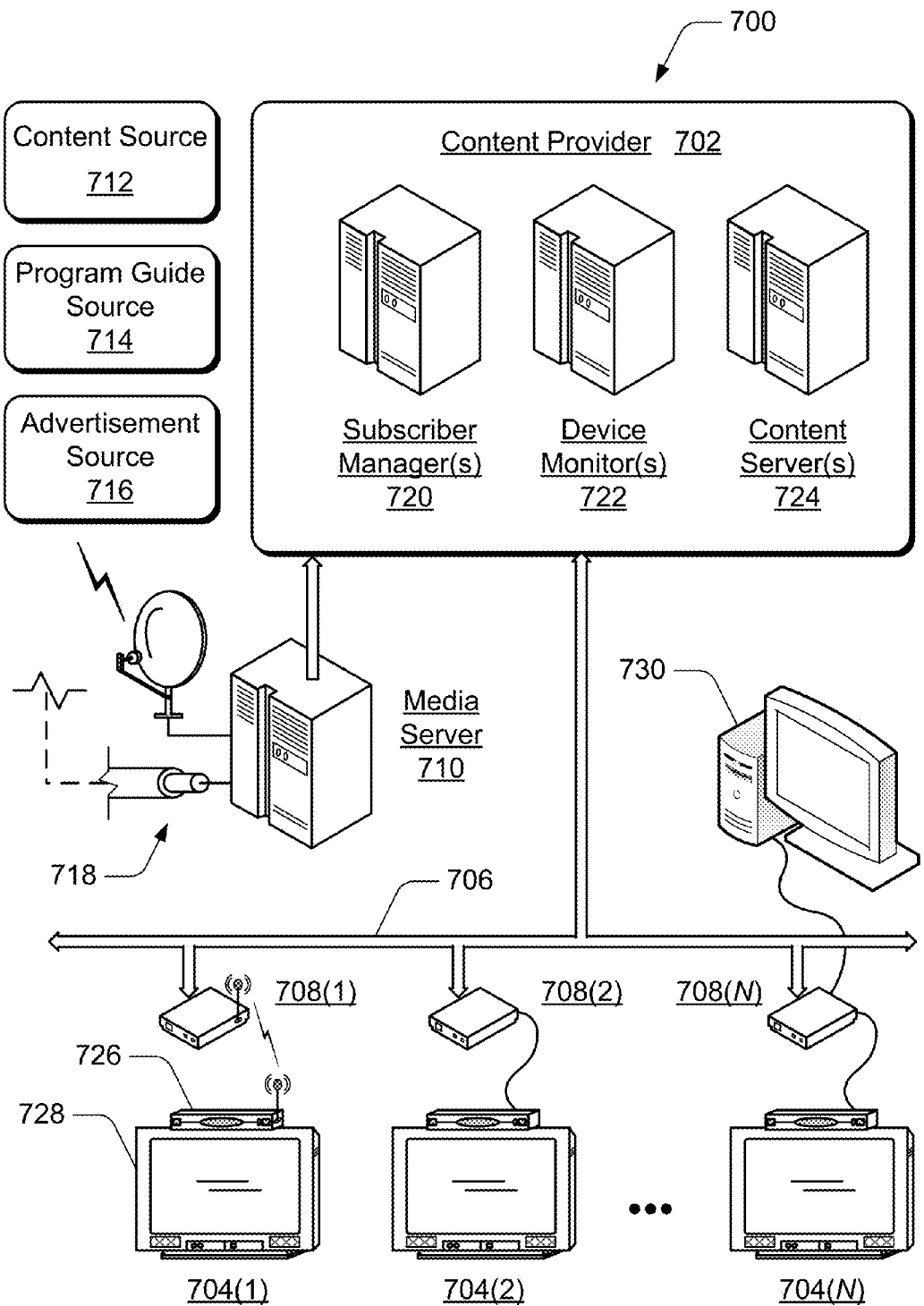
FIG. 7 illustrates various devices and components in an example entertainment and information system in which embodiments of media content search results ranked by popularity can be implemented.

The popularity metadata 212 can include data and the real-time tracking information corresponding to viewer programming choices, search requests for media content, recordings, information requests, new television media content, and the like. In an embodiment, the real-time tracking information can be obtained via the communication network 208 when implemented as a network that includes a back-channel or other two-way communication link 214 between the content provider 202 and the television client systems 206(1-N). In an IPTV system, such as shown in FIG. 7, an IP-based network provides two-way communication via which the tracking module 210 receives real-time tracking information for viewer-initiated media content interactions at the client systems 206(1-N).

Although data streams of media content are not shown specifically, the arrowed communication links 214 and the communication network 208 illustrate various data communication links that include data streams of media content. Additionally, it is contemplated that any one or more of the arrowed communication links 208, 214 can facilitate two-way data communication, such as from the content provider 202 to television client system 206(1) and vice-versa.

The popularity metadata 212 can also include additional information, such as ratings from ratings providers 216 to approximate how many viewers watched a particular program. The popularity metadata 212 can also include projected popularity rankings for new and/or upcoming television media content that will likely be requested often by many viewers.

The tracking module 210 can receive a search request for television media content via the communication network 208 when the search request is initiated by a viewer at a television client system 206(1-N). In one or more embodiments, the tracking module 210 can be implemented to rank television media content that is relevant to a search request based on the popularity rating as determined from the popularity metadata 212. A list of popular media content, or just the higher-ranking popular media content, can then be displayed at a client system 206(1-N) in response to a viewer-initiated search request.

Figure 3:
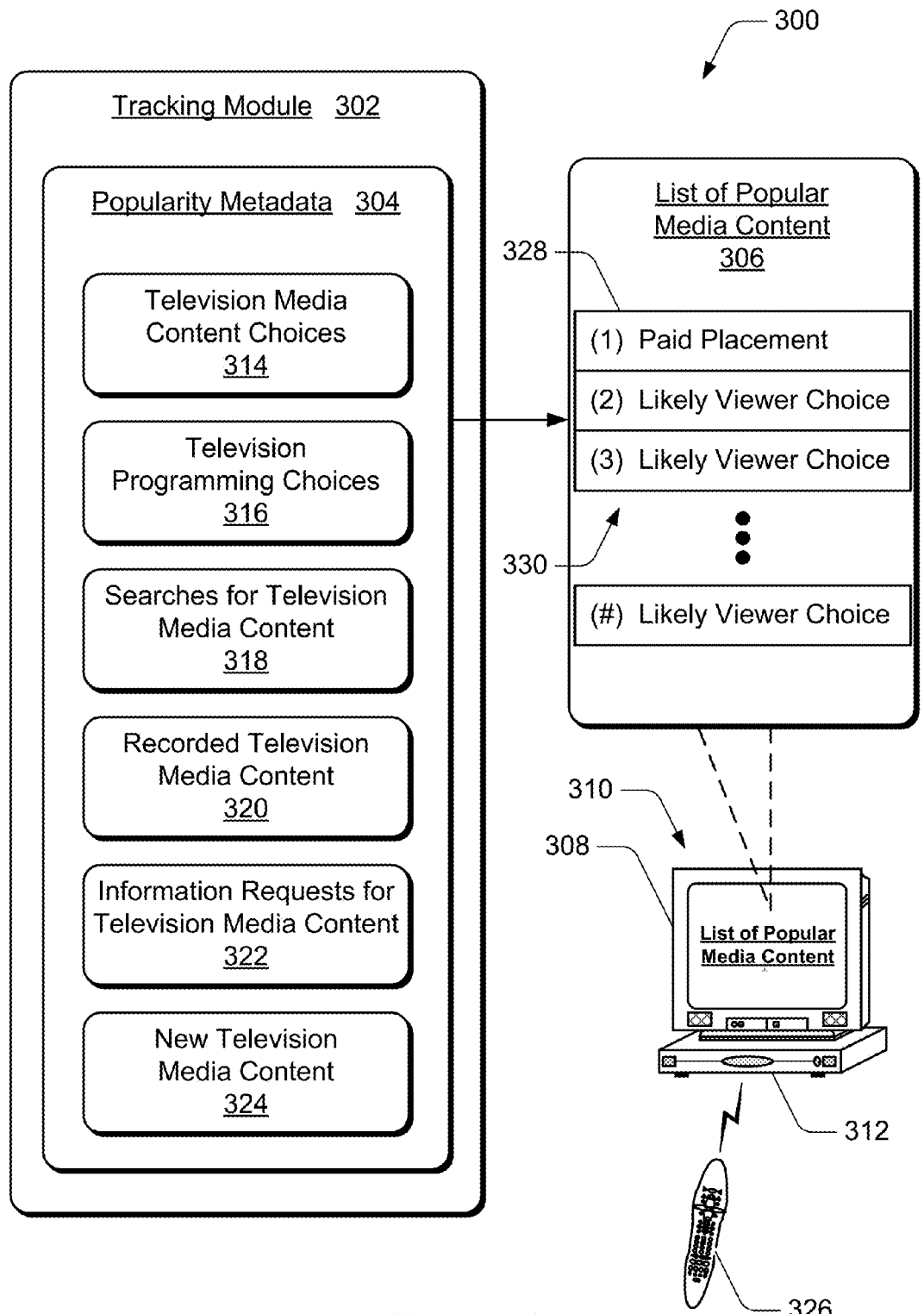
FIG. 3 illustrates an example tracking module having popularity metadata from which a list of popular media content can be generated in embodiments of media content search results ranked by popularity.

FIG. 3 illustrates an example 300 of a tracking module 302 having popularity metadata 304 from which a popularity rating can be determined. Television media content that is relevant to a search request can be ranked by the tracking module 302 based on the popularity rating. A list of popular media content 306 can be generated for display on a display device 308 of a television client system 310 (to include a television client device 312). Features and embodiments of the tracking module 302 are described with reference to tracking module 118 implemented at client device 102 as shown in FIG. 1, and/or with reference to tracking module 210 implemented at content provider 202 as shown in FIG. 2.

The popularity metadata 304 is one example of the popularity metadata included with the tracking modules and described with reference to FIGS. 1 and 2. In one or more embodiments, the tracking module 302 can be implemented to track various television media content programming, recording, and information selections by a viewer or a group of viewers. The tracking module 302 then maintains information pertaining to the tracked television programming choices, recordings, and information selections as the popularity metadata 304.

In this example, the popularity metadata 304 includes data and tracking information about television media content choices 314; television programming choices 316; searches for television media content 318; recorded television media content 320; information requests for television media content 322; and/or new television media content 324. The tracking module 302 can rank television media content that is relevant to a search request based on a popularity rating to determine popular media content. The list of popular media content 306 can then be generated to include all of the popular media content, or just the higher-ranking popular media content. The list of popular media content 306 can be displayed at the client system 310 in response to a viewer-initiated search request for media content. A viewer at client device 312 can then select a programming choice from the list 306 with a remote control input device 326.

In one or more embodiments, the list of popular media content 306 can be displayed to optionally include paid placement of particular media content at a position in the list that is more prominent than popular media content without paid placement. For example, a business method may allow a content provider to pay for the placement of a new video on-demand movie at a prominent position in the list for likely viewer selection. In an example, the list of popular media content 306 can be displayed to include paid placement of particular media content at a first position 328 in the list. Alternatively, the list of popular media content 306 can be displayed to include a likely viewer choice at the first position 328 in the list.

In this example, the list of popular media content 306 includes paid placement of media content at the first position 328 in the list, and then includes likely viewer choices at the subsequent positions 330 in the list. For example, a likely viewer choice based on the television programming choices 316 of the viewer (e.g., a user history popularity) can be displayed at a second position in the list. Further, at least an additional likely viewer choice based on the television programming choices of multiple viewers (e.g., a general history popularity) can be displayed at a third position in the list.

Figure 4:
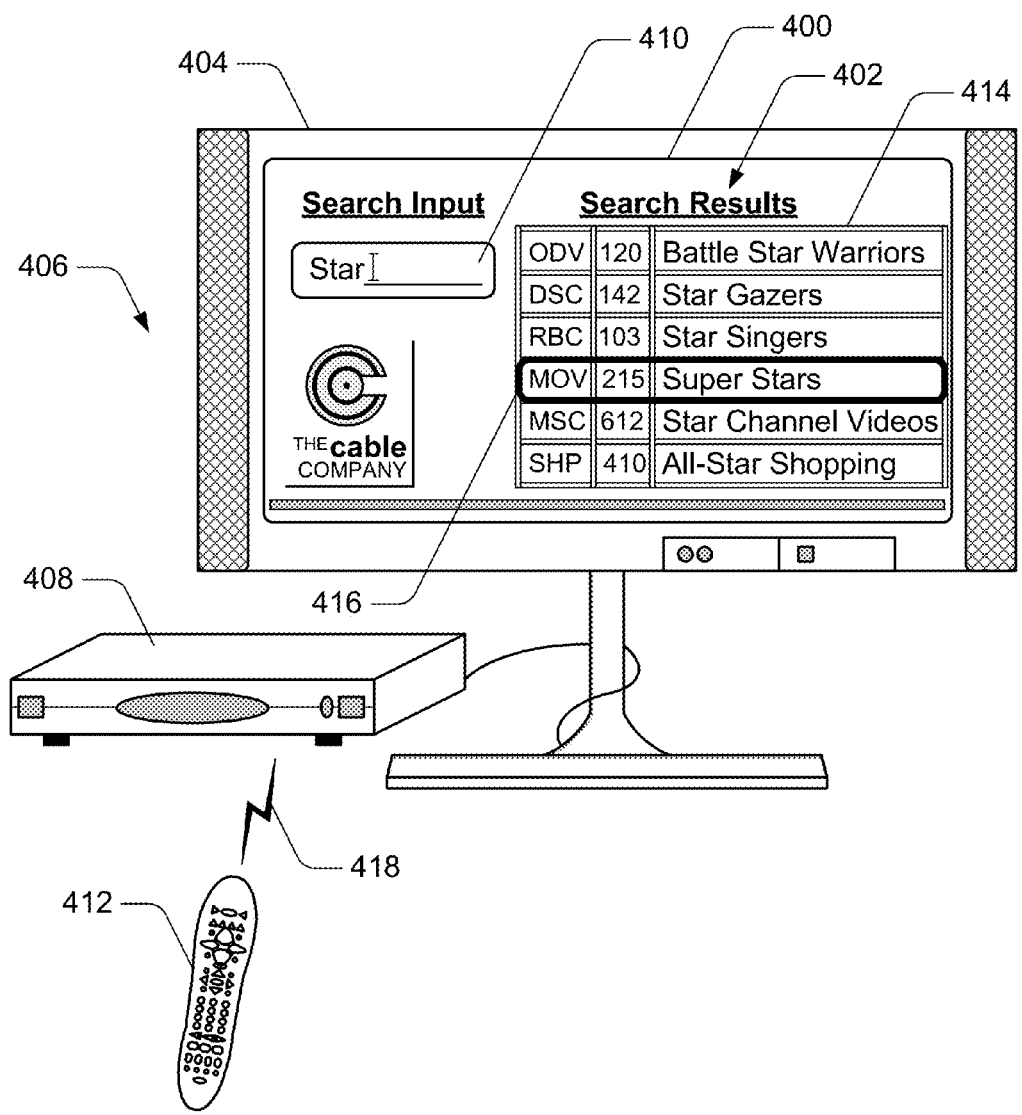
FIG. 4 illustrates an example user interface that displays an ordered list of search results for television media content that are ordered by popularity rankings in embodiments of media content search results ranked by popularity.

FIG. 4 illustrates an example of a user interface 400 that displays an ordered list 402 of search results for television media content that are ordered by popularity rankings. The ordered list 402 of search results is shown on a display device 404 of a television client system 406 that includes a television client device 408. The television media content shown ranked in the list 402 can be displayed in response to a viewer-initiated search request for television media content. For example, user interface 400 includes a search input field 410 via which a viewer can input search term(s) to initiate a search request for television media content. A viewer can input the search term(s) to initiate the search request utilizing an input device 412, such as a remote control.

In this example, a viewer may enter a search request for a particular word, such as "Star", in the search input field 410 on display device 404. A search module of client device 408 may then identify any number of various programs, movies, and/or other media content corresponding to the search term "Star". A tracking module of client device 408 can then rank the various programs, movies, and/or other media content (i.e. the relevant television media content) based on a popularity rating. The ordered list 402 of relevant television media content can then be displayed from which a viewer can select one of the media content for viewing with the remote control input device 412.

The ordered list 402 of search results for the television media content is shown on display device 404 in a viewer-navigable grid 414 of a program guide that enables a viewer to navigate the grid and select media content for viewing. In addition to the list of television media content, the ordered list 402 can include any type of associated numeric and/or channel designators as additional information about particular television media content.

The viewer-navigable grid 414 can include a selectable control 416 shown implemented as an on-screen focus that can be positioned to identify particular television media content and, when selected, initiate receiving the program, movie, or other media content for viewing. A viewer can move the selectable control 416 within the grid 414 and select the various listed media content by manipulating the remote control input device 412 via which the viewer can input control commands 418.

In one or more embodiments, the ordered list 402 can be displayed to optionally include paid placement of particular media content at a position in the list that is more prominent than media content without paid placement. For example, the new video on-demand movie "Battle Star Warriors" is positioned at a prominent position (e.g., at the top of the list) for likely viewer selection. Alternatively, the ordered list 402 of ranked television media content can be displayed to include a likely viewer choice at the first position in the list.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example method 500 described with reference to FIG. 5 may be described in the general context of computer-executable instructions. Generally, computer-executable instructions can include applications, routines, programs, objects, components, data structures, procedures, modules, functions, and the like that perform particular functions or implement particular abstract data types. The method may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent and the techniques may be implemented on a variety of computing platforms having a variety of processors.

Figure 5:
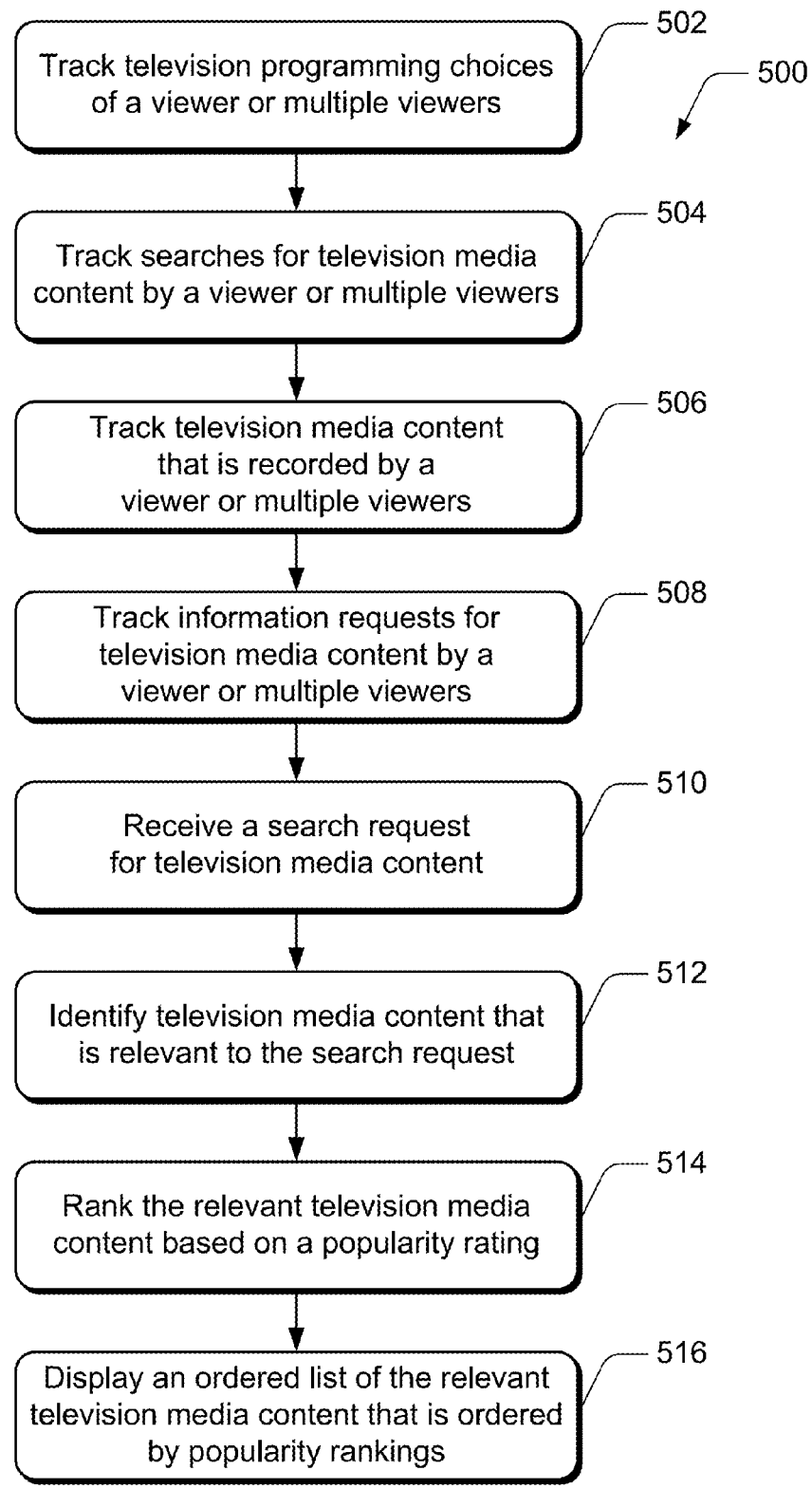
FIG. 5 illustrates example method(s) for media content search results ranked by popularity in accordance with one or more embodiments.

FIG. 5 illustrates example method(s) 500 of media content search results ranked by popularity. The order in which the method is described is not intended to be construed as a limitation, and any number of the described method blocks can be combined in any order to implement the method, or an alternate method.

At block 502, television programming choices of a viewer or multiple viewers are tracked. For example, tracking module 118 (FIG. 1) tracks the television programming choices of a viewer or multiple viewers at television client device 102. The tracking module 118 maintains the tracking information as popularity metadata 126. Alternatively, or in addition, tracking module 210 (FIG. 2) at content provider 202 tracks television programming choices of multiple viewers at television client systems 206(1-N). The tracking module 210 maintains the tracking information as popularity metadata 212. Further, tracking module 302 (FIG. 3) can track the television programming choices 316 of one or more viewers at various television client devices. In an embodiment, real-time tracking information can be received from multiple viewers via a two-way communication network, such as an IP-based communication network that facilitates a two-way communication link between content provider(s) and television client systems in an IPTV system.

At block 504, searches for television media content by a viewer or multiple viewers are tracked. For example, tracking module 118 tracks searches for television media content by a viewer or multiple viewers at client device 102. Similarly, tracking module 210 tracks searches for television media content by multiple viewers at client systems 206(1-N), and/or tracking module 302 tracks searches for television media content 318.

At block 506, television media content that is recorded by a viewer or multiple viewers are tracked. For example, tracking module 118 tracks television media content that is recorded by a viewer or multiple viewers at client device 102. Similarly, tracking module 210 tracks television media content that is recorded by multiple viewers at client systems 206(1-N), and/or tracking module 302 tracks recorded television media content 320.

At block 508, information requests for television media content by a viewer or multiple viewers are tracked. For example, tracking module 118 tracks information requests for or about television media content by a viewer or multiple viewers at client device 102. Similarly, tracking module 210 tracks information requests for television media content by multiple viewers at client systems 206(1-N), and/or tracking module 302 tracks information requests for television media content 322.

At block 510, a search request for television media content is received. For example, search module 120 receives a search request for television media content initiated by a viewer at client device 102. Similarly, tracking module 210 can receive search requests for television media content that are initiated by multiple viewers at client systems 206(1-N) (via communication network 208).

At block 512, television media content that is relevant to the search request is identified. For example, search module 120 identifies television media content that is relevant to a search request initiated by a viewer at client device 102. The search results for television media content can include relevant media content based on a partial match to a search term of a viewer-initiated search request. Additionally, the search module 120 can identify media content that is relevant to a search request from the popularity metadata 126 based on an incorrect search term of the search request.

At block 514, the relevant television media content is ranked based on a popularity rating. For example, tracking module 118 ranks the relevant television media content at client device 102 based on a popularity rating to determine popular media content. The popularity rating is determined from the popularity metadata 126 according to viewer programming choices, viewer recording choices, information requests that are initiated or spawned from initial search results, and/or by any other metric by which the relevant television media content can be ranked. Similarly, tracking module 210 ranks the relevant television media content for a viewer or multiple viewers at any of the client systems 206(1-N).

At block 516, a list of the relevant television media content is displayed in an ordered list that is ordered by popularity rankings. For example, the ordered list 402 of search results for television media content can be displayed from which a viewer can select one of the media content for viewing. The ordered list 402 is displayed to include the relevant television media content that is ordered by popularity rankings.

In another example, the list of popular media content 306 can be generated for display on display device 308 of the television client system 310 and a viewer can select a programming choice with the remote control input device 326. The list of popular media content 306 can be displayed to include all of the popular media content, or just the higher-ranking popular media content. The list of popular media content 306 can also be displayed to include paid placement of particular media content at a first position 328 in the list; a likely viewer choice based on television programming choices of the viewer at a second position in the list; and at least an additional likely viewer choice based on television programming choices of multiple viewers at a third position in the list.

Figure 6:
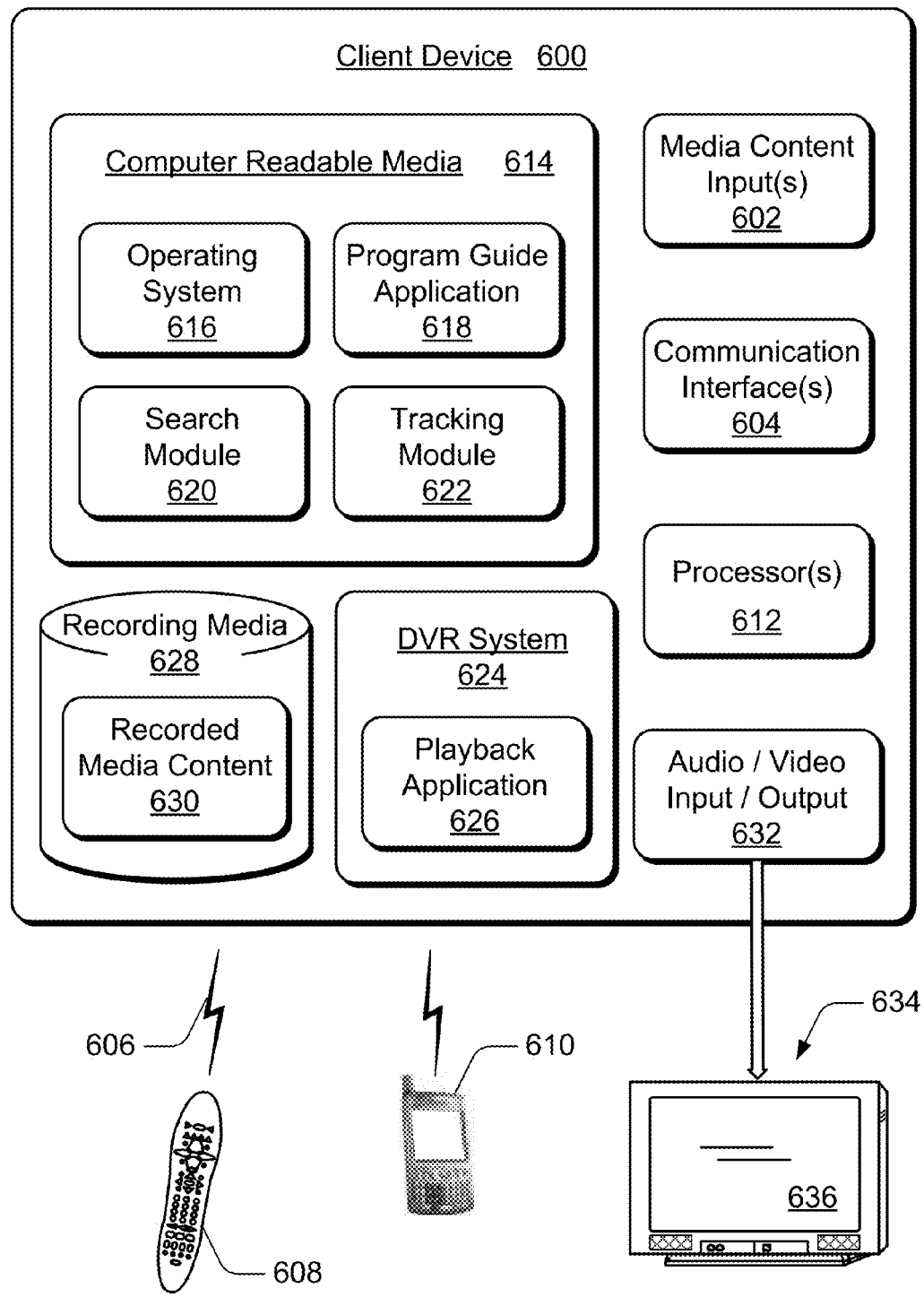
FIG. 6 illustrates various components of an example client device which can implement embodiments of media content search results ranked by popularity.

FIG. 6 illustrates various components of an example client device 600 that can be implemented as any form of a computing, electronic, or television client device to implement embodiments of media content search results ranked by popularity. For example, client device 600 can be implemented as client device 102 shown in FIG. 1, and/or as any of the client devices of the client systems 206(1-N) shown in FIG. 2. In various embodiments, client device 600 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 600 includes one or more media content inputs 602 that may include Internet Protocol (IP) inputs over which streams of media content are received via an IP-based network. Device 600 further includes communication interface(s) 604 that can be implemented as any one or more of a serial and/or parallel interface, a wireless interface, any type of network interface, a modem, and as any other type of communication interface. A wireless interface enables client device 600 to receive control input commands 606 and other information from an input device, such as from remote control device 608, a portable computing-based device (such as a cellular phone) 610, or from another infrared (IR), 802.11, Bluetooth, or similar RF input device.

A network interface provides a connection between client device 600 and a communication network by which other electronic and computing devices can communicate data with device 600. Similarly, a serial and/or parallel interface provides for data communication directly between client device 600 and the other electronic or computing devices. A modem facilitates client device 600 communication with other electronic and computing devices via a conventional telephone line, a DSL connection, cable, and/or other type of connection.

Client device 600 also includes one or more processors 612 (e.g., any of microprocessors, controllers, and the like) which process various computer-executable instructions to control the operation of device 600, to communicate with other electronic and computing devices, and to implement embodiments of media content search results ranked by popularity. Client device 600 can be implemented with computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 614 provides data storage mechanisms to store various information and/or data such as software applications and any other types of information and data related to operational aspects of client device 600. For example, an operating system 616 and/or other application programs can be maintained as software applications with the computer-readable media 614 and executed on processor(s) 612 to implement embodiments of media content search results ranked by popularity.

Client device 600 can be implemented to include a program guide application 618 that is implemented to process program guide data and generate program guides for display. A program guide enables a viewer to navigate through an onscreen display and locate various media content such as broadcast programs, recorded programs, video on-demand programs and movies, interactive game selections, network-based applications, and other media content of interest to the viewer. In an embodiment, client device 600 can also be implemented to include a search module 620 and a tracking module 622 to implement embodiments of media content search results ranked by popularity. An example of search module 620 is described with reference to search module 120 shown in FIG. 1. Examples of tracking module 622 are described with reference to tracking module 118 shown in FIG. 1, tracking module 210 shown in FIG. 2, and with reference to tracking module 302 shown in FIG. 3.

Client device 600 can also include a DVR system 624 with playback application 626, and recording media 628 to maintain recorded media content 630 that client device 600 receives and/or records. Further, client device 600 may access or receive additional recorded media content that is maintained with a remote data store (not shown), such as from a video-on-demand server, or media content that is maintained at a broadcast center or content provider that distributes the media content to subscriber sites and client devices. The playback application 626 is a video control application that can be implemented to control the playback of media content, the recorded media content 630, and/or other video on-demand media content, music, and any other audio, video, and/or image media content which can be rendered and/or displayed for viewing.

Client device 600 also includes an audio and/or video output 632 that provides audio and/or video data to an audio rendering and/or display system 634. The audio rendering and/or display system 634 can include any devices that process, display, and/or otherwise render audio, video, and image data. Video signals and audio signals can be communicated from device 600 to a display device 636 via an RF (radio frequency) link, S-video link, composite video link, component video link, DVI (digital video interface), analog audio connection, or other similar communication link. Alternatively, the audio rendering and/or display system 634 can be implemented as integrated components of the example client device 600. Client device 600 along with the audio rendering and/or display system 634 is an example of a viewing system that can be implemented in a household viewing area for viewing television programs and/or receiving other television media content.

FIG. 7 illustrates an example entertainment and information system 700 in which an IP-based television environment can be implemented, and in which embodiments of media content search results ranked by popularity can be implemented. System 700 facilitates the distribution of media content, program guide data, and advertising content to multiple viewers and to multiple viewing systems. System 700 includes a content provider 702 and any number "N" of client systems 704(1-N) each configured for communication via a communication network 706. Each client system 704(1-N) is an example of the client systems 206(1-N) described with reference to FIG. 2. Each of the client systems 704(1-N) can receive one or more data streams of media content, program content, program guide data, advertising content, closed captions data, and the like from content server(s) of the content provider 702 via the communication network 706.

The communication network 706 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 706 can be implemented using any type of network topology and any network communication protocol, and can be represented or otherwise implemented as a combination of two or more networks. A digital network can include various hardwired and/or wireless links 708(1-N), routers, gateways, and so on to facilitate communication between content provider 702 and the client systems 704(1-N).

System 700 includes a media server 710 that receives media content from a content source 712, program guide data from a program guide source 714, and advertising content from an advertisement source 716. In an embodiment, the media server 710 represents an acquisition server that receives the audio and video media content from content source 712, an EPG server that receives the program guide data from program guide source 714, and/or an advertising management server that receives the advertising content from the advertisement source 716.

The content source 712, the program guide source 714, and the advertisement source 716 control distribution of the media content, the program guide data, and the advertising content to the media server 710 and/or to other servers. The media content, program guide data, and advertising content can be distributed via various transmission media 718, such as satellite transmission, radio frequency transmission, cable transmission, and/or via any number of other wired or wireless transmission media. In this example, media server 710 is shown as an independent component of system 700 that communicates the program content, program guide data, and advertising content to content provider 702. In an alternate implementation, media server 710 can be implemented as a component of content provider 702.

Content provider 702 is representative of a headend service in a content distribution system, for example, that provides the media content, program guide data, and advertising content to multiple subscribers (e.g., the client systems 704(1-N)). The content provider 702 can be implemented as a satellite operator, a network television operator, a cable operator, and the like to control distribution of media content, program and advertising content, such as movies, television programs, commercials, music, and other audio, video, and/or image content to the client systems 704(1-N).

Content provider 702 includes various components to facilitate media data processing and content distribution, such as a subscriber manager 720, a device monitor 722, and one or more content servers 724. The subscriber manager 720 manages subscriber data, and the device monitor 722 monitors the client systems 704(1-N) (e.g., and the subscribers), and maintains monitored client state information.

Although the various managers, servers, and monitors of content provider 702 (to include the media server 710 in one embodiment) are illustrated and described as distributed, independent components of content provider 702, any one or more of the managers, servers, and monitors can be implemented together as a multi-functional component of content provider 702. Additionally, any one or more of the managers, servers, and monitors described with reference to system 700 can implement features and embodiments of media content search results ranked by popularity.

The client systems 704(1-N) can each be implemented to include a client device 726 and a display device 728 (e.g., a television, LCD, and the like). A client device 726 of a client system 704 can be implemented in any number of embodiments, such as a set-top box, a digital video recorder (DVR) and playback system, an appliance device, a gaming system, and as any other type of client device that may be implemented in an entertainment and information system. In an alternate embodiment, client system 704(N) is implemented with a computing device 730 as well as a client device. Additionally, any of the client devices 726 of a client system 704 can implement features and embodiments of media content search results ranked by popularity as described herein.

Although embodiments of media content search results ranked by popularity have been described in language specific to features and/or methods, it is to be understood that the subject of the appended claims is not necessarily limited to the specific features or methods described. Rather, the specific features and methods are disclosed as example implementations of media content search results ranked by popularity.

The invention claimed is:

1. A method comprising:
receiving a search request for television media content;
identifying relevant television media content that is associated with at least one search term of the search request;
tracking viewer interactions of a plurality of viewers with television programming to develop a popularity rating, the viewer interactions including television programming choices of a viewer who initiates the search request; and
ranking the relevant television media content based on the popularity rating, the popularity rating based at least in part on the television programming choices of the viewer.

2. The method as recited in claim 1, wherein the viewer interactions further includes television programming choices of the plurality of viewers, and wherein the popularity rating is further based at least in part on the television programming choices of the plurality of viewers.

3. The method as recited in claim 1, wherein the viewer interactions further includes television programming choices of the plurality of viewers, wherein the popularity rating is based at least in part on the television programming choices of the viewer and on the television programming choices of the plurality of viewers, and wherein ranking the relevant television media content comprises assigning a higher weight to the television choices of the viewer than to the television choices of the plurality of viewers.

4. The method as recited in claim 1, wherein the viewer interactions further includes search requests associated with the television programming, and wherein the popularity rating is further based at least in part on the search requests associated with the television programming.

5. The method as recited in claim 1, wherein the viewer interactions further includes information requests for the television programming, and wherein the popularity rating is further based at least in part on the information requests for the television programming.

6. The method as recited in claim 1, wherein identifying the relevant television media content comprises identifying the relevant television media content based on a partial match to the at least one search term of the search request.

7. The method as recited in claim 1, wherein identifying the relevant television media content comprises identifying the relevant television media content when the search request includes at least one incorrect search term.

8. A non-transitory computer readable medium having instructions thereon for generating for display popular media content, the instructions comprising:

instructions for receiving a search request for television media content;
instructions for identifying relevant television media content that is relevant to the search request;
instructions for tracking viewer interactions of a plurality of viewers with the relevant television media content to develop a popularity rating; and
instructions for generating for display, in a user interface, paid placement of particular media content and an ordered list of the relevant television media content that is ordered based on the popularity rating.

9. The non-transitory computer-readable storage medium as recited in claim 8, wherein the paid placement is displayed at a position in the user interface that is more prominent than the relevant television media content in the ordered list.

10. The non-transitory computer-readable storage medium as recited in claim 8, wherein the paid placement of the particular media content comprises on-demand media content.

11. The non-transitory computer-readable storage medium as recited in claim 8, wherein the instructions for generating for display the ordered list of the relevant television media content includes instructions for generating for display a likely viewer choice based on television programming choices of a viewer at a first position in the list, and at least an additional likely viewer choice based on television programming choices of multiple viewers at a second position in the list.

12. The non-transitory computer-readable storage medium as recited in claim 8, wherein the instructions for tracking the viewer interactions of the plurality of viewers comprises instructions for tracking television programming choices of a viewer who initiates the search request, and wherein the popularity rating is based at least in part on the television programming choices of the viewer.

13. The non-transitory computer-readable storage medium as recited in claim 8, wherein the instructions for tracking the viewer interactions of the plurality of viewers comprises instructions for tracking requests of a viewer who initiates the search request for information about the relevant television media content, and wherein the popularity rating is based at least in part on the requests of the viewer for information about the relevant television media content.

14. The non-transitory computer-readable storage medium as recited in claim 8, wherein the popularity rating is based at least in part on television programming choices of the plurality of viewers.

15. The non-transitory computer-readable storage medium as recited in claim 8, further comprising instructions for tracking other search requests for television programming, and wherein the popularity rating is based at least in part on the other search requests for television programming.

16. The non-transitory computer-readable storage medium as recited in claim 8, further comprising instructions for tracking television programming that is recorded, and wherein the popularity rating is based at least in part on the television programming that is recorded.

17. The non-transitory computer-readable storage medium as recited in claim 8, further comprising instructions for tracking information requests for television programming, and wherein the popularity rating is based at least in part on the information requests for the television programming.

18. The non-transitory computer-readable storage medium as recited in claim 8, wherein the relevant television media content is identified based on an incorrect search term of the search request.

19. The non-transitory computer-readable storage medium as recited in claim 8, wherein the relevant television media content includes new television media content, and wherein the popularity rating is based at least in part on a projected popularity of the new television media content.

20. A method comprising:
generating popularity metadata associated with tracked television media content, wherein the popularity metadata includes at least one of searches for media content, information requests, programming choices, recordings, or new media content from a plurality of viewers;
determining popular media content relevant to at least one search term of a search request based on a popularity rating generated from the popularity metadata; and
generating for display a user interface that includes a list of the popular media content ranked according to the popularity ranking and paid placement of particular media content.

21. The method of claim 20, wherein the popularity rating is further based at least in part on the television programming choices of the plurality of viewers.

22. The method as recited in claim 20, wherein generating for display the user interface that includes the list of the popular media content ranked according to the popularity ranking comprises assigning a higher weight to television choices of a first viewer than to television choices of the plurality of viewers when ranking the relevant television media content.

23. The method as recited in claim 20, wherein the popularity rating is further based at least in part on the searches for media content included in the popularity metadata.

24. The method as recited in claim 20, wherein popularity rating is further based at least in part on the information requests included in the popularity metadata.

25. The method as recited in claim 20, wherein determining popular media content relevant to at least one search term of a search request comprises searching the popularity metadata for the at least one search term.

26. The method as recited in claim 20, wherein determining popular media content comprises identifying the popular media content based on a partial match to the at least one search term of the search request.

27. A system comprising:
a processor configured to:
generate popularity metadata associated with tracked television media content, wherein the popularity metadata includes at least one of searches for media content, information requests, programming choices, recordings, or new media content from a plurality of viewers;
determine popular media content relevant to at least one search term of a search request based on a popularity rating generated from the popularity metadata; and
generate for display a user interface that includes a list of the popular media content ranked according to the popularity ranking and paid placement of particular media content.

28. The system of claim 27, wherein the popularity rating is further based at least in part on the television programming choices of the plurality of viewers.

29. The system as recited in claim 27, wherein the processor is configured to assign a higher weight to television choices of a first viewer than to television choices of the plurality of viewers when ranking the relevant television media content.

30. The system as recited in claim 27, wherein the popularity rating is further based at least in part on the searches for media content included in the popularity metadata.

31. The system as recited in claim 27, wherein popularity rating is further based at least in part on the information requests included in the popularity metadata.

32. The system as recited in claim 27, wherein the processor is configured to determine the popular media content relevant to at least one search term of a search request by searching the popularity metadata for the at least one search term.

33. The system as recited in claim 27, wherein the processor is configured to determine the popular media content by identifying the popular media content based on a partial match to the at least one search term of the search request.

34. A system comprising:
a processor configured to:
receive a search request for television media content;
identify relevant television media content that is associated with at least one search term of the search request;
track viewer interactions of a plurality of viewers with television programming to develop a popularity rating, the viewer interactions including television programming choices of a viewer who initiates the search request; and
rank the relevant television media content based on the popularity rating, the popularity rating based at least in part on the television programming choices of the viewer.

35. The system as recited in claim 34, wherein the viewer interactions further includes television programming choices of the plurality of viewers, and wherein the popularity rating is further based at least in part on the television programming choices of the plurality of viewers.

36. The system as recited in claim 34, wherein the viewer interactions further includes television programming choices of the plurality of viewers, wherein the popularity rating is based at least in part on the television programming choices of the viewer and on the television programming choices of the plurality of viewers, and wherein the processor is configured to rank the relevant television media content by assigning a higher weight to the television choices of the viewer than to the television choices of the plurality of viewers.

37. The system as recited in claim 34, wherein the viewer interactions further includes search requests associated with the television programming, and wherein the popularity rating is further based at least in part on the search requests associated with the television programming.

38. The system as recited in claim 34, wherein the viewer interactions further includes information requests for the television programming, and wherein the popularity rating is further based at least in part on the information requests for the television programming.

39. The system as recited in claim 34, wherein the processor is configured to identify the relevant television media content by identifying the relevant television media content based on a partial match to the at least one search term of the search request.

40. The system as recited in claim 34, wherein the processor is configured to identify the relevant television media content by identifying the relevant television media content when the search request includes at least one incorrect search term.

* * * * *